US009285842B2

United States Patent
Yashiro et al.

(10) Patent No.: US 9,285,842 B2
(45) Date of Patent: *Mar. 15, 2016

(54) TOUCH PANEL SUBSTRATE AND ELECTRO-OPTIC DEVICE

(75) Inventors: Yuhji Yashiro, Osaka (JP); Yasuhiro Sugita, Osaka (JP); Kazutoshi Kida, Osaka (JP); Shinji Yamagishi, Osaka (JP); Hiroyuki Ogawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 143 days.

This patent is subject to a terminal disclaimer.

(21) Appl. No.: 14/234,958

(22) PCT Filed: Jul. 24, 2012

(86) PCT No.: PCT/JP2012/068740
§ 371 (c)(1),
(2), (4) Date: Jan. 24, 2014

(87) PCT Pub. No.: WO2013/018591
PCT Pub. Date: Feb. 7, 2013

(65) Prior Publication Data
US 2014/0152921 A1    Jun. 5, 2014

(30) Foreign Application Priority Data
Jul. 29, 2011   (JP) ................ 2011-167733

(51) Int. Cl.
*G06F 1/16* (2006.01)
*G06F 3/044* (2006.01)
*G06F 3/041* (2006.01)
*G02F 1/1333* (2006.01)

(52) U.S. Cl.
CPC ............. *G06F 1/1692* (2013.01); *G06F 3/044* (2013.01); *G06F 3/0412* (2013.01); *G02F 1/13338* (2013.01)

(58) Field of Classification Search
CPC ........................................... G06F 3/044
See application file for complete search history.

(56) References Cited

U.S. PATENT DOCUMENTS

| 6,057,903 A | 5/2000 | Colgan et al. |
| 6,452,514 B1 | 9/2002 | Philipp |
| 2010/0136868 A1 | 6/2010 | Chien et al. |
| 2011/0057887 A1 | 3/2011 | Lin et al. |
| 2011/0057900 A1 | 3/2011 | Huang et al. |

(Continued)

FOREIGN PATENT DOCUMENTS

| JP | 3526418 B2 | 5/2004 |
| JP | 2010-72581 A | 4/2010 |

(Continued)

OTHER PUBLICATIONS

Official Communication issued in International Patent Application No. PCT/JP2012/068740, mailed on Oct. 30, 2012.

(Continued)

*Primary Examiner* — Gerald Johnson
(74) *Attorney, Agent, or Firm* — Keating & Bennett, LLP

(57) ABSTRACT

A sensor electrode (31) provided between an insulating substrate (21) and a counter electrode (27) includes a plurality of electrodes (32) arranged along a first direction and a plurality of electrodes (33) arranged along a second direction perpendicular to the first direction and insulated from the electrodes (32), and these electrodes (32, 33) are formed in the same plane.

15 Claims, 47 Drawing Sheets

(56) References Cited

U.S. PATENT DOCUMENTS

| | | |
|---|---|---|
| 2011/0141038 A1 | 6/2011 | Kuo et al. |
| 2011/0157086 A1* | 6/2011 | Ozeki et al. .................... 345/174 |
| 2011/0227847 A1* | 9/2011 | Yoshiyama .................... 345/173 |
| 2012/0033168 A1* | 2/2012 | Hwang et al. ................. 349/139 |
| 2012/0182230 A1 | 7/2012 | Wang et al. |

FOREIGN PATENT DOCUMENTS

| | | |
|---|---|---|
| JP | 2010-72584 A | 4/2010 |
| JP | 2010-160745 A | 7/2010 |
| JP | 2012-150778 A | 8/2012 |

OTHER PUBLICATIONS

Sugita et al., "In-Cell Projected Capacitive Touch Panel Technology", IDW/AD '12 the 19th International Display Workshops, 2012, pp. 825-828.

Sugita et al., "In-Cell Projected Capacitive Touch Panel Technology", The Institute of Electronics, Information and Communication Engineers Transactions on Electronics, vol. E96-C, No. 11, Nov. 2013, pp. 1384-1390.

* cited by examiner

FIG. 7
(a)
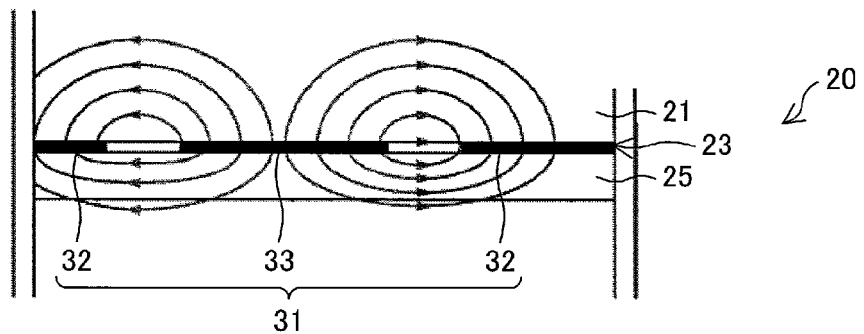
(b)
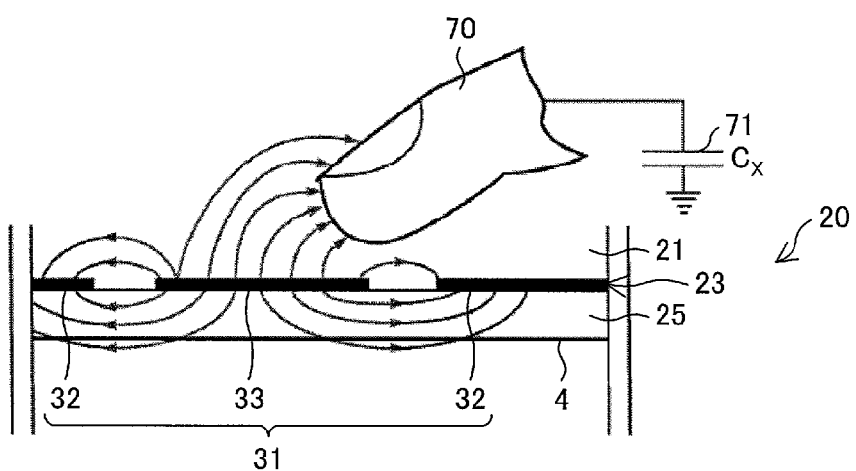

FIG. 11

| Step | Sampling Circuit | | Reset | Function |
|---|---|---|---|---|
| | 0 | 1 | | |
| A | X | — | X | Whole Reset |
| B | — | — | — | Dead Time |
| C | — | X | — | Charge Transfer |
| D | — | — | — | Dead Time |
| E | X | — | — | Maintain |
| F | X | — | — | Measure |

X : Switch On
— : Switch Off

L/S=10 μm/150 μm

L/S=10 μm/300 μm

FIG. 22
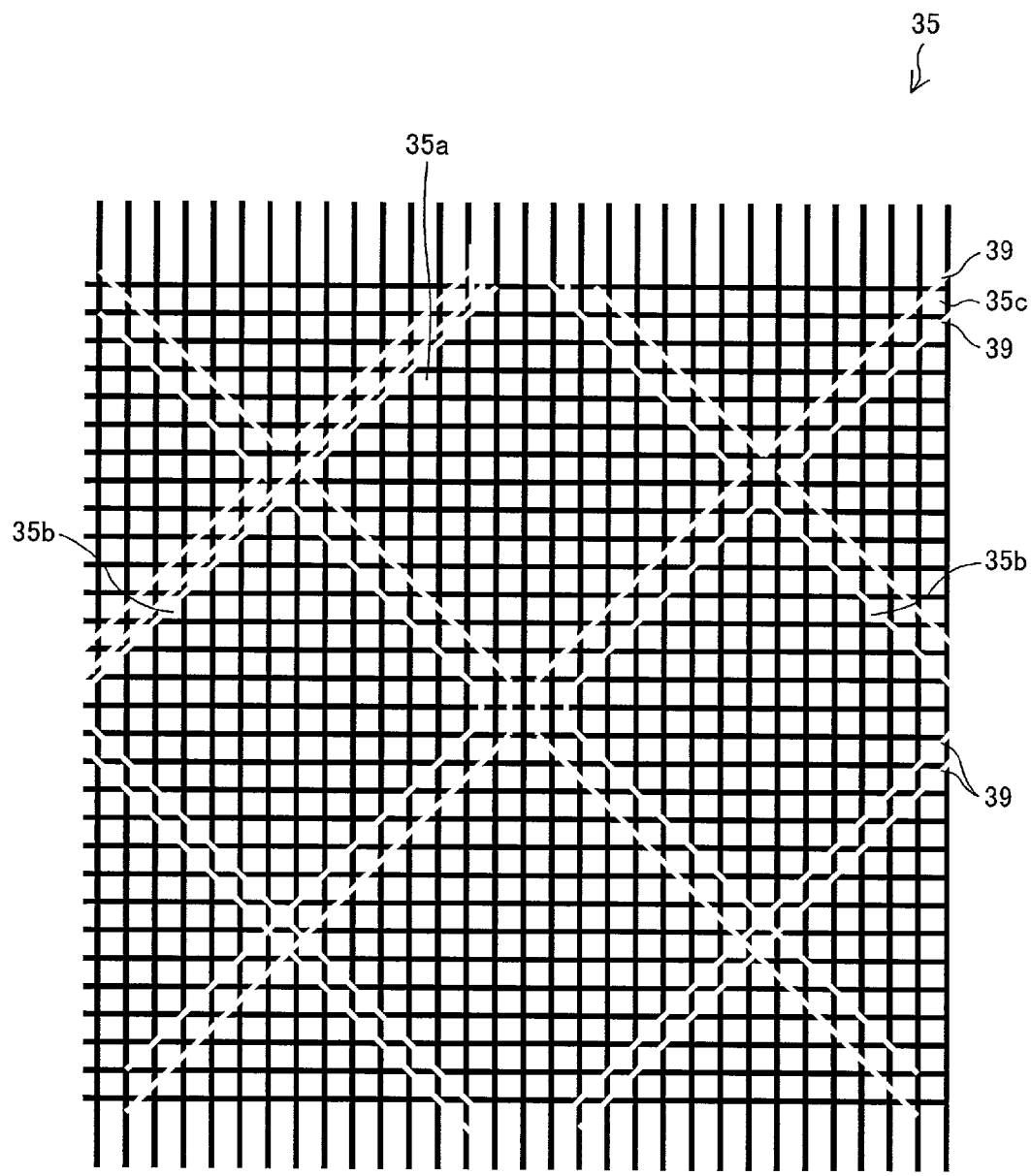
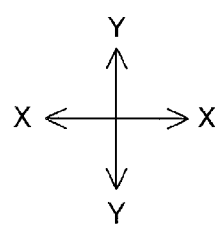

FIG. 33
(a)
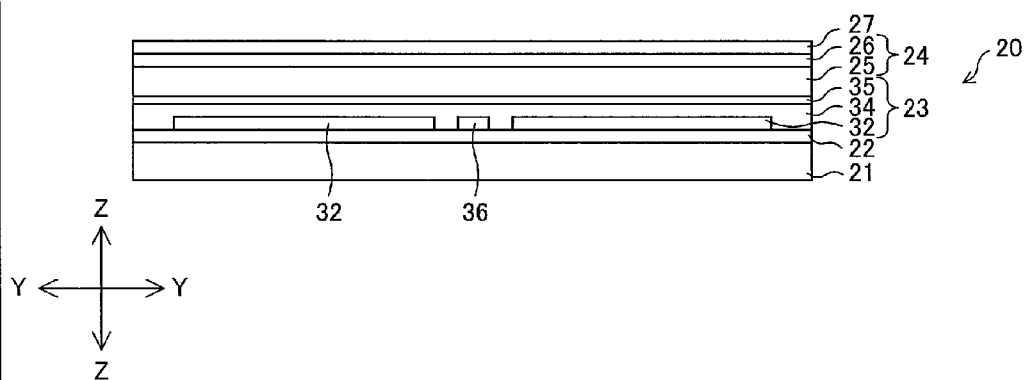
(b)
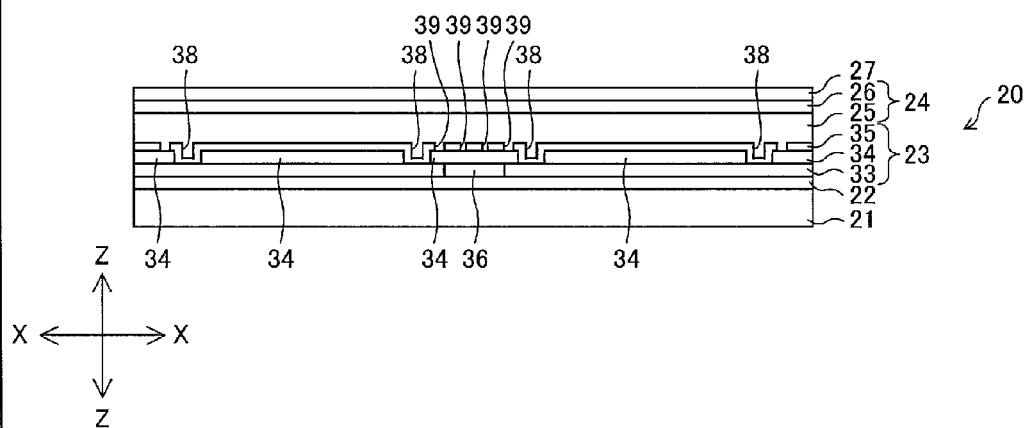
(c)
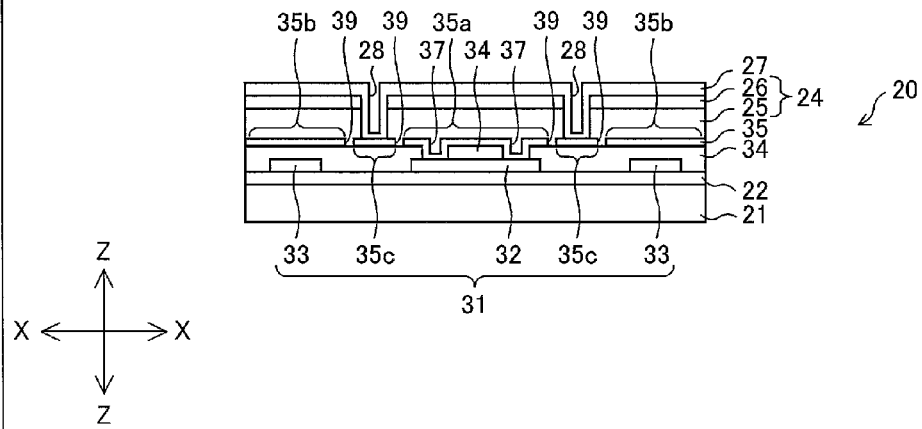

FIG. 40
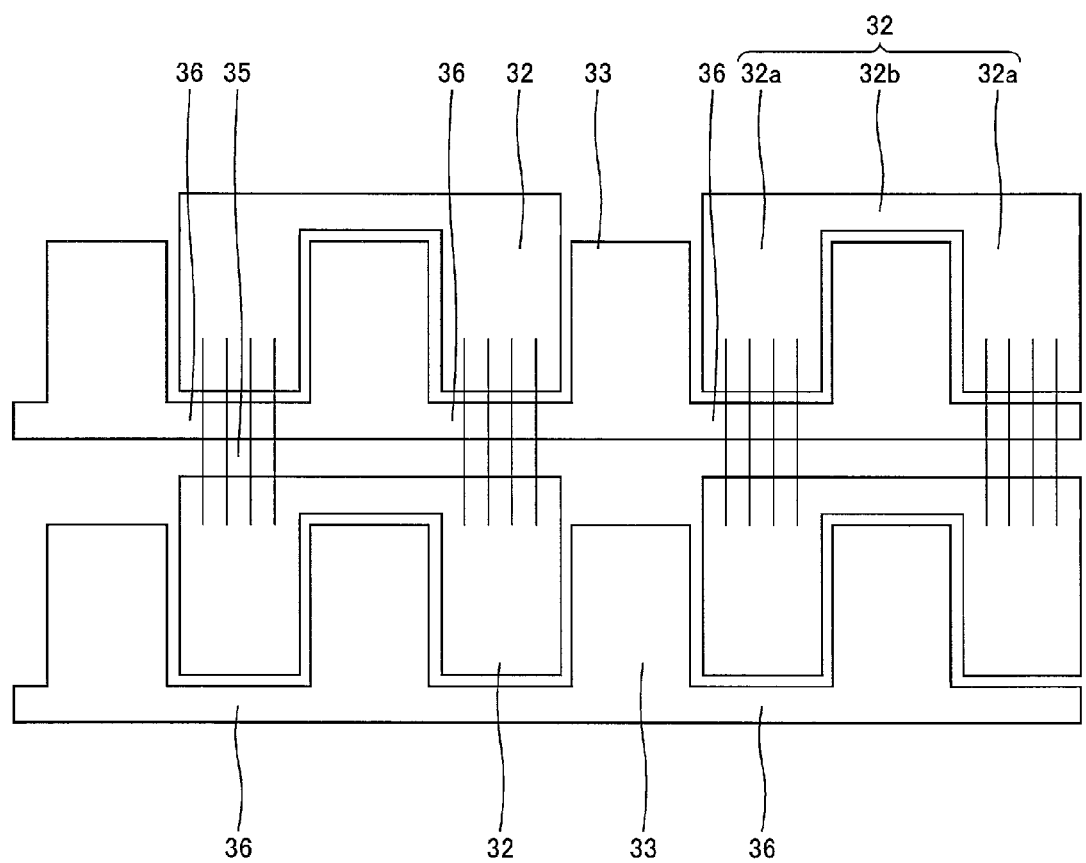
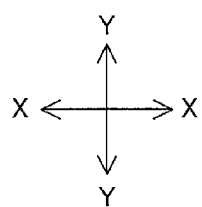

FIG. 46
(a)
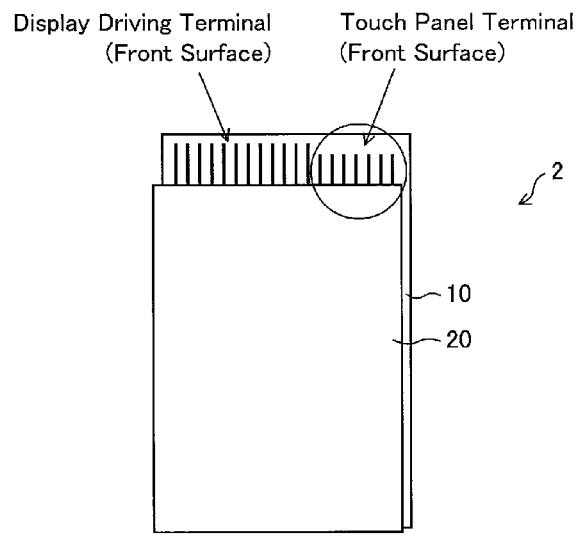
(b)
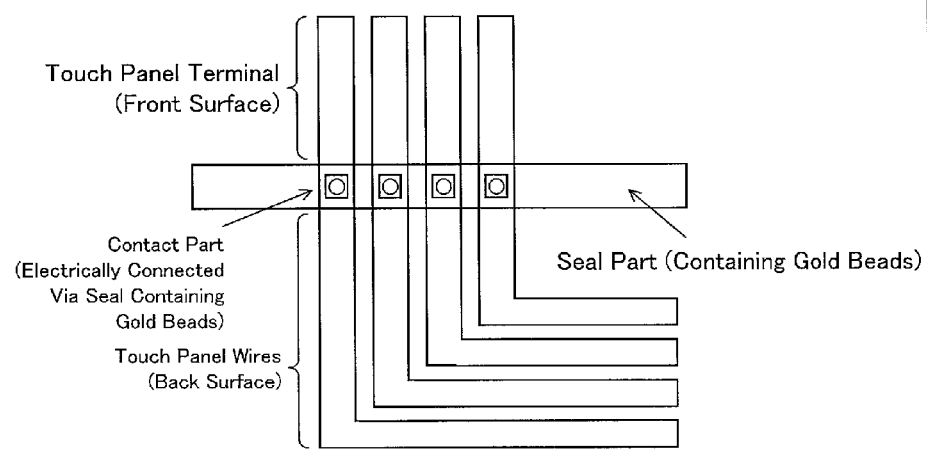

TOUCH PANEL SUBSTRATE AND ELECTRO-OPTIC DEVICE

TECHNICAL FIELD

The present invention relates to a touch panel substrate that is used in an in-cell touch panel and an electro-optic device including such a touch panel substrate.

BACKGROUND ART

In recent years, there has been widespread use of electro-optic devices, such as display devices, each having an integration of display section and an input section for reduction in size of the devices. In particular, in the case of portable terminals such as mobile phones, PDAs (personal digital assistants), and laptop personal computers, there has been widespread use of display devices each including a touch panel that is capable of detecting the position of contact between a display surface and a finger or stylus brought into contact with the display surface.

There have conventionally been known various types of touch panel such as so-called resistive (pressure-sensitive) touch panels and capacitive touch panels. Among them, so-called capacitive touch panels have been in widespread use.

A capacitive touch panel detects the position of contact between a display surface and a finger or stylus by detecting a change in capacitance that occurred when the finger or stylus was brought into contact with the display surface. This makes it possible to detect the position of contact with a simple operation.

Further, unlike a resistive touch panel, the capacitive touch panel does not require the formation of two conductive films with an air layer sandwiched therebetween, and therefore does not suffer from interface reflection of outside light at the interface between an air layer and a conductive film.

However, the capacitive touch panel, which detects the position of contact by detecting a change in capacitance, might be incapable of correct detection of the position of contact due to a change in line of electric force that is caused by extrinsic noise received by the touch panel.

Touch panels that have conventionally been in widespread use are out-cell or on-cell touch panels (e.g., see Patent Literature 1) that are mounted on the outer sides of display panels.

However, the provision of a touch panel on the outer side of a display panel undesirably causes emission noise to be generated from the display panel when a touch panel operation is carried out while a display is being carried out, so that there is an increase in the amount of noise that is received by the touch panel.

For this reason, the provision of a touch panel on the outer side of a display panel might cause a reduction in SN ratio (signal-to-noise ratio), with the result that the touch panel deteriorates in detection performance and therefore wrongly detects the position of contact.

Further, the provision of a touch panel on the outer side of a display panel undesirably causes the resulting device to increase in thickness and weight due to the stacking of the touch panel on the display panel.

Moreover, the provision of a touch panel on the outer side of a display panel causes outside light to be reflected not only on a surface of the touch panel but also at the interface between the touch panel and the display panel, so that contrast and viewability are adversely affected. Further, the provision of a touch panel on the outer side of a display panel causes viewability to deteriorate due to the touch panel per se.

Under such circumstances, an in-cell touch panel, i.e., a touch panel incorporated in a cell of a display panel or the like, has been under development from the point of view of reduction in thickness and weight, improvement in viewability, and cost advantages, such as reduction in the number of components, which are brought about by making touch panels "in-cell" (e.g., see Patent Literatures 2, 3, and 5).

A typical example of an in-cell touch panel is a structure which constitutes an electro-optic device such as a display panel or a display device and which includes an array substrate such as a TFT (thin-film transistor) substrate, a counter substrate such as a CF (color filter) substrate, and a so-called sensor electrode so fabricated between the array substrate and the counter substrate as to serve as a position detecting electrode for detecting the position of contact with an object.

Patent Literatures 2, 3, and 5 disclose a sensor electrode sandwiched between an insulating substrate of a CF substrate and a transparent counter electrode made of ITO (indium tin oxide), with the CF substrate used as a touch panel substrate (i.e., an in-cell touch panel substrate) to constitute an in-cell touch panel.

FIG. 49 is a cross-sectional view showing a configuration of a display device described in Patent Literature 2, and FIG. 50 is a plan view showing a configuration of a sensor electrode as taken along the line H-H shown in FIG. 49.

As shown in FIG. 49, a display device 300 described in Patent Literature 2 includes a display panel 304, and the display panel 304 includes a TFT substrate 301, a CF substrate 302, and a liquid crystal layer 303 sandwiched between the TFT substrate 301 and the CF substrate 302.

The CF substrate 302 includes an insulating substrate 311, a counter electrode 319 (common electrode), and a CF layer 318 provided between the insulating substrate 311 and the counter electrode 319, and the CF layer 318 is constituted by a light blocking section 316 (BM) and a plurality of colored layers 317 (CF) provided between adjacent parts of the light blocking section 316. The CF substrate 302 further includes a first electrode layer 312 and a second electrode layer 314 provided as a sensor electrode between the CF layer 318 and the insulating layer 311, with an insulating layer 313 provided between the first electrode layer 312 and the second electrode layer 314.

As shown in FIGS. 49 and 50, the first electrode layer 312 has a line portion 312a that extends linearly along a first direction and a bulge portion 312b that bulges from the line portion 312a. Further, the second electrode layer 314 has a line portion 314a that extends linearly along a second direction perpendicular to the first direction and a bulge portion 314b that bulges from the line portion 314a.

FIG. 51 is a cross-sectional view schematically showing a configuration of a main part of the CF substrate 302, which is used as a touch panel substrate to constitute an in-cell touch panel, of the display device 300 described in Patent Literatures 2 and 3, with the constituent layers stacked in the order shown. It should be noted that FIG. 51 is equivalent to a cross-sectional view schematically showing a configuration of a main part of the CF substrate 302 of the display device 300 shown in FIG. 49.

In Patent Literature 1, as shown in FIG. 49, an insulating layer 320 and a shield electrode 321 are provided between the CF layer 318 and the counter electrode 319 from the side of the CF layer 318. However, FIG. 51 omits to illustrate the insulating layer 320 and the shield electrode 321. Further, although FIG. 51 shows the light blocking section 316 (BM) and the colored layer 317 (CF) as if they are stacked, they are actually provided on substantially the same level as shown in FIG. 49.

It should be noted that Patent Literatures 2 and 3 disclose that the first electrode layer 312 and the second electrode layer 314 may be made, for example, of a metal patterned into a grid shape (mesh shape), instead of being made of a sheet transparent conductor.

Further, Patent Literature 5 discloses using a black matrix layer as one of a pair of conductive layers which are placed opposite each other with an insulating layer sandwiched therebetween and which constitute a sensor electrode.

CITATION LIST

Patent Literature 1
Japanese Patent Application Publication, Tokukai, No. 2010-72584 A (Publication Date: Apr. 2, 2010)
Patent Literature 2
Japanese Patent Application Publication, Tokukai, No. 2010-72581 A (Publication Date: Apr. 2, 2010)
Patent Literature 3
Japanese Patent Application Publication, Tokukai, No. 2010-160745 A (Publication Date: Jul. 22, 2010)
Patent Literature 4
U.S. Pat. No. 6,452,514 (Registration Date: Sep. 17, 2002)
Patent Literature 5
Japanese Patent No. 3526418 (Registration Date: Feb. 27, 2004)

SUMMARY OF INVENTION

Technical Problem

However, in the case of a sensor electrode, such as that shown in FIG. 51 or described in Patent Literature 5, which has a two-layer structure obtained by stacking conductive layers with an insulating layer sandwiched therebetween, as in the case of the two-layer structure constituted by the first electrode layer 312 and the second electrode layer 314, the second electrode layer 314 and the counter electrode 319 are so close to each other that there is an increase in parasitic capacitance. An increase in parasitic capacitance might make it impossible to correctly detect a position, so that the touch panel might not operate normally.

Further, when the first electrode layer 312 and the second electrode layer 314 are made solely of a transparent conductor (i.e., a transparent electrode), there is an increase in interconnection resistance. This causes an increase in CR time constant (capacitor×resistor), so that the touch panel might not operate normally. Moreover, it undesirably takes high processing cost for the touch panel to be operable.

Alternatively, when the first electrode layer 312 and the second electrode layer 314 are made of a grid metal, there is a reduction in parasitic capacitance, as compared with the case where the first electrode layer 312 and the second electrode layer 314 are made of a sheet transparent electrode. However, even in this case, where the sensor electrode has a two-layer structure constituted by the first electrode layer 312 and the second electrode layer 314, the second electrode layer 314 and the counter electrode 319 are so close to each other that there is a high parasitic capacitance.

Moreover, when the first electrode layer 312 and the second electrode layer 314 are made of a grid metal, there is a reduction in detection signal, so that the touch panel might not operate normally.

Thus, the performance and operation of a touch panel are greatly affected by parasitic capacitance and interconnection resistance.

The present invention has been made in view of the foregoing problems, and it is an object of the present invention to provide a touch panel substrate which is high in position detection performance and capable of carrying out a stable position detecting operation and which is used in an in-cell touch panel, and to provide an electro-optic device including such a touch panel substrate.

In particular, it is an object of the present invention to provide a touch panel substrate which is low in parasitic capacitance and an electro-optic device including such a touch panel substrate. Further, it is a further object of the present invention to reduce the interconnection resistance of such a touch panel.

Solution to Problem

In order to solve the foregoing problems, a touch panel substrate according to the present invention is a touch panel substrate that is used as one of a pair of substrates between which an electro-optic element is sandwiched and that is provided with a position detecting electrode which detects, according to a change in capacitance, a position on coordinates as indicated by an object to be detected, the touch panel substrate including: an insulating substrate; an electro-optic element driving electrode which applies an electric field to the electro-optic element; the position detecting electrode provided between the insulating substrate and the electro-optic element driving electrode and being insulated from the electro-optic element driving electrode, the position detecting electrode including a plurality of first electrodes arranged along a first direction and a plurality of second electrodes arranged along a second direction perpendicular to the first direction and insulated from the first electrodes, the first electrodes and the second electrodes being formed in a same plane.

The present embodiment can distance the first and second electrodes and the electro-optic element driving electrode as much as possible from each other by forming the first and second electrodes in the same plane. This makes it possible to reduce the parasitic capacitance between the first and second electrodes and the electro-optic element driving electrode (i.e., the parasitic capacitance between the position detecting electrode and the electro-optic element driving electrode) in comparison with a case where the first electrodes and the second electrodes are provided as separate layers.

For this reason, the foregoing configuration makes it possible to provide a touch panel substrate which is used in an in-cell touch panel and which is high in position detection performance and capable of carrying out a stable position detecting operation.

Further, since the present embodiment can distance the first and second electrodes and the electro-optic element driving electrode as much as possible from each other by forming the first and second electrodes in the same plane, the parasitic capacitance can be reduced even in a case where the first and second electrodes are in a sheet-shaped pattern (planar-shaped pattern). This makes it possible to reduce the parasitic capacitance while ensuring the magnitude of the detection signal.

Further, according to the present embodiment, forming the first and second electrodes in the same plane allows the first and second electrodes to be formed of the same material at the same time. This makes it possible to reduce processing costs.

Further, in order to solve the foregoing problems, an electro-optic device according to the present invention includes: an electro-optic element; and a pair of substrates between which the electro-optic element is sandwiched, one of the pair of substrates being the touch panel substrate.

By using the touch panel substrate as one on the pair of substrates, the present embodiment makes it possible to provide provided an touch-panel-integrated electro-optic device including an in-cell touch panel, which is high is position detection performance and capable of carrying out a positing detecting operation.

Advantageous Effects of Invention

As described above, a touch panel substrate and an electro-optic device according the present invention are configured such that the position detecting electrode provided between the insulating substrate and the electro-optic element driving electrode includes the first and second electrodes, and these first and second electrodes are formed in the same plane.

This makes it possible to distance the first and second electrodes and the electro-optic element driving electrode as much as possible from each other, thus making it possible to make the parasitic capacitance between the position detecting electrode and the electro-optic element driving electrode smaller than it has conventionally been.

For this reason, the foregoing configuration makes it possible to provide: a touch panel which is used in an in-cell touch panel and which is high in position detection performance and capable of carrying out a stable position detecting operation; and an electro-optic device including such a touch panel substrate.

BRIEF DESCRIPTION OF DRAWINGS

FIG. 7 is a set of diagrams (a) and (b), the diagram (a) schematically showing lines of electric force of a sensor electrode with no object to be detected being in contact with the touch panel substrate according to Embodiment 1, the diagram (b) schematically showing lines of electric force of the sensor electrode with an object to be detected being in contact with the touch panel substrate.

FIG. 11 is a diagram for explaining the states, in each step, of a sampling circuit and a reset switch according to Embodiment 1.

FIG. 22 is a plan view schematically showing a configuration of a metal bridge shown in FIG. 20.

FIG. 33 is a set of diagrams (a) through (c), the diagram (a) showing a cross-section of the touch panel substrate as taken along the line Y5-Y5 across the touch panel layer shown in FIG. 32, the diagram (b) showing a cross-section of the touch panel substrate as taken along the line X8-X8 across the touch panel layer shown in FIG. 32, the diagram (c) showing a cross-section of the touch panel substrate as taken along the line X9-X9 across the touch panel layer shown in FIG. 32.

FIG. 40 is a plan view showing a configuration of a main part of a touch panel layer of another touch panel substrate according to Embodiment 7.

FIG. 46 is a set of diagrams (a) and (b), (a) being a plan view showing a display driving terminal and a touch panel terminal of a liquid crystal panel according to Embodiment 10, (b) being an enlarged view of an encircled region of the touch panel terminal shown in (a) of FIG. 46.

DESCRIPTION OF EMBODIMENTS

Embodiments of the present invention are described in detail below.

[Embodiment 1]

An embodiment of the present invention is described below with reference to FIG. 1 through (a) to (f) of FIG. 19.

The present embodiment is described below by taking a liquid crystal display device as an example of an electro-optic device including an in-cell touch panel. However, the present embodiment is not to be limited to such an example.

<Configurations of a Liquid Crystal Display Device and a Liquid Crystal Panel as Schematically Shown>

Figure 1:
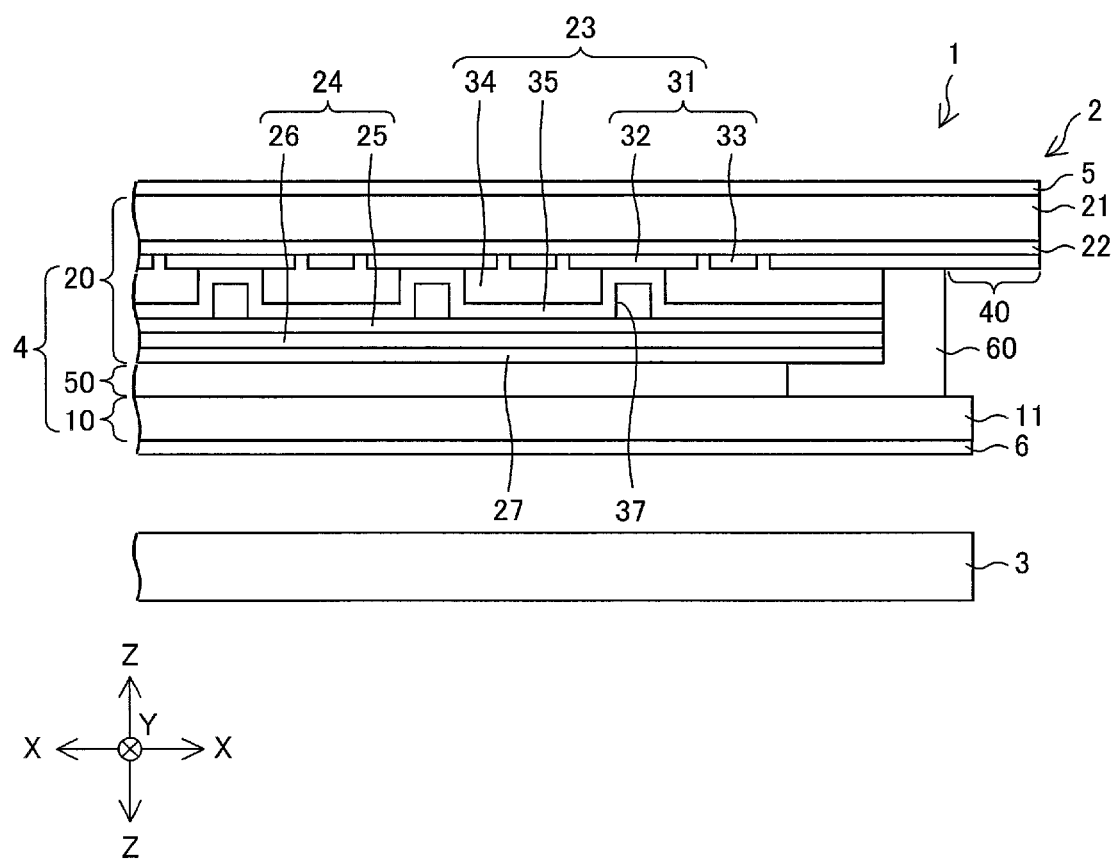
FIG. 1 is a cross-sectional view schematically showing a configuration of a main part of a liquid crystal display device according to Embodiment 1.

FIG. 1 is a cross-sectional view schematically showing a configuration of a main part of a liquid crystal display device according to the present embodiment.

As shown in FIG. 1, a liquid crystal display device 1 (display device) according to the present embodiment includes a liquid crystal panel 2 (display panel), a backlight 3 (illuminating device) for irradiating the liquid crystal panel 2 with light, and a driving circuit etc. (not illustrated).

Since the backlight 3 is configured in the same manner as has conventionally been configured, the following omits to describe a configuration of the backlight 3. As the backlight 3, a surface light source device such as an edge-type backlight or a direct-type backlight can be used as appropriate.

The liquid crystal display device 1 according to the present embodiment is a touch-panel-integrated liquid crystal display device that has an in-cell touch panel, i.e., a touch panel incorporated in a liquid crystal cell 4 (display cell) of the liquid crystal panel 2. Further, the liquid crystal panel 2 is a touch-panel-integrated liquid crystal panel which has an in-cell touch panel substrate, i.e., which has a touch panel incorporated in the liquid crystal cell 4 as mentioned above. The liquid crystal panel 2 has both an image display function and a capacitive touch panel function.

The liquid crystal cell 4 is sandwiched between polarization plates 5 and 6 provided outside the liquid crystal cell 4. There may also be a wave plate (not illustrated) sandwiched between the liquid crystal cell 4 and each of the polarization plates 5 and 6 as needed. For example, the polarization plates 5 and 6 are disposed so that their transmission axes are perpendicular to each other.

<Configuration of the Liquid Crystal Cell 4 as Schematically Shown>

The liquid crystal cell 4 includes, as an electrode substrate (array substrate, element substrate) and a counter substrate, a pair of substrates 10 and 20 placed opposite each other.

The liquid crystal cell 4 includes, as an electro-optic element, a liquid crystal layer 50 sandwiched between the pair of substrates 10 and 20. The liquid crystal layer 50 is a type of optically-modulated layer that is optically modulated by an electric field applied thereto, and is used as a medium layer for display.

The pair of substrates 10 and 20 are sealed with a seal material 60 provided on the edges of these substrates 10 and 20.

The substrate 20, which faces toward a display surface (which faces toward a viewer), is a touch panel substrate that has a capacitive touch panel function. The touch panel has a terminal area 40 so provided in the substrate 20 as to be outside of the seal material 60.

The terminal area 40 has an IC chip (not illustrated) mounted thereon as an electronic circuit, and has an FPC (flexible printed circuit) board or the like attached thereto as a film substrate for transmitting signals for image display, position detection, etc.

The IC chip includes a driving circuit to which wires, such as gate lines and source lines, of the substrate 10 are connected, a position detecting circuit for detecting the coordinate position of an object to be detected, and the like.

The substrates 10 and 20 include insulating substrates 11 and 21 made, for example, of transparent glass, respectively. It is only necessary, however, that of the pair of substrates 10 and 20, the substrate 20, which is used as a touch panel substrate and faces toward the display surface, be transparent, and the insulating substrate of the substrate 10, which faces toward the backlight 3, does not necessarily need to be transparent. Further, the substrates 10 and 20 have alignment films (not illustrated) provided on their opposed surfaces as needed.

The following describes a configuration of each of the substrates 10 and 20.

<Substrate 10>

The substrate 10 (first substrate) is an array substrate. A usable example of the substrate 10 is an active-matrix substrate such as a TFT (thin-film transistor) substrate.

The substrate 10 is configured such that a gate insulating film, a plurality of gate and source lines, switching elements such as TFTs (thin-film transistors), an interlayer insulating film, pixel electrodes, an alignment film, etc. (which are not illustrated) are provided over the insulating substrate 11.

As the array substrate, a well-known array substrate can be used. As such, the array substrate is not described or illustrated in detail here.

The liquid crystal panel 2 is not limited to any particular drive system (display system), and various systems such as the VA (vertical alignment) system and the TN (twisted nematic) system can be employed.

<Substrate 20>

The substrate 20 (second substrate) is a counter substrate that is placed opposite the substrate 10 (array substrate). A usable example of the substrate 20 is a CF substrate provided with a CF (color filter) layer (colored layer) of different colors.

The substrate 20 is used as a touch panel substrate which has a sensor electrode (position detecting electrode) that detects, according to a change in capacitance, a position on coordinates as indicated by an object to be detected, and which is incorporated into the liquid crystal call 4 to constitute an in-cell touch panel.

The sensor electrode detects, according to a change in capacitance, contact of the object to be detected with the display surface of the liquid crystal panel 2, thereby detecting a position on coordinates as indicated by the object to be detected brought into contact with the display surface of the liquid crystal panel 2.

As such, the object to be detected is not to be particularly limited, provided that it is an object that causes a change in capacitance. A usable example of the object to be detected is a conductor such as a finger or a stylus.

Figure 2:
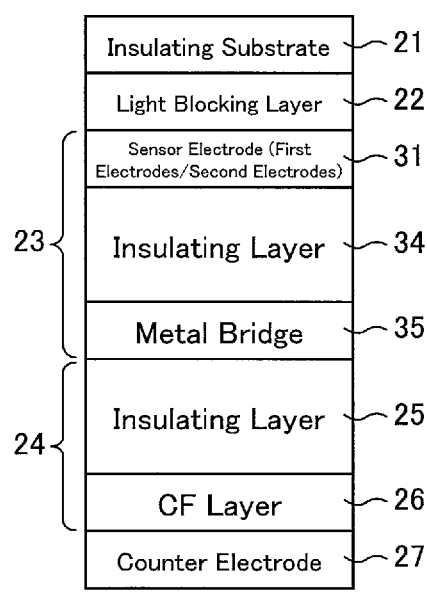
FIG. 2 is a cross-sectional view schematically showing a configuration of a main part of a touch panel substrate according to Embodiment 1, with the constituent layers stacked in the order shown.

FIG. 2 is a cross-sectional view schematically showing a configuration of a main part of the substrate 20, with the constituent layers stacked in the order shown.

First, a laminated structure of the substrate 20 is described below with reference to FIGS. 1 and 2.

<Laminated Structure>

As shown in FIGS. 1 and 2, the substrate 20 includes an insulating substrate 21, a light blocking layer 22, a touch panel layer 23, a resin layer 24, a counter electrode 27 (optical element driving electrode, common electrode), and an alignment film (not illustrated), with these constituent elements (members) stacked in the order named.

As shown in FIGS. 1 and 2, the touch panel 23 includes a sensor electrode 31 (position detecting electrode), an insulating layer 34, and a metal bridge 35 (metal wires) that is bridge-connected to the sensor electrode 31. The metal bridge 35 is electrically connected to the sensor electrode 31.

The sensor electrode 31 stacked on the light blocking layer 22 formed on the insulating substrate 21. The insulating layer 34 is stacked on the sensor electrode 31. The metal bridge 35 is stacked on the insulating layer 34.

Further, as shown in FIG. 2, the sensor electrode 31 includes a plurality of island-shaped electrodes 32 (first electrodes) and a plurality of island-shaped electrodes 33 (second electrodes). As shown in FIG. 2, these electrodes 32 and 33 are formed on the same level (i.e., in the same plane).

Further, as shown in FIG. 2, the resin layer 24 is constituted by a CF layer 26 and an insulating layer 25.

Figure 3:
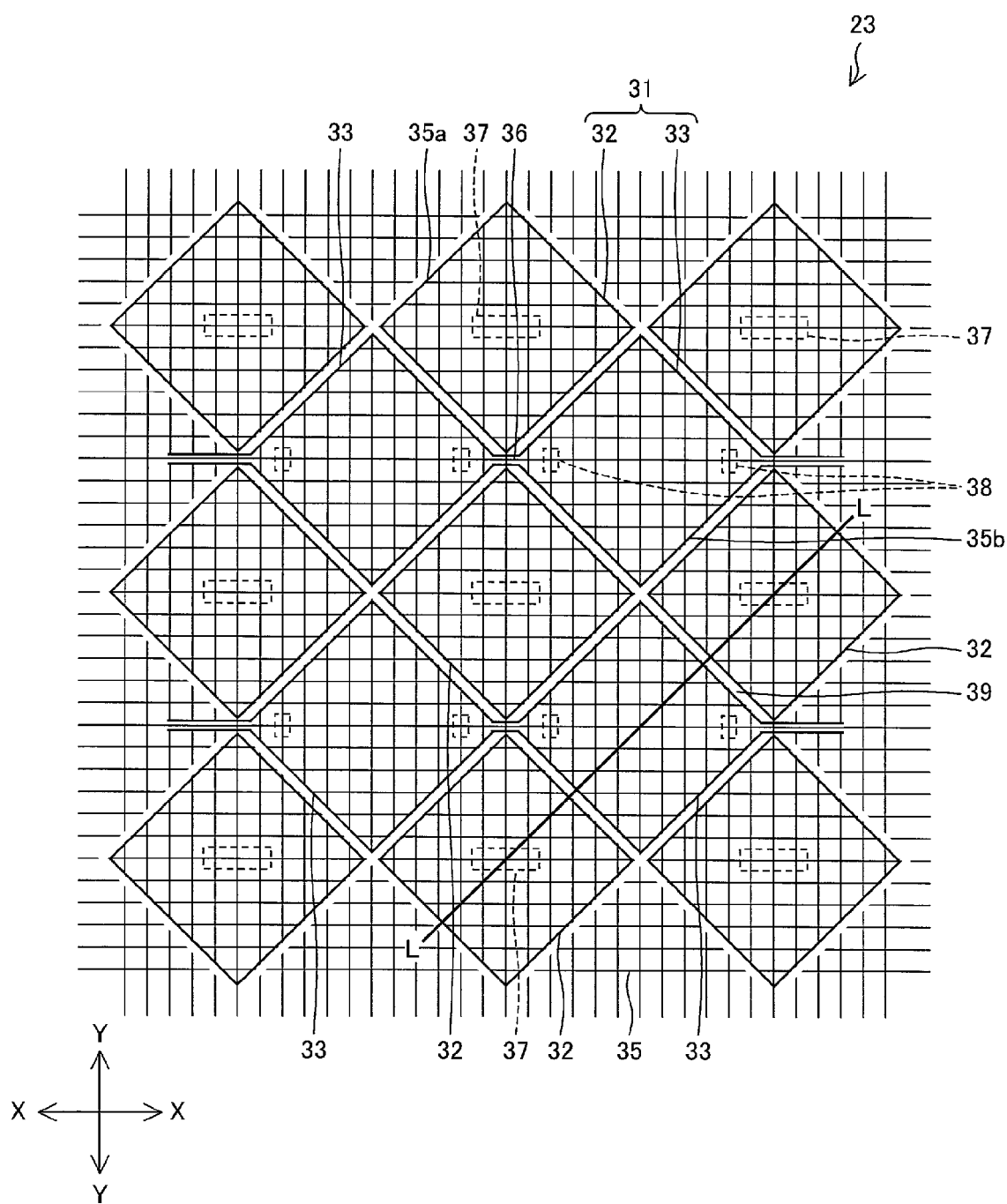
FIG. 3 is a plan view schematically showing an example of a schematic of a configuration of a main part of a touch panel layer of the touch panel substrate according to Embodiment 1.

FIG. 3 is a plan view schematically showing an example of a schematic of a configuration of a main part of the touch panel layer 23 of the substrate 20. It should be noted that FIG. 3 schematically shows a configuration of the touch panel layer 23 in an input region of a touch panel in the substrate 20 (i.e., in a display region of the liquid crystal panel 2).

Figure 4:
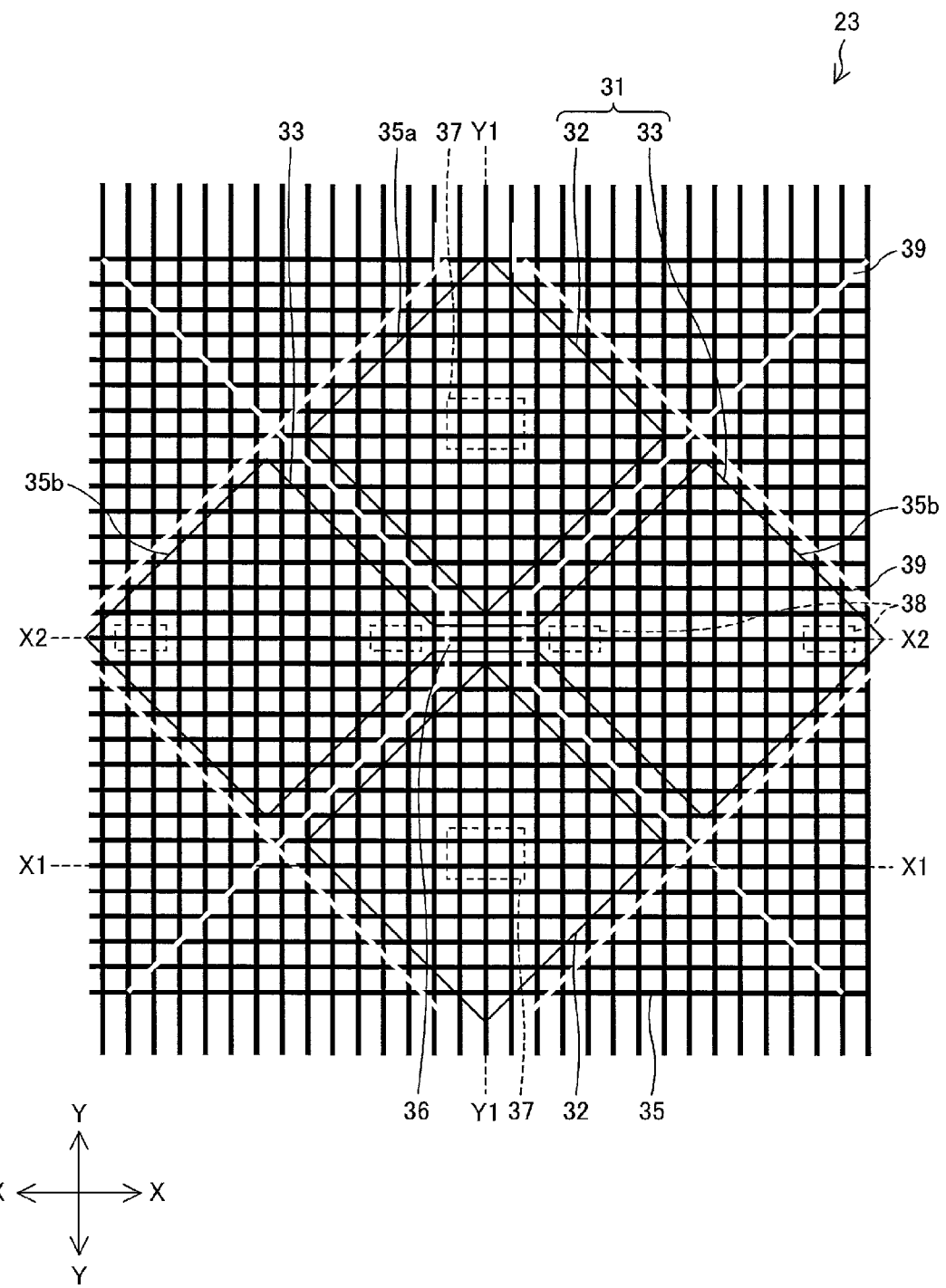
FIG. 4 is an enlarged plan view of a part of the touch panel layer shown in FIG. 3.

FIG. 4 is an enlarged plan view of a part of the touch panel layer 23 shown in FIG. 3.

Figure 5:
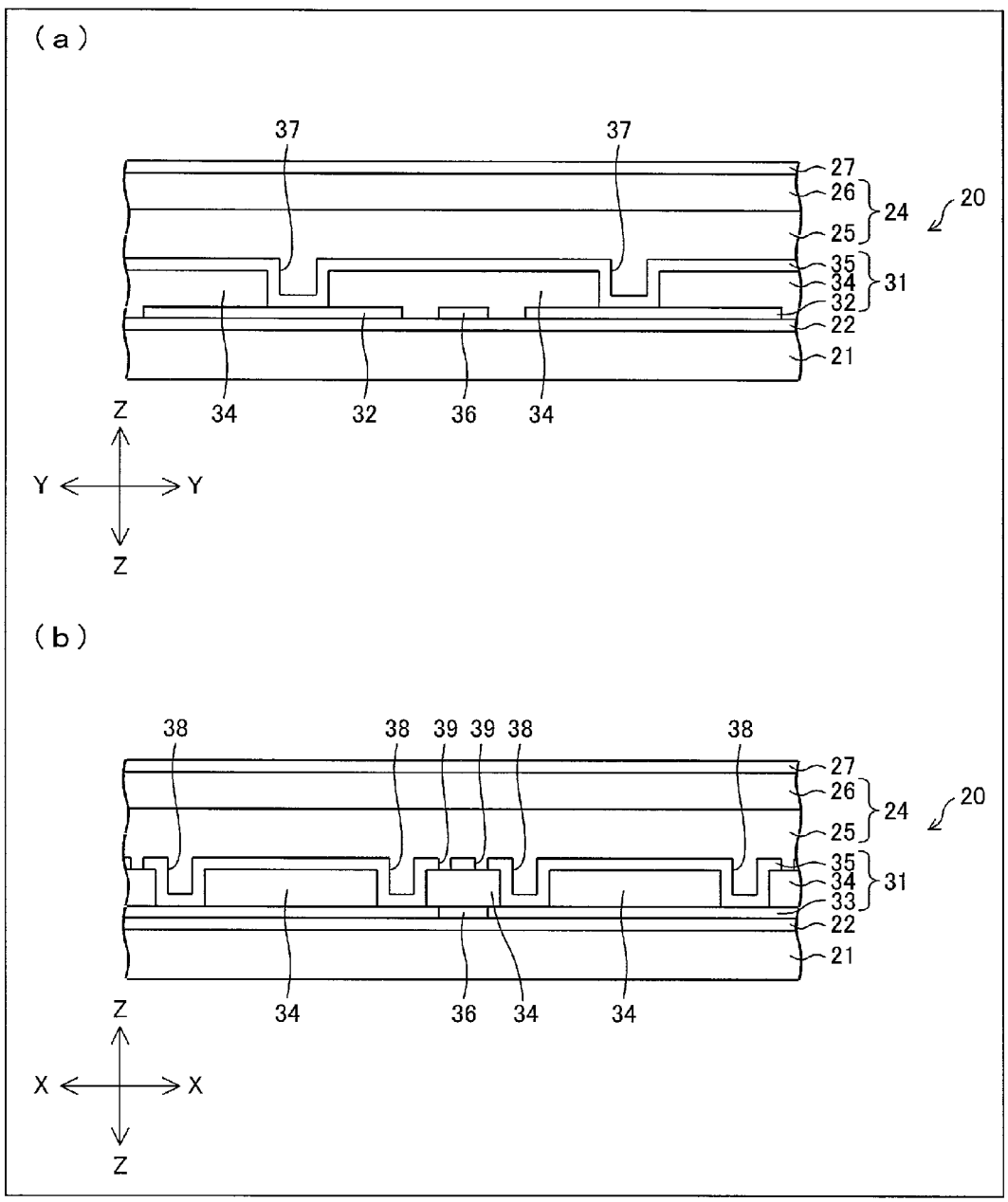
FIG. 5 is a set of diagrams (a) and (b), the diagram (a) showing a cross-section of a main part of the touch panel substrate as taken along the line Y1-Y1 across the touch panel layer shown in FIG. 4, the diagram (b) showing a cross-section of a main part of the touch panel substrate as taken along the line X2-X2 across the touch panel layer shown in FIG. 4.

FIG. 5 is a set of diagrams (a) and (b), the diagram (a) showing a cross-section of a main part of the substrate 20 as taken along the line Y1-Y1 across the touch panel layer 23 shown in FIG. 4, the diagram (b) showing a cross-section of a main part of the substrate 20 as taken along the line X2-X2 across the touch panel layer 23 shown in FIG. 4. It should be noted that FIG. 1 shows a cross-section of a main part of the liquid crystal panel 2 as taken along the line X1-X1 across the touch panel layer 23 shown in FIG. 4.

Figure 6:
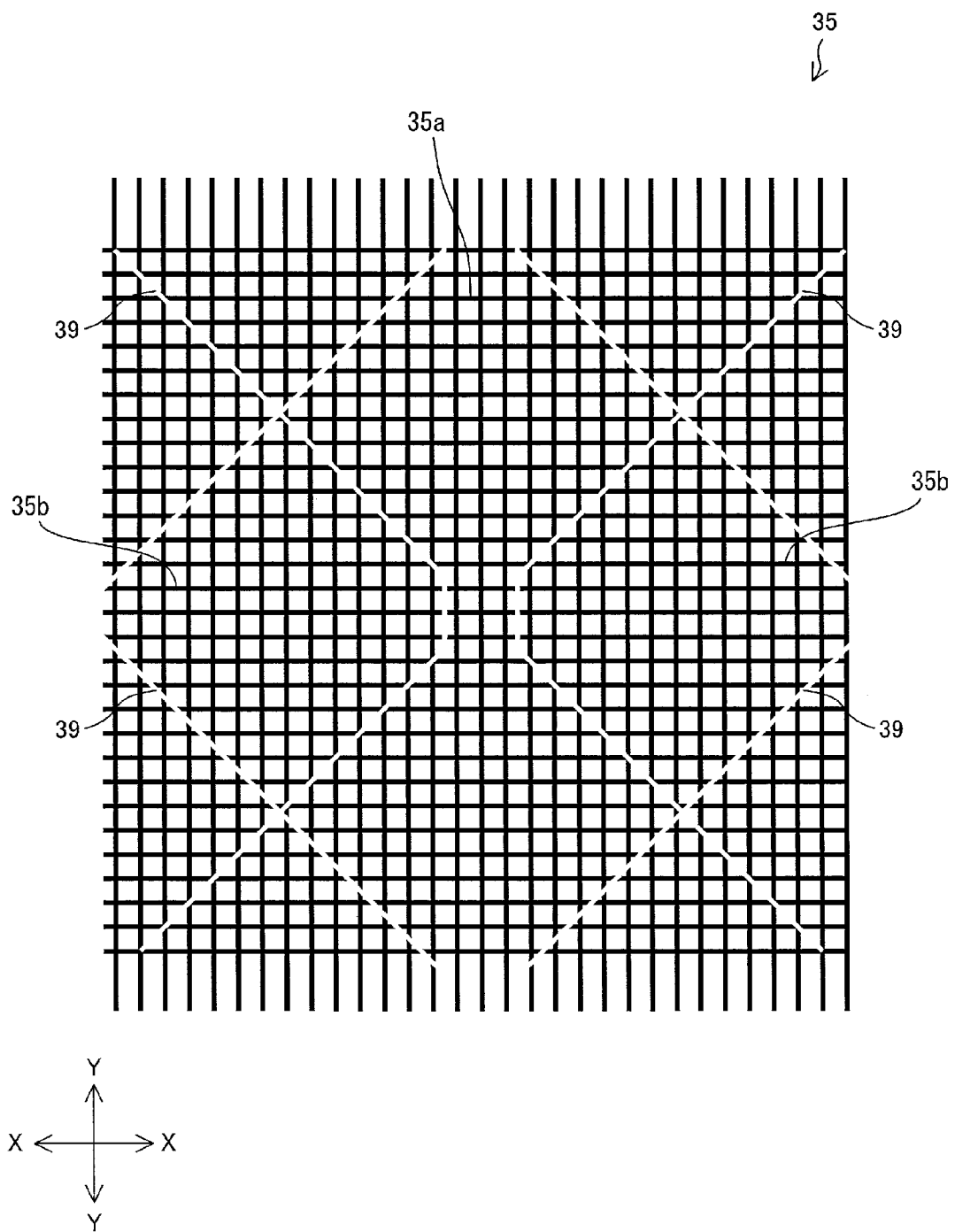
FIG. 6 is a plan view schematically showing a configuration of a metal bridge shown in FIG. 4.

Further, FIG. 6 is a plan view schematically showing a configuration of the metal bridge 35 shown in FIG. 4.

In the touch panel layer 23 shown in FIGS. 3 and 4, the sensor electrode 31 includes, as the island-shaped electrodes 32 and 33, a plurality of electrodes in the form of a sheet-shaped pattern (planar-shaped pattern) of rectangular shapes (square shapes in the example shown in FIGS. 3 and 4) as seen in plan view.

Of these electrodes 32 and 33, the electrodes 32 are arranged at intervals from each other along a given direction (first direction; in the present example, along the Y-axis).

Further, the electrodes 33 are arranged at intervals from each other along a direction intersecting the direction along which the electrodes 32 are arranged (along a second direction; in the present example, along the X-axis, which is perpendicular to the Y-axis, along which the first direction extends).

In the examples shown in FIGS. 3 and 4, the electrodes 32 and 33 are disposed so that one of the two diagonals of the rectangular shape of each of the electrodes 32 and 33 extends along the X-axis and the other one of the two diagonals extends along the Y-axis. This causes the electrodes 32 and 33 to appear to be alternately disposed in a checkered pattern when viewed diagonally as shown in FIG. 3.

These electrodes 32 and 33 are transparent electrodes made, for example, of a transparent conductive material such as an oxide. Examples of the transparent conductive material include ITO (indium tin oxide), IZO (indium zinc oxide), zinc oxide, tin oxide, etc.

Alternatively, the electrodes 32 and 33 may be transparent electrodes, such as metal thin-film electrodes made of graphene or the like or thin-film carbon electrodes, which keep their transparency by being thin films.

Since there is a trade-off between transmittance and the amount of electric power that is consumed by the backlight 3, it is desirable that the electrodes 32 and 33 be formed so that their transmittance is 70% or higher.

Thus, in the present embodiment, the optical transmittance of these electrodes 32 and 33 and the area of transparent regions of these electrodes 32 and 33 are ensured by forming these electrodes 32 and 33 of transparent electrodes in the form of a sheet-shaped pattern.

It should be noted, however, that unless any particular reference is made to how or where a display is done (such as a full-face display), appearance, or the like, the electrodes 32 and 33 may be made of any material without any particular limitations.

Further, as shown in FIGS. 3 and 4, the electrodes 33, which are adjacent to each other along the X-axis, are electrically connected to each other via connecting wires (relay electrodes) 36. This causes the electrodes 33 to be provided so that the electrodes 33 are joined together one after another along the X-axis.

The connecting wires 36 can be made, for example, of the same material as that of which the electrodes 32 and 33 are made.

This allows the connecting wires 36 to be formed at the same time as the electrode 33 and on the same level as the electrodes 33 to serve as connecting parts via which the electrodes 33 are joined.

It should be noted, however, that the electrical connections between the electrodes 33, which are adjacent to each other along the X-axis, do not necessarily have to be made via the connecting wires 36, which are made of the same material as that of which the electrodes 33 are made, and as long as the electrodes 33, which are adjacent to each other along the X-axis, are electrically connected to each other, there are no particular limitations on the way in which they are connected or on the means by which they are connected.

Meanwhile, in the plane in which the electrodes 32 and 33 are formed, as shown in FIGS. 3 and 4, the electrodes 32 are disposed along Y-axis in such a way as to be isolated from each other.

The metal bridge 35 is provided so that the insulating layer 25 (see FIGS. 1 and 2) sandwiched between (i) the electrodes 32 and 33 and the connecting wires 36 and (ii) the metal bridge 35.

In FIGS. 3 and 4, the metal bridge 35 used is a grid of metal wires. It should be noted that FIGS. 3 and 4 show, as an example of the grid of metal wires, a metal wire netting (metal mesh) having a plurality of linear wires extending in a net-like fashion along the Y-axis and the X-axis.

It should be noted that those linear wires which extend along the Y-axis are hereinafter referred to as "Y-wires" (vertical wires) and those linear wires which extend along the X-axis are hereinafter referred to as "X-wires" (horizontal wires).

The metal bridge 35 overlaps the light blocking layer 22 (BM), which covers the space between pixels, in such a way as to correspond to the light blocking layer 22.

In other words, the light blocking layer 22 covers the metal bridge 35 as seen in plan view. This allows the present embodiment to use the light blocking layer 22 to block light reaching the region where the metal bridge 35 is formed and to block light leaking laterally from the metal bridge 35 or light reflected by the metal bridge 35.

Further, since the light blocking layer 22 corresponds in shape to the metal bridge 35, the light blocking layer 22 and the metal bridge 35 can be formed with use of the same mask pattern. This allows a reduction in the number of masks and therefore a reduction in processing cost.

On the electrodes 32 and 33, the insulating layer 34 is provided in a solid state, for example, all over a surface of the insulating substrate 21 over which the touch panel layer 23 is stacked, in such a way as to entirely cover these electrodes 32 and 33.

The insulating layer 34 has contact holes 37 provided therein via which the electrodes 32, which are arranged along the Y-axis, are electrically connected to the metal bridge 35.

At least one (one in the example shown in FIG. 4) of these contact holes 37 is provided for each of the electrodes 32.

The metal bridge 35 makes bridge connections between the electrodes 32, which are arranged along the Y-axis, via the contact holes 37, which are provided for each separate electrode 32.

Further, the insulating layer 34 has contact holes 38 provided therein via which the electrodes 33 are electrically connected to the metal bridge 35.

At least one (two in the example shown in FIG. 4) of these contact holes 38 is provided for each of the electrodes 33.

The metal bridge 35 makes bridge connections between the electrodes 33 via the contact holes 38.

The present embodiment, in which the metal bridge 35 makes a bridge connection between electrodes 33 via at least one contact hole provided in the insulating layer 34, makes it possible for bridge connections to be easily made by the metal bridge 35, which is in the form of a grid as mentioned above. This allows a simplification of a process and therefore a reduction in processing cost.

The metal bridge 35 has a disconnection in the space between each of the electrodes 32 and an electrode 33 adjacent thereto, so that no electricity travels between the electrode 32 and the electrode 33.

Provided in the metal bridge 35 so as to be located between each of the electrodes 32, which are arranged along the Y-axis, and an electrode 33 adjacent thereto along the X-axis is a single disconnecting line 39 that extends along the pattern of these electrodes 32 and 33.

As shown in FIGS. 3, 4, and 6, these disconnecting lines 39 divide the metal bridge 35 into metal wiring parts 35a electrically connected to the respective electrodes 32 and metal wiring parts 35b electrically connected to the respective electrodes 33.

Of the electrodes 32 and 33 electrically connected to the metal bridge 35 via the contact holes 37 and 38, respectively, only those electrodes 32 arranged along the Y-axis are connected to each other along the Y-axis via the metal bridge 35. The electrodes 32 and 33 are insulated from each other by disconnecting lines 39 provided between the electrodes 32 and 33, and those ones of the electrodes 32 which are adjacent to each other along the X-axis via electrodes 33 are insulated from each other by disconnecting lines 39 provided between the electrodes 32 and 33.

Therefore, the electrodes 32, which are arranged along the Y-axis, are connected to each other along the Y-axis via the metal bridge 35. Further, the electrodes 33, which are arranged along the X-axis, are connected to each other along the X-axis via the connecting wires 36.

A column of electrodes 32 connected along the Y-axis and a row of electrodes 33 connected along the X-axis intersect each other at each connection part between electrodes 32 and 33 as a column of Y electrodes that extends along the Y-axis and a row of X electrodes that extends along the X-axis. It should be noted that a plurality of columns of electrodes 32, i.e., Y electrodes, are arranged along the X-axis and a plurality of rows of electrodes 33, i.e., X electrodes, are arranged along the Y-axis.

When the electrodes 32 are used as drive electrodes (driving electrodes, transmitting electrodes), the electrodes 33 are used as sense electrodes (detecting electrodes, receiving electrodes), or vice versa. That is, when the columns of electrodes 32 are used as drive lines, the rows of electrodes 33 are used as sense lines, or vice versa.

<Position Detecting Operation>

The following describes a position detection operation in which the touch panel detects the position of an object to be detected.

(a) of FIG. 7 is a diagram schematically showing lines of electric force of the sensor electrode 31 with no object to be detected being in contact with the substrate 20, and (b) of FIG. 7 is a diagram schematically showing lines of electric force of the sensor electrode 31 with an object to be detected being in contact with the substrate 20. It should be noted that (b) of FIG. 7 shows lines of electric force, for example, with a fingertip being in contact with the substrate 20 as an object to be detected.

It should be noted that the metal bridge 35 is electrically connected to the sensor electrode 31 and does not affect lines of electric force of the sensor electrode 31. Therefore, (a) and (b) of FIG. 7 omit to illustrate the light blocking layer 22, the insulating layer 34 and the metal bridge 35 of the touch panel layer 23, the CF layer 26, the counter electrode 27, etc.

To the electrodes 32 and 33, drive voltages are applied from a driving circuit section (not illustrated), respectively. When either the electrodes 32 or 33 (e.g., the electrodes 33) are used as drive electrodes, the other electrodes (e.g., the electrodes 32) are used as sense electrodes.

Application of drive voltages to these electrodes 32 and 33 causes capacitors to be formed via the insulating substrate 21, the insulating layer 25, etc. between the electrodes 32 and 33, so that such lines of electric force as those shown in (a) of FIG. 7 are formed.

In such a state, bringing a fingertip 70, i.e., a conductor, into contact with the surface of the substrate 20 as an object to be detected, as shown in (b) of FIG. 7, causes a capacitor 71 to be formed between the human body (fingertip 70) and the electrodes 32 and 33, with the result that some of the lines of electric force are grounded via the fingertip 70. This indicates that there is a big change in capacitance between the electrodes 32 and 33 in the part touched by the fingertip 70, and the position touched by the fingertip 70 can be detected by detecting the change.

That is, the X-coordinate of the fingertip 70 on the surface of the substrate 20 is detected by the electrodes 32 constituting electrode 32 columns extending along the Y-axis and arranged along the X-axis. Further, the Y-coordinate of the fingertip 70 on the surface of the substrate 20 is detected by the electrodes 33 constituting electrode 33 rows extending along the X-axis and arranged along the Y-axis.

<Driving Circuit>

In the present embodiment, the position detecting circuit for detecting the coordinate position of an object to be detected may be a well-known circuit (e.g., see Patent Literature 4), but is not to be particularly limited.

As an example of a position detecting circuit of the liquid crystal display device 1 according to the present embodiment, the following describes, with reference to FIGS. 8 through 11, an example of a position detecting circuit of a reciprocally-capacitive type on which most capacitive touch panels are based.

Figure 8:
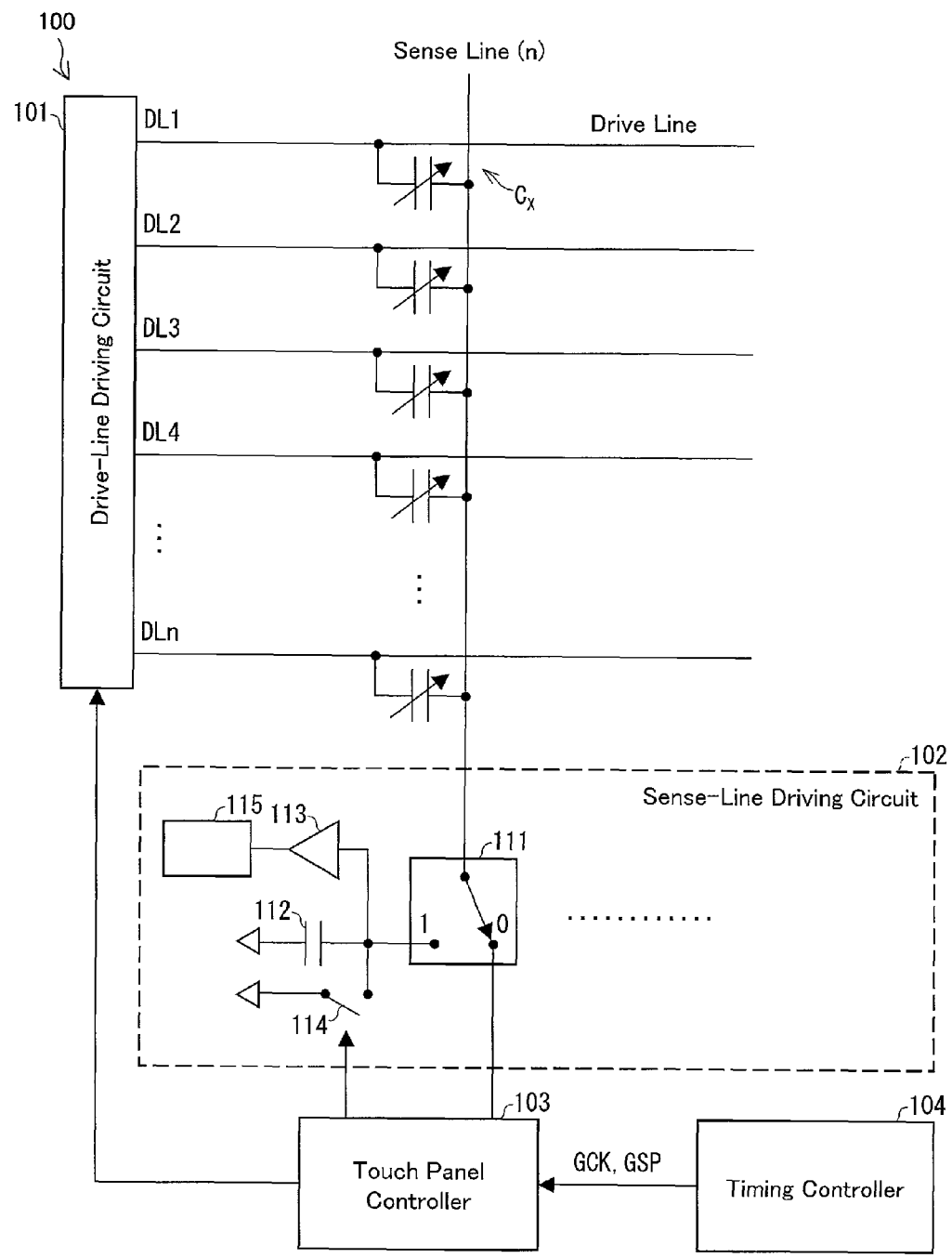
FIG. 8 is a circuit diagram showing an example of a position detecting circuit of the liquid crystal display device according to Embodiment 1.

FIG. 8 is a circuit diagram showing an example of a position detecting circuit of the liquid crystal display device 1 according to the present embodiment.

In FIG. 8, the rows of electrodes 33 as shown in FIGS. 3 and 4 correspond to drive lines DL1, DL2, . . . , and DLn, and the columns of electrodes 32 as shown in FIGS. 3 and 4 correspond to sense lines (n), respectively.

Formed at an intersection between each of the drive lines DL1, DL2, . . . , and DLn and each of the sense lines (n) is a variable capacitor whose capacitance ($C_x$) varies by contact with an object to be detected such as the fingertip 70.

A position detecting circuit 100 shown in FIG. 8 includes a drive-line driving circuit 101, a sense-line driving circuit 102, a touch panel controller (control circuit of the touch panel) 103, and a timing controller 104 of the liquid crystal panel 2.

As shown in FIG. 8, the drive-line driving circuit 101 applies signals of predetermined waveforms to the drive lines DL1, DL2, . . . , and DLn in sequence. The drive-line driving circuit 101 applies signals of predetermined waveforms in an order from the drive line DL1 to the drive line DLn by sequential driving.

Figure 9:
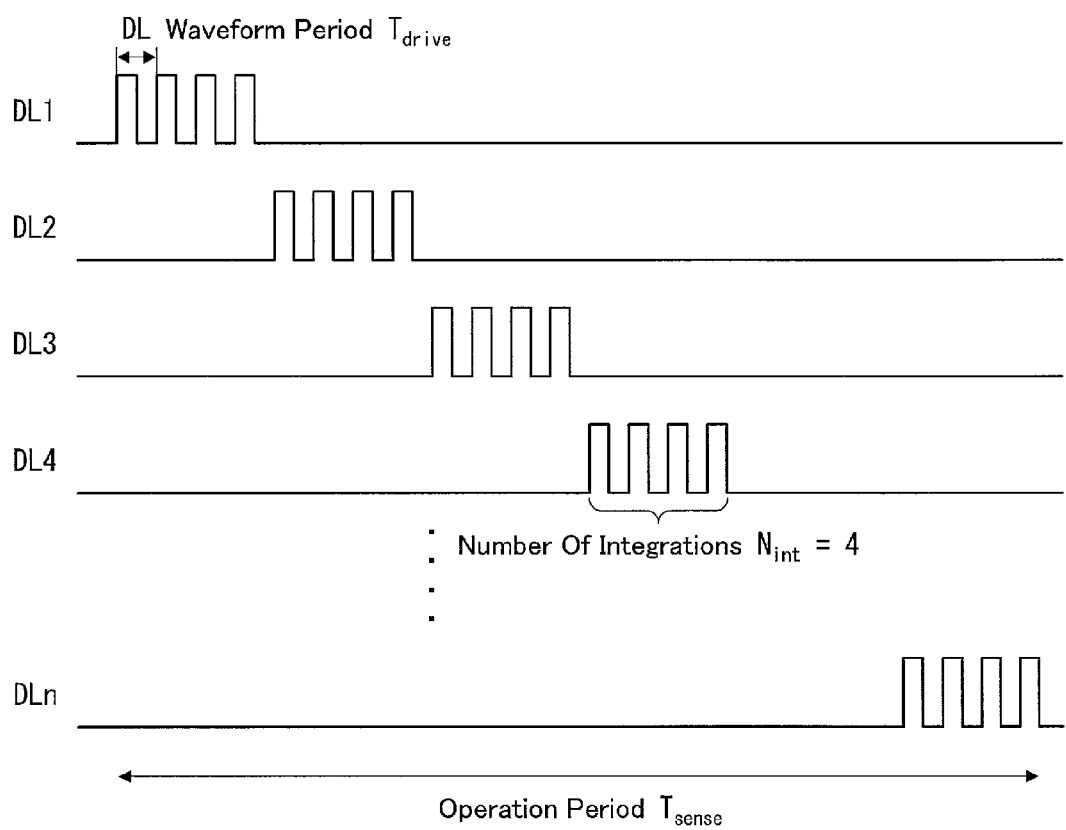
FIG. 9 is a timing chart showing signals applied to drive lines, respectively, of the liquid crystal display device according to Embodiment 1.

FIG. 9 is a timing chart showing signals applied to the drive lines DL1, DL2, . . . , and DLn, respectively.

Further, the sense-line driving circuit 102 includes, for each sense line (n), a sampling circuit 111, a storage capacitor 112, an output amplifier 113, a reset switch 114, and measuring means 115.

The touch panel controller 103 receives a gate clock signal GCK and a gate start pulse GSP from the timing controller 104 of the liquid crystal panel 2, determines whether the liquid crystal panel 2 is in a writing period or in a pause period, and, in a case where the liquid crystal panel 2 is in a pause period, sends, to the drive-line driving circuit 101, a start signal for starting to apply signals of predetermined waveforms to the drive lines DL1, DL2, . . . , and DLn in sequence.

Further, the touch panel controller 103 outputs a sampling signal and a reset signal to the sampling circuit 111 and the reset switch 114, respectively.

Figure 10:
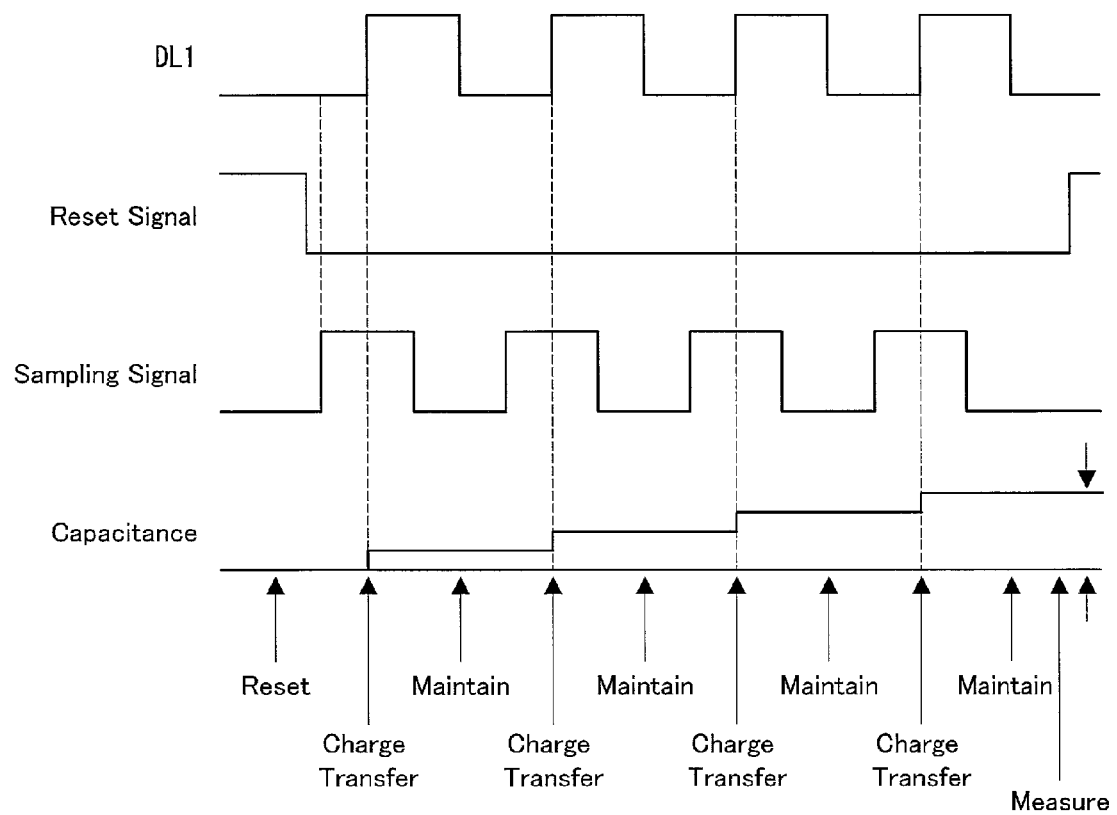
FIG. 10 is a timing chart showing a timing of driving of an in-cell touch panel of the liquid crystal display device according to Embodiment 1.

FIG. 10 is a timing chart showing a timing of driving of the in-cell touch panel of the liquid crystal display device 1.

In FIG. 10, at a timing before the signal applied to the drive line DL1 and the sampling signal are raised to a high level, the reset signal is raised to a high level. This causes the storage capacitor 112 to be grounded, so that the storage capacitor 112 is reset.

Then, after the reset signal has been dropped to a low level and before the signal applied to DL1 is raised to a high level, the sampling signal is raised to a high level. This causes the sampling circuit 111 to shift in state from 0 to 1, so that the output from the sense line (n) is supplied to the storage capacitor 112 via the sampling circuit 111.

When the signal applied to the drive line DL1 is raised to a high level with the sampling signal at a high level, there occurs a charge transfer toward the storage capacitor 112, so that it is possible to, by dropping the sampling signal to a low level with the signal applied to the drive line DL1 being at a high level, maintain (hold) the charge even when the signal applied to the drive line DL1 is dropped to a low level.

In the present embodiment, since the number of integrations $N_{int}$ is 4 as shown in FIG. 8, the capacitance is measured by the measuring means 115 via the output amplifier 113 after the charge transfer and maintenance (hold) have been repeated four times.

After the measurement, the reset signal is raised again to a high level. This causes the storage capacitor 112 to be grounded, so that the storage capacitor 112 is reset.

FIG. 11 is a diagram for explaining the states of the sampling circuit 111 and the reset switch 114 in each step.

As shown in FIG. 11, STEP A is a case where the whole reset is performed. In this case, the sampling circuit 111 is in a state of 0. This causes the sense line (n) to be grounded, and the reset switch 114 causes the storage capacitor 112 to be grounded, so that the storage capacitor 112 is reset.

STEP B is a dead time (DEADTIME) between a point in time where the reset signal was dropped to a low level and a point in time where the sampling signal is raised to a high level.

STEP C represents a charge transfer state in which the sampling circuit 111 is in a state of 1 and the output from the sense line (n) is supplied to the storage capacitor 112 via the sampling circuit 111.

STEP D is a dead time (DEADTIME) between a point in time where the sampling signal was dropped to a low level and a point in time where the signal applied to the drive line DL1 is dropped to a low level.

In STEP E, the sampling circuit 111 is in a state of 0, and the sense line (n) and the storage capacitor 112 are maintained (held) electrically separated from each other.

Then, after STEPS B to E have been repeated four times, the capacitance is measured by the measuring means 115 via the output amplifier 113 in STEP F, with the sampling circuit 111 maintained in a state of 0 and with the sense line (n) and the storage capacitor 112 electrically separated from each other.

<Parasitic Capacitance>

Next, effects on the performance of the touch panel by parasitic capacitances that are formed between the sensor electrode (position detecting electrode) and the counter electrode are described with reference to FIGS. 12 through 14.

Figure 12:
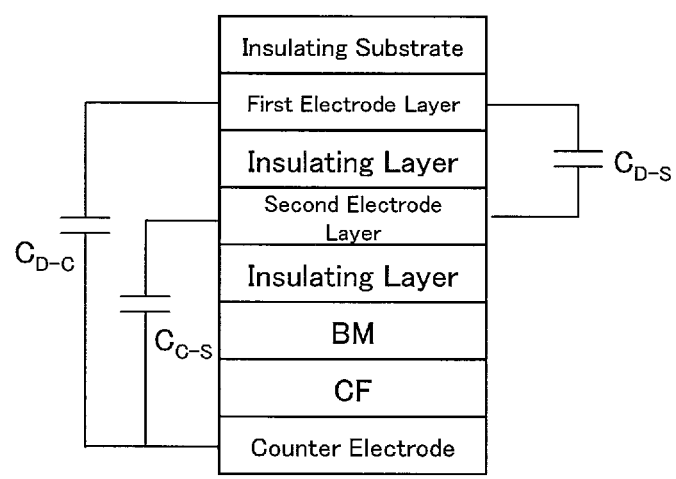
FIG. 12 is a cross-sectional view schematically showing a conventional display panel.

FIG. 12 is a cross-sectional view schematically showing a conventional display panel. FIG. 13 is a diagram showing a driving circuit of a capacitive touch panel. FIG. 14 is a set of simulated waveform charts schematically showing the operation of the driving circuit. It should be noted that for the simulation, MSC Software's "Patran" (product name) was used.

Figure 13:
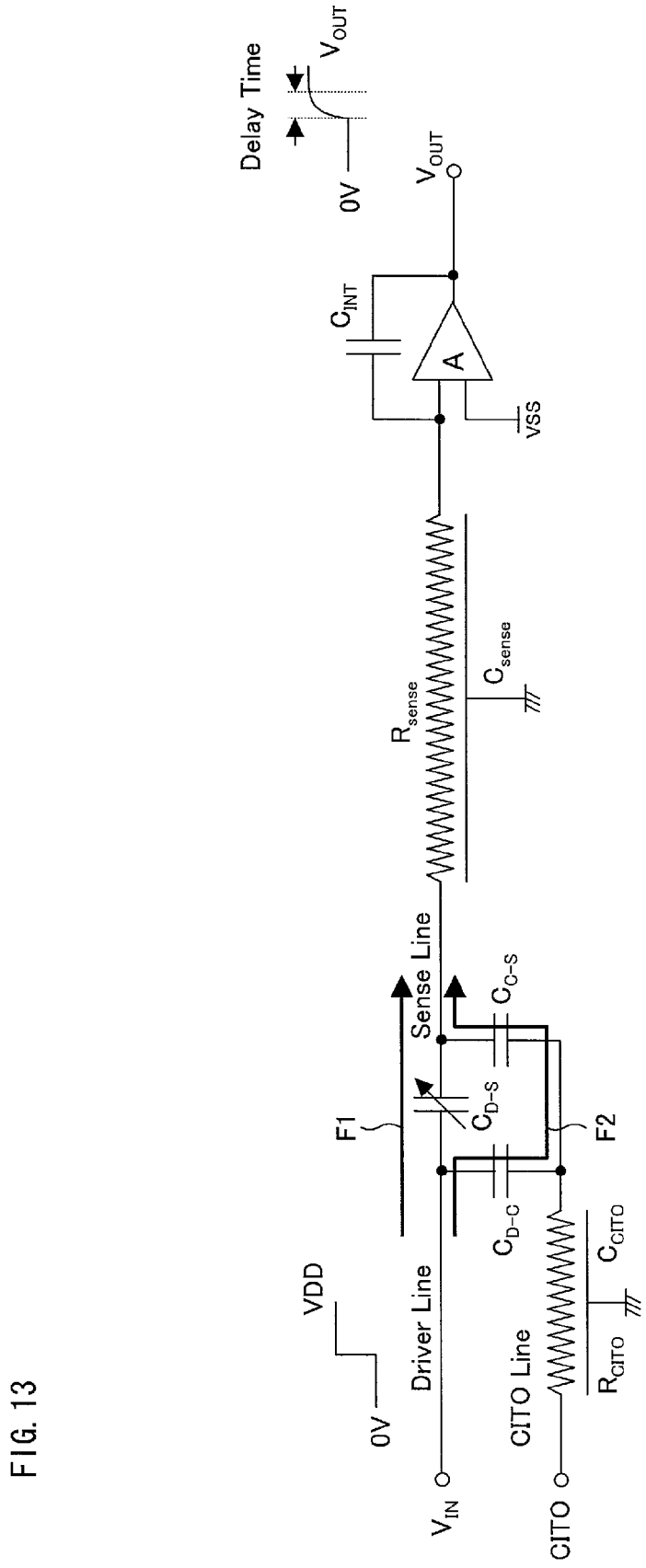
FIG. 13 is a diagram showing a driving circuit of a capacitive touch panel.

In FIGS. 12 and 13, $C_{D-S}$ is a touch-detecting capacitor that is formed between a drive electrode (e.g., a first electrode layer) and a sense electrode (e.g., a second electrode layer) of the touch panel, and since its capacitance varies depending on whether or not a fingertip or the like is in contact with the touch panel, the capacitor is described as a variable capacitor.

It should be noted that in FIG. 13, the drive line corresponds to the output terminal of a drive electrode, the sense line corresponds to the output terminal of a sense electrode, and the CITO line corresponds to the output terminal of the counter electrode.

The position detecting circuit has an integrated circuit constituted by an operational amplifier and a capacitor $C_{INT}$, and an output indicating whether or not a fingertip or the like is in contact is obtained as $V_{OUT}$ from this integrated circuit. $C_{D-C}$ is a parasitic capacitor that is formed between the drive electrode and the counter electrode, and $C_{C-S}$ is a parasitic capacitor that is formed between the sense electrode and the counter electrode. $R_{sence}$ is the resistance of the position detecting electrode (sense electrode), and $R_{CITO}$ is the resistance of the counter electrode.

In a structure (so-called out-cell type) where the touch panel is provided outside the display panel, the dominant current pathway is a pathway indicated by the arrow F1 in FIG. 13. In an in-cell type, as in the present embodiment, where the touch panel is provided inside the display panel (in the present embodiment, the liquid crystal panel 2), there exists a further parasitic current pathway indicted by the arrow F2.

Figure 14:
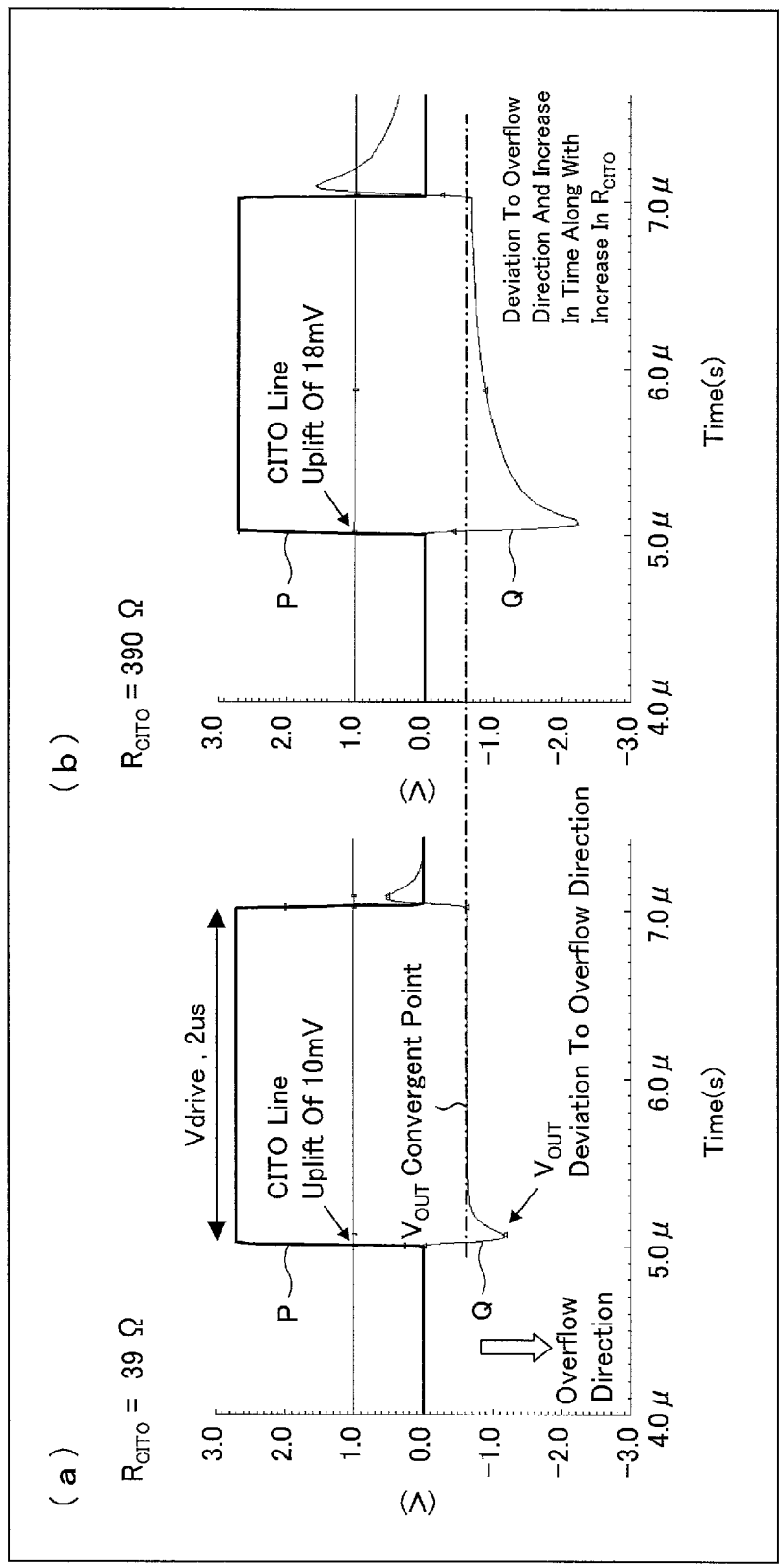
FIG. 14 is a set of simulated waveform charts schematically showing the operation of the driving circuit shown in FIG. 13.

In (a) and (b) of FIG. 14, the thick line P indicates the voltage waveform of the drive line, and the thin line Q indicates the voltage waveform of the output voltage $V_{OUT}$. As shown in (a) and (b) of FIG. 14, it is shown that since in a case where the resistance of the counter electrode is high (e.g., $R_{CITO}$=390Ω), the CR time constant (capacitor×resistor) increases due to the effect of the parasitic current pathway indicated by the arrow F2 in FIG. 13, it takes a long time to converge to its original output voltage (see (b) of FIG. 14). This causes an increase in integral time and accordingly a reduction in the number of integrals, thus causing a reduction in SN ratio (signal-to-noise ratio). This causes deterioration in detection performance of the touch panel.

Therefore, in the case of an in-cell touch panel, it is necessary to, in order to enhance the detection performance of the touch panel, to lower any of the following: the capacitance of the parasitic capacitor $C_{D-C}$ that is formed between the drive electrode and the counter electrode, the capacitance of the parasitic capacitor $C_{C-S}$ that is formed between the sense electrode and the counter electrode, and the resistance of the position detecting electrode (e.g., the resistance $R_{sence}$ of the sense electrode), and the resistance $R_{CITO}$ of the counter electrode.

For this purpose, the present embodiment distances the electrodes 32 and 33 and the counter electrode 27 as much as possible from each other by forming the electrodes 32 and 33 in the same plane. This makes it possible to reduce the parasitic capacitance between the sensor electrode and the counter electrode in comparison with a conventional case where the X electrodes and the Y electrodes that are used as the drive electrodes and the sense electrodes are provided separately as the first electrode layer and the second electrode layer.

For this reason, the present embodiment makes it possible to provide: an in-cell touch panel which is high in position detection performance and capable of carrying out a stable position detecting operation; and a substrate 20 that serves as a touch panel substrate which is used in such an in-cell touch panel and which is high in position detection performance and capable of carrying out a stable position detecting operation.

Further, according to the present embodiment, forming the electrodes 32 and 33 in the same plane allows the electrodes 32 and 33 to be formed of the same material at the same time. This makes it possible to reduce processing costs.

<Relationship Between the Area of the Sensor Electrode and Detection Signals>

Next, a relationship between the area of the sensor electrode (position detecting electrode) and detection signals (position detection signals) is described below with reference to FIGS. 15 through 18.

FIGS. 15 through 18 are each a diagram collectively showing the conditions of electrodes and simulated waveforms of detection signals.

In each of these simulations, as shown in FIGS. 15 through 18, respectively, measurements were performed on position detection signals obtained in a case where a cover glass was provided with a sense electrode and a drive electrode and a counter electrode made of ITO (counter ITO electrode) was placed opposite the sense and drive electrodes with an insulating layer sandwiched therebetween.

As is evident from the results shown in FIGS. 15 through 18, in the case of a sensor electrode formed on a counter ITO electrode, the lower the density of the sensor electrode (density of the sense and drive electrodes) is, the lower the magnitude (intensity) of the detection signal is.

Figure 15:
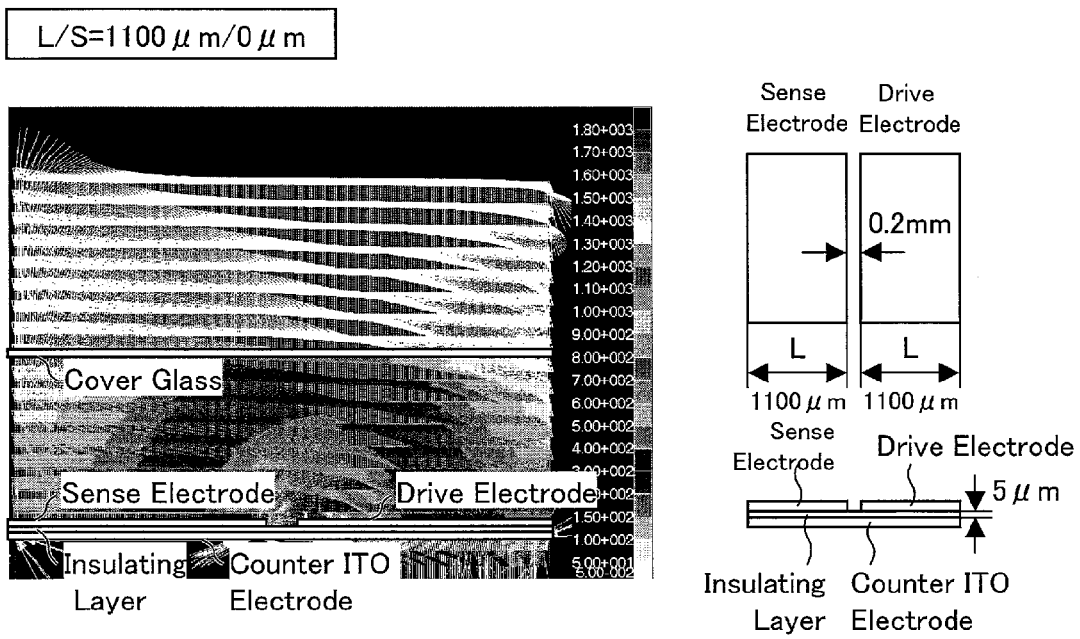
FIG. 15 is a diagram collectively showing the conditions of electrodes in a touch panel substrate and simulated waveforms of detection signals.
Figure 16:
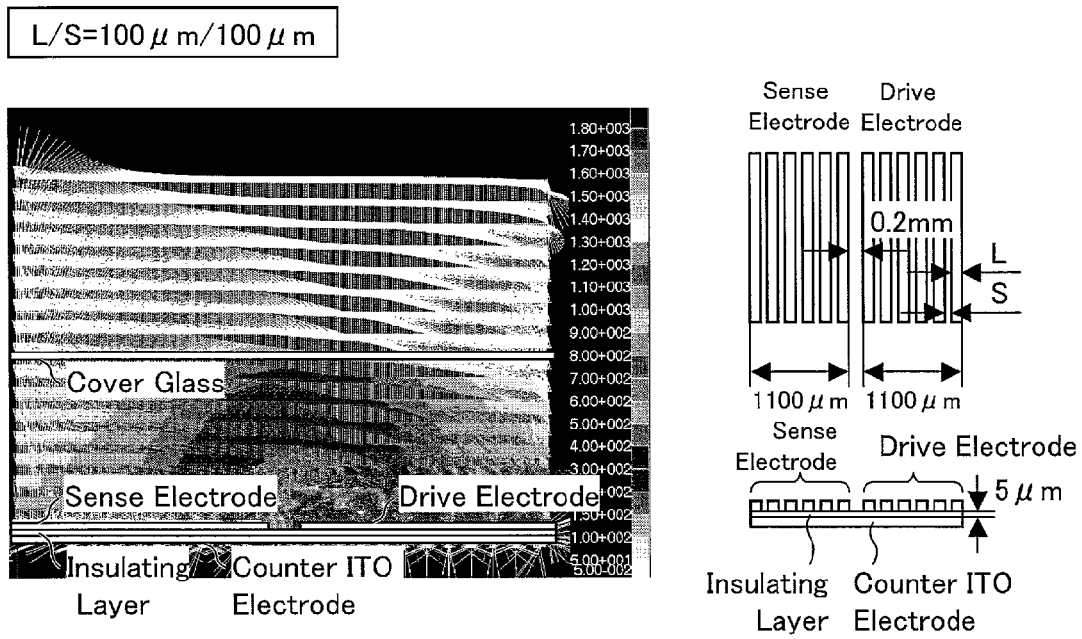
FIG. 16 is another diagram collectively showing the conditions of electrodes in a touch panel substrate and simulated waveforms of detection signals.
Figure 17:
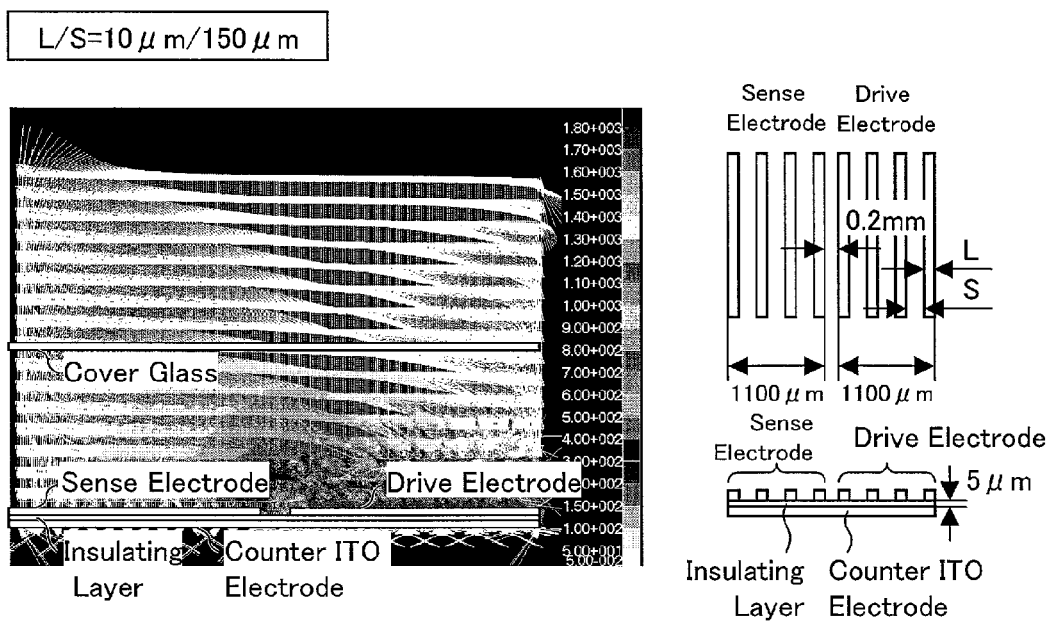
FIG. 17 is a diagram collectively showing the conditions of electrodes in a touch panel substrate and simulated waveforms of detection signals.
Figure 18:
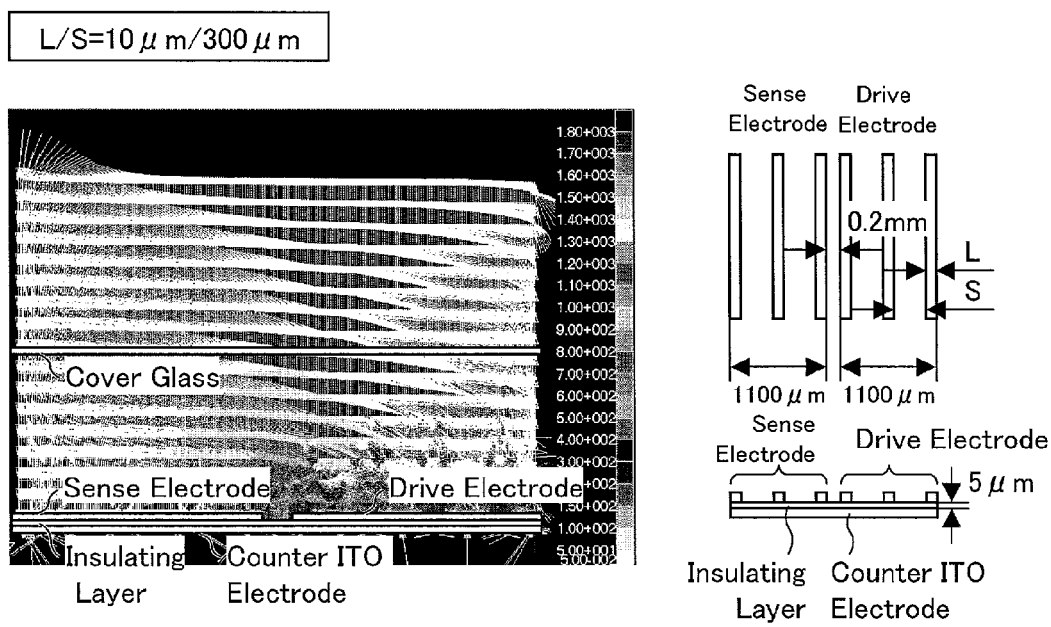
FIG. 18 is a diagram collectively showing the conditions of electrodes in a touch panel substrate and simulated waveforms of detection signals.

Therefore, in order for the detection signal to ensure its magnitude, it is desirable that the sensor electrode be in a solid planar-shaped pattern as shown in FIG. 15.

Further, in such a case where the sensor electrode is in a solid planar-shaped pattern, it is desirable that the sensor electrode be in the form of a transparent electrode, so that an aperture ratio for display can be ensured.

However, an electrode made of a transparent conductive material is higher in resistance than that a metal electrode. Further, a metal thin-film electrode made of graphene or the like is thinned for transparency, and as such, is higher in resistance than a metal electrode that is in a non-transparent state.

For this reason, in the present embodiment, as mentioned above, the electrodes 32 and 33 are electrically connected via the insulating layer 34 to the metal bridge 35 that is a grid of metal wires. This makes it possible to reduce the resistance of the electrodes 32 and 33 while ensuring the optical transmittance and the area of the transparent region. Therefore, mounting the substrate 20 in a display panel makes it possible to reduce the resistance of the electrodes 32 and 33 while ensuring the aperture ratio of the display panel.

Further, since the resistance of the electrodes 32 and 33 can be reduced as mentioned above, the CR time constant can be reduced.

Therefore, the present embodiment makes it possible to provide an in-cell touch panel and a touch panel substrate that are high in position detection performance and capable of carrying out a stable position detecting operation.

Further, since the present embodiment can distance the electrodes 32 and 33 and the counter electrode 27 as much as possible from each other by forming the electrodes 32 and 33 in the same plane, a parasitic capacitance between the electrodes 32 and 33 and the counter electrode 27 can be reduced even in a case where the electrodes 32 and 33 are in a planar-shaped pattern. This makes it possible to reduce the parasitic capacitance while ensuring the magnitude of the detection signal.

Further, since the metal bridge 35 is in the shape of wires (i.e., in a linear-shaped pattern), the parasitic capacitance between the metal bridge and the counter electrode 27 is small. For this reason, providing the metal bridge 35 so that it is closer to the counter electrode 37 than the sensor electrode 31 as shown in FIGS. 1 and 2 makes it possible to provide an in-cell touch panel and a touch panel substrate that are high in position detection performance and capable of carrying out a stable position detecting operation.

<Method for Producing a Liquid Crystal Panel 2>

The following describes a method for producing a liquid crystal panel 2 according to the present embodiment.

<Process for Fabricating a Substrate 10>

The substrate 10 is, for example, an active-matrix substrate. The substrate 10 is fabricated by forming components such as gate lines, source lines, TFTs, and pixel electrodes on an insulating substrate 11 by known techniques and then forming an alignment film as needed.

Such an active-matrix substrate can be produced by a process that uses known techniques. As such, the process is not described in detail here.

<Process for Fabricating a Substrate 20>

Figure 19:
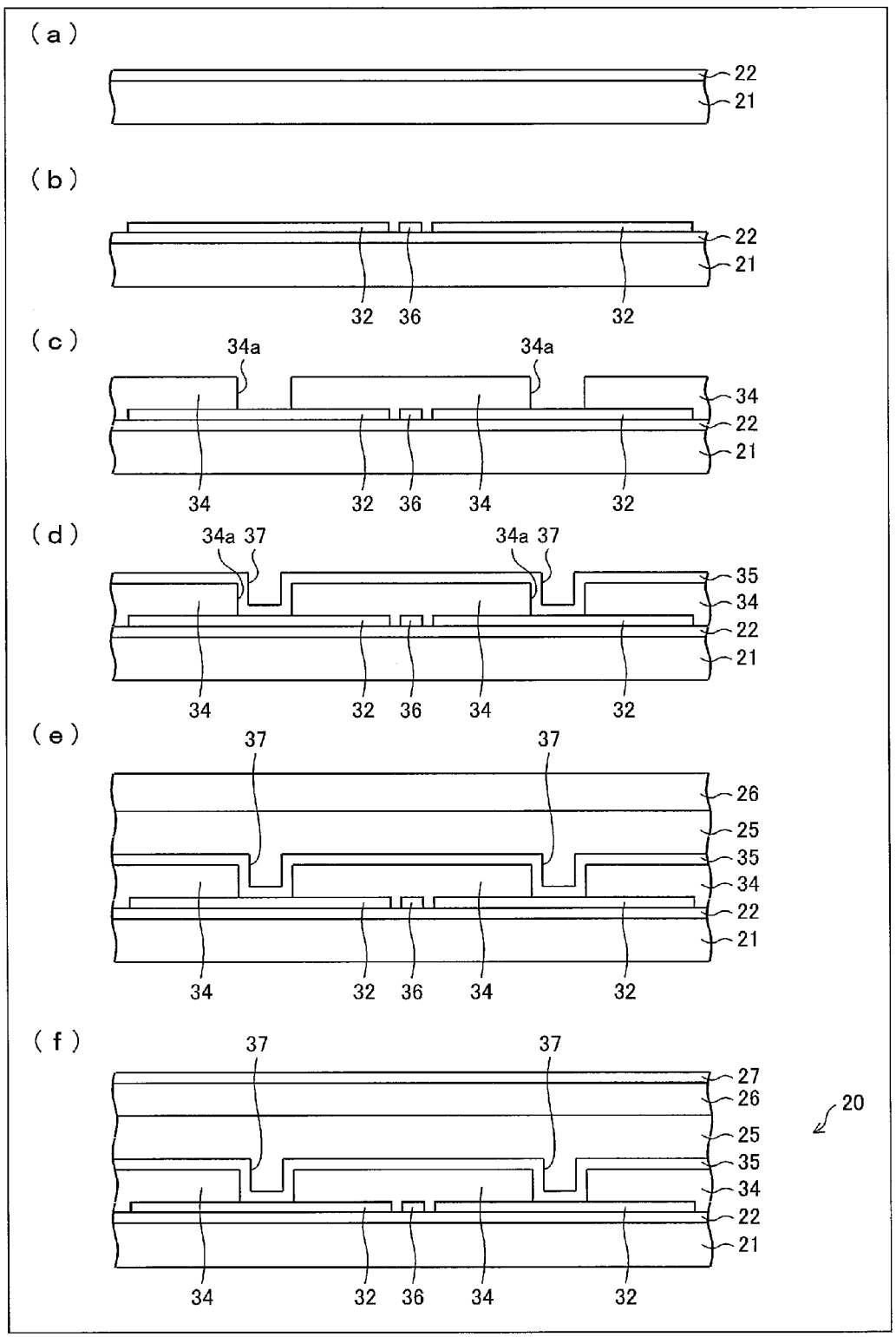
FIG. 19 is a set of cross-sectional views (a) through (f) showing steps of a process for fabricating a touch panel substrate according to Embodiment 1, with the steps arranged in process sequence.

The following describes, with reference to (a) through (f) of FIG. 19, a process for fabricating the substrate 20. (a) through (f) of FIG. 19 are cross-sectional views showing steps of a process for fabricating the substrate 20, with the steps arranged in process sequence. (a) through (f) of FIG. 19 each correspond to a cross-section as taken along the line Y1-Y1 in FIG. 4.

First, as shown in (a) of FIG. 19, a light blocking layer 22 (BM) is formed on an insulating substrate 21 by forming a film made of a light blocking material on the insulating substrate 21 and carrying out patterning with respect to the film.

Examples of the insulating substrates 11 and 21 include a glass substrate, a plastic substrate, etc.

Further, the light blocking layer 22 can be made, for example, of a light blocking resin. Examples of the material for the light blocking layer 22 include a photosensitive resin having a black pigment or the like dispersed therein. The photosensitive resin can be a publicly-known photosensitive resin such as an acrylic photosensitive resin.

Further, the light blocking layer 22 can be formed by a well-known method. The light blocking layer 22 can be formed, for example, by (i) applying a photosensitive resin having a black pigment dispersed therein to an insulating substrate 21 by spin coating, (ii) exposing, through a photolithographic mask the photosensitive resin thus applied, and then (iii) developing the photosensitive resin.

The light blocking layer 22 may alternatively be formed by (i) forming, on a surface of an insulating substrate 21, a laminate of dry films including a black resin film, (ii) removing a cover film for transfer of the black resin film, (iii) exposing the black resin film through a photolithographic mask, and then (iv) developing the black resin film.

During this step, the light blocking layer 22 is so patterned that when it is included in the liquid crystal panel 2, the light blocking layer 22 will cover switching elements and wires (for example, gate lines, source lines, and auxiliary capacitor lines) on the substrate 10.

Next, a film made of a transparent conductive material or a conductive material such as a metal material (for example, graphene or carbon) that is transparent in the form of a thin film on the insulating substrate 21 by sputtering. Then, a layer of photoresist (not illustrated) is formed, and patterning is carried out with respect to the film by, for example, photolithography. This causes electrodes 32 and 33 and connecting wires 36 (see FIGS. 3 and 4) to be formed as shown in (b) of FIG. 19 on the insulating substrate 21 on which the light blocking layer 22 has been formed.

Examples of the transparent conductive material include ITO, IZO, zinc oxide, and tin oxide as mentioned above.

The respective thicknesses and electrode areas of the electrodes 32 and 33 may be determined as appropriate depending on the respective electrode materials used, and are therefore not particularly limited. In a case where the electrodes 32 and 33 are made of a transparent conductive material, the respective thicknesses and electrode areas of the electrodes 32 and 33 can be selected as have conventionally been done, for example.

In a case where the electrodes 32 and 33 are made of a conductive material such as a metal material (for example, graphene or carbon) that is transparent in the form of a thin film, it is desirable that the respective thicknesses of the electrodes 32 and 33 be selected so that the electrodes 32 and 33 are transparent. This ensures the optical transmittance of the electrodes 32 and 33 and the area of transparent regions of the electrodes 32 and 33.

Next, an insulating layer 34 is formed by, for example, chemical vapor deposition (CVD) or spin coating so as to entirely cover the plane of the insulating substrate 21 (on which components such as the electrodes 32 and 33 are formed) in which plane the electrodes 32 and 33 are formed. Then, a layer of photoresist (not illustrated) is formed on the insulating layer 34, and patterning is carried out with respect to the layer of photoresist by, for example, photolithography so that as shown in (c) of FIG. 19, openings 34a are formed in the insulating layer 34 to serve as contact holes.

Examples of the material for the insulating layer 34 include (i) organic insulating materials (photosensitive resins) such as acrylic resin, epoxy resin, polyurethane resin, and polyimide resin, and (ii) insulating, transparent inorganic insulating materials such as a SiNx film (silicon nitride film). Among others, the material for the insulating layer 34 is preferably a resin, such as a photosensitive resin, which includes an organic insulating material. The insulating layer 34 is therefore preferably an organic insulating layer including a so-called organic insulating film.

An organic insulating film can be thicker than an inorganic insulating film, and is lower in relative permittivity than an inorganic insulating film. Silicon nitride, for example, has a relative permittivity $\in$ of 6.9, whereas acrylic resin has a relative permittivity $\in$ of 3.7. Further, an organic insulating film is so high in transparency that it can be made thick.

Therefore, in a case where the insulating layer 34 is an organic insulating layer, it can be thick and is low in relative permittivity. Both of these characteristics allow the parasitic capacitance between the sensor electrode 31 and the counter electrode 27 to be reduced.

If the insulating layer 34 is excessively thin, there will be an increase in parasitic capacitance between the sensor electrode 31 and the counter electrode 27. If the insulating layer 34 is excessively thick, it will be difficult to form the contact holes 37 and 38. It is therefore preferable that the insulating layer 34 have a thickness within a range of 1 μm to 3.5 μm.

Next, on the insulating layer 34 in which the openings 34a have been formed to serve as contact holes, metal wires made of metal materials such as (i) low-resistance metals (for example, titanium (Ti), copper (Cu), gold (Au), aluminum (Al), tungsten (W), zinc (Zn), nickel (Ni), tin (Sn), chromium (Cr), molybdenum (Mo), and tantalum (Ta)) and (ii) metal compounds and metal silicides thereof are formed. During this step, the metal wires made of the metal materials are formed inside the openings 34a as well so that a metal bridge 35 made of the metal wires and contact holes 37 and 38 are formed as shown in (d) of FIG. 19.

After that, patterning is carried out with respect to the metal bridge 35 by, for example, photolithography so that disconnecting lines 39 are formed across the metal bridge 35 as shown in FIGS. 3 and 4. For lower resistance, it is desirable that the metal bridge 35 have a thickness of 100 nm or larger for low resistance, and for securement of the flatness of the counter electrode 27 and a reduction in processing costs, it is desirable that the metal bridge 35 have a thickness of 300 nm or smaller.

The method for forming disconnecting lines 39 across the metal bridge 35 is not limited to patterning that involves photolithography or the like. The method is not particularly limited as long as the metal bridge 35 can be partially disconnected (electrically separated).

Next, an insulating layer 25 is formed as shown in (e) of FIG. 19 to entirely cover the plane of the insulating substrate 21 (on which the metal bridge 35 is formed) in which plane these electrodes 32 and 33 are formed.

The material for the insulating layer 25 and the method for forming the insulating layer 25 can be, for example, similar to the material for the insulating layer 34 and the method for forming the insulating layer 34, respectively.

As with the insulating layer 34, in a case where the insulating layer 25 includes an organic insulating layer, it can be thick and is low in relative permittivity. Both of these characteristics allow the parasitic capacitance between the sensor electrode 31 and the counter electrode 27 to be reduced.

As with the insulating layer 34, if the insulating layer 25 is excessively thin, there will be an increase in parasitic capacitance between the sensor electrode 31 and the counter electrode 27. If the insulating layer 25 is excessively thick, it will be difficult, in a case where contact holes are formed in the insulating layer 25 as described in an embodiment below, to form such contact holes. It is therefore preferable that the insulating layer 25 have a thickness in a range of 1 μm to 3.5 μm, as with the insulating layer 34.

Next, on the insulating layer 25 as shown in (e) of FIG. 19, a CF layer 26 having a plurality of colors such as red (R), green (G), and blue (B) is formed on the insulating layer 25 as shown in (e) of FIG. 19 by patterning that involves photolithography or by a known method such as an ink-jet printing method and a laminating method.

After that, a transparent conductive film including a transparent conductive material such as ITO, IZO, zinc oxide, and tin oxide on the CF layer 26 as shown in (f) of FIG. 19 by sputtering or the like to provide a counter electrode 27.

Finally, an alignment film (not illustrated) is formed on the counter electrode 27 as needed. This is how a substrate 20 can be produced.

The respective thicknesses, for example, of the light blocking layer 22, the CF layer 26, the counter electrode 27, and the alignment film are not particularly limited, and can therefore be selected as have conventionally been done.

<Process for Joining the Substrates on Top of Each Other>

The following describes a process for joining the substrates 10 and 20 on top of each other (that is, a process for assembling the liquid crystal panel 2).

First, a seal material 60 (see FIG. 1) in a frame pattern having a liquid crystal injection inlet is applied to one of the substrates 10 and 20 by screen printing or the like or by use of a dispenser or the like, and then spherical spacers which are made of plastic, silicon dioxide, or the like and which have a diameter equivalent to the thickness of a liquid crystal layer 50 are dispersed onto the other one of the substrates 10 and 20. Instead of the spacers being dispersed, spacers may be formed on the counter electrode 27 of the substrate 20 or on metallic wires of the substrate 10.

Next, the substrates 10 and 20 are joined on top of each other. After the seal material 60 has been cured, a liquid crystal material is injected, for example, by a vacuum injection method into a space defined by the substrates 10 and 20 and the seal material 60. After that, a UV cure resin is applied to the liquid crystal injection inlet, and the UV cure resin is irradiated with UV radiation to seal in the liquid crystal material, whereby a liquid crystal layer 50 is formed.

Alternatively, onto the substrate to which the seal material 60 has been applied in a frame pattern, a liquid crystal material is dropped by a drop method so that a space defined by the seal material 60 is filled with the liquid crystal material, and then the substrates 10 and 20 are joined on top of each other, whereby a liquid crystal layer 50 is formed between the substrates 10 and 20.

Usable examples of the seal material 60 include: an ultraviolet curing or thermosetting resin containing electrically conductive particles, a black pigment and the like (not illustrated); and an ultraviolet curing and thermosetting resin. Usable examples of the electrically conductive particles include gold beads.

This is how a liquid crystal panel 2 according to the present embodiment can be produced.

<Modifications>

The following describes modifications of individual constituent elements of the electro-optic device according to the present embodiment.

<Direction of Connection by Connecting Wires 36>

The present embodiment has been described by taking, as an example, a case where as shown in FIGS. 3 and 4, electrodes 33 arranged along the X-axis are connected to each other via connecting wires 36 formed on the same level as the electrodes 33.

The present embodiment is, however, not limited to such an example, and may be configured such that electrodes 32 arranged along the Y-axis are connected to each other via connecting wires 36 formed on the same level as the electrodes 32 and electrodes 33 arranged along the X-axis are in an isolated pattern.

Therefore, either the electrodes 32 or the electrodes 33 may be in an isolated pattern. However, in a case where either the electrodes 32 or the electrodes 33 are connected to each other via transparent connecting wires 36, those electrodes that are arranged along a long side of the insulating substrate 21 are preferably in an isolated pattern. This configuration can reduce a conductive area where electricity travels only through the transparent connecting wires 36, and can also reduce the resistance of the sensor electrode 31. The above configuration can consequently reduce the CR time constant.

<Insulating Layer 34>

The present embodiment is configured such that on the electrodes 32 and 33, the insulating film 34 is provided in a solid state all over a surface of the insulating substrate 21 over which the touch panel layer 23 is stacked, in such a way as to entirely cover these electrodes 32 and 33.

However, the present embodiment is not limited to such a configuration. The insulating layer 34 needs only be provided so as to prevent the electrodes 32 and the electrodes 33 from being electrically connected to each other via the metal bridge 35. Therefore, the insulating layer 34 needs only be formed at least between (i) the metal bridge 35 and (ii) the electrodes 32 and 33 and the connecting wires 36 (that is, at least in a region in plan view where the metal bridge 35 is provided).

<Connection by the Metal Bridge 35>

The present embodiment has been described by taking, as an example, a case where as shown in FIGS. 3 and 4, a disconnecting line 39 is formed, in plan view, between (i) each of the electrodes 32, which are arranged along the Y-axis, and (ii) an electrode 33 adjacent thereto along the X-axis, the disconnecting line 39 extending along the pattern of these electrodes 32 and 33.

However, the disconnecting lines 39 need only electrically disconnect the electrodes 32 and the electrodes 33 from each other so that no electricity travels between the electrodes 32 and the electrodes 33.

Therefore, the disconnecting lines 39 do not necessarily need to be formed between the respective patterns of the electrodes 32 and the electrodes 33. The disconnecting lines 39 need only be formed, in plan view, between the contact holes 37 and the contact holes 38 provided respectively for the electrodes 32 and the electrodes 33.

The present embodiment has been described by taking, as an example, a case where the electrodes 32 and the electrodes 33 are both electrically connected to the metal bridge 35 as shown in FIG. 3, FIG. 4, and (a) and (b) of FIG. 5.

However, the present embodiment may be configured such that of the electrodes 32 and the electrodes 33, only one group of electrodes that are not connected to each other via the connecting wires 36 (the electrodes 33 in the example shown in FIGS. 3 and 4) are electrically connected to a metal bridge 35 including a metal mesh.

In this case, with the insulating layer 34 provided between the metal bridge 35 and the other group of electrodes, the disconnecting lines 39 do not necessarily need to be provided between the electrodes 32 and the electrodes 33. For example, it is possible to electrically disconnect, for example, electrodes 32 from each other that are adjacent to each other along the X-axis with an electrode 33 therebetween.

Further, in this case, the disconnecting lines 39 need only be formed, in plan view, between contact holes 37 formed in respective electrodes 32 adjacent to each other along the X-axis with an electrode 33 therebetween.

<Disconnecting Lines 39>

The present embodiment has been described by taking, as an example, a case where a single disconnecting line 39 is formed between electrodes 32 and 33 adjacent to each other. However, the present embodiment needs only have at least one disconnecting line 39 formed between electrodes 32 and 33 adjacent to each other, and may therefore have two or more disconnecting lines 39 formed therebetween.

<Electro-optic Device>

The present embodiment has been described by taking, as an example, a case where a liquid crystal layer 30 serving as an electro-optic element (optically-modulated layer) is sandwiched between a pair of substrates 10 and 20. However, the present embodiment is not limited to such an example. The electro-optic element may alternatively be, for example, a dielectric liquid or an organic EL (electroluminescent) layer.

The display panel and display device according to the present embodiment are not limited to a liquid crystal panel and liquid crystal display device, and may therefore be, for example, (i) an organic EL display panel and organic EL display device, or (ii) an electrophoretic display panel and electrophoretic display device.

In a case where the liquid crystal panel 2 is replaced with a self-luminous display panel such as an organic EL display panel, the present embodiment, needless to say, does not need an illumination device such as the backlight 3.

The present embodiment has been described by taking, as an example, a case where, as described above, the touch panel substrate is a substrate that is used in a display panel and the electro-optic device is a display device.

However, the touch panel substrate can be applied in general to any electro-optic device that has an electro-optic element driving electrode and a position detecting electrode. For example, the electro-optic device may for example be a viewing angle control panel placed on a display panel or the like in an overlapping manner.

The present embodiment has been described by taking, as an example, a case where the substrate 10, which serves as a counter substrate, is a CF substrate. However, the present embodiment is not to be limited to such an example, and may alternatively have a CF substrate provided on the array substrate side.

[Embodiment 2]

Another embodiment of the present invention is described below with reference to FIGS. 20 through 22. For convenience of explanation, constituent elements of the present embodiment that are identical in function to their respective corresponding constituent elements used in Embodiment 1 are each assigned an identical reference sign, and as such, are not described here.

Figure 20:
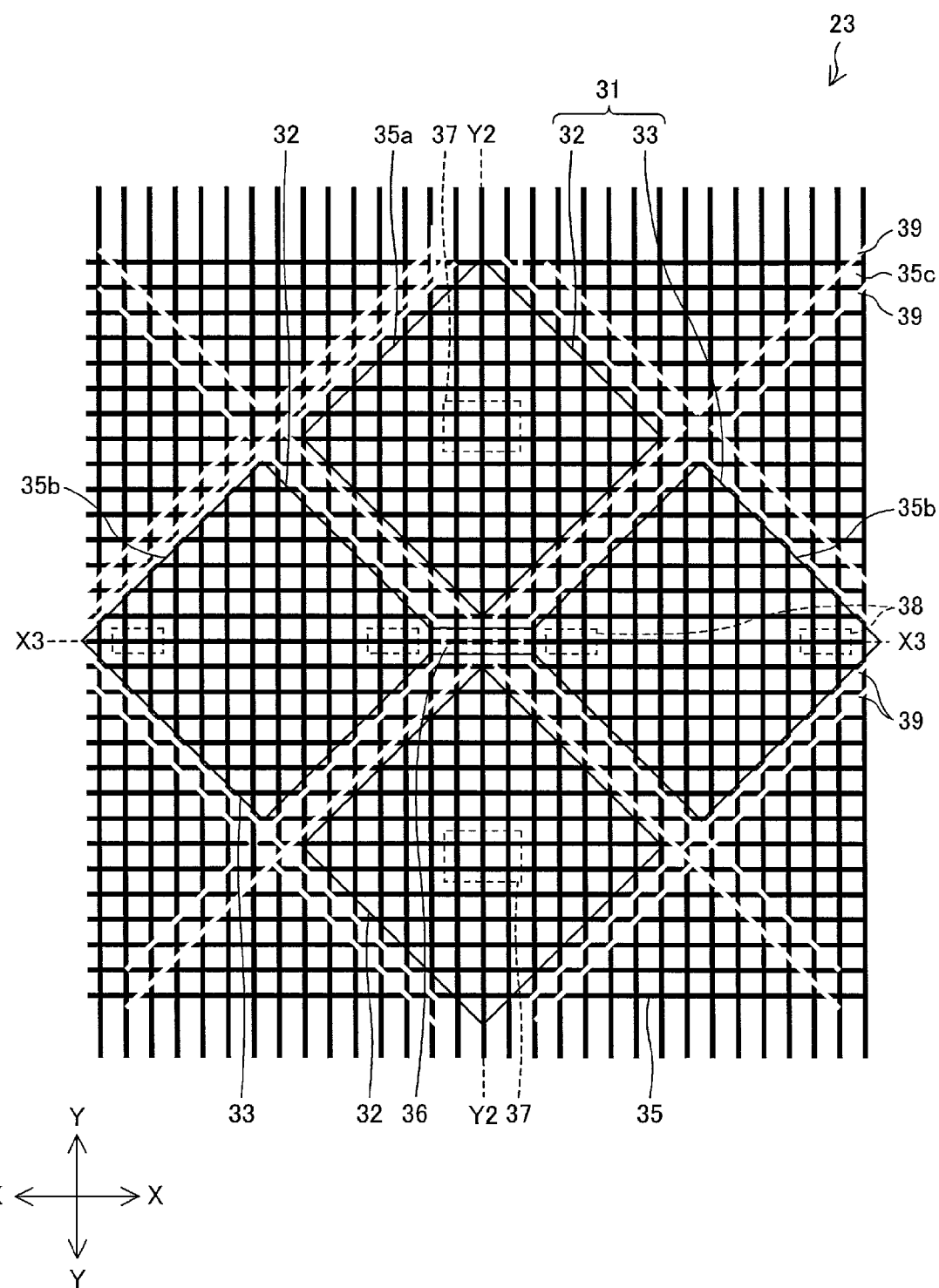
FIG. 20 is a plan view schematically showing a configuration of a main part of a touch panel layer of a touch panel substrate according to Embodiment 2.
Figure 21:
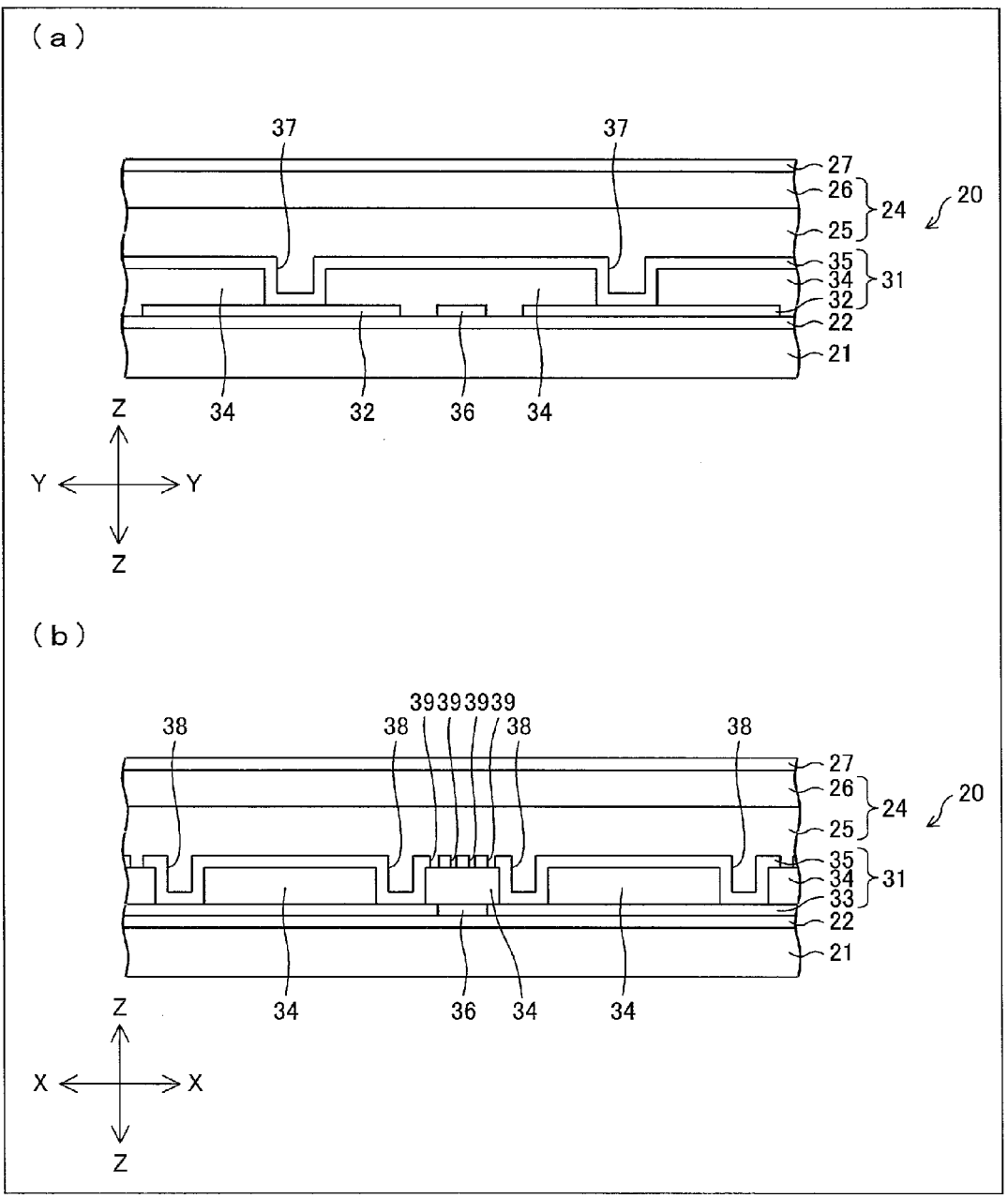
FIG. 21 is a set of diagrams (a) and (b), the diagram (a) showing a cross-section of the touch panel substrate as taken along the line Y2-Y2 across the touch panel layer shown in FIG. 20, the diagram (b) showing a cross-section of the touch panel substrate as taken along the line X3-X3 across the touch panel layer shown in FIG. 20.

FIG. 20 is a plan view showing a configuration of a main part of a touch panel layer 23 of a substrate 20 according to the present embodiment. (a) of FIG. 21 is a diagram showing a cross-section of the substrate 20 as taken along the line Y2-Y2 across the touch panel layer 23 shown in FIG. 20. (b) of FIG. 21 is a diagram showing a cross-section of the substrate 20 as taken along the line X3-X3 across the touch panel layer 23 shown in FIG. 20.

Further, FIG. 22 is a plan view schematically showing a configuration of a metal bridge 35 shown in FIG. 20.

Embodiment 1 is configured such that in a case where the electrodes 32 and 33 are electrically connected to the metal bridge 35, each region of the metal bridge 35 which region is between electrodes 32 and 33 adjacent to each other is disconnected at one place.

The present embodiment is, in contrast, configured such that each region of the metal bridge 35 which region is between electrodes 32 and 33 adjacent to each other is disconnected at two places as shown in FIGS. 20 and 22.

For this purpose, the present embodiment has two disconnecting lines 39 extending across the metal bridge 35 between (i) each of the electrodes 32, which are arranged along the Y-axis, and (ii) an electrode 33 adjacent that electrode 32 along the X-axis.

For this reason, the present embodiment has metal wiring parts 35c which are electrically connected to neither of the electrodes 32 and 33 due to the disconnecting lines 39, which are each electrically in the form of a floating island, and which extend across the metal bridge 35 between (i) each of the electrodes 32, which are arranged along the Y-axis, and (ii) an electrode 33 adjacent thereto along the X-axis.

With this configuration, the metal bridge 35 includes (i) metal wiring parts 35a electrically connected to the respective electrodes 32, (ii) metal wiring parts 35b electrically connected to the respective electrodes 33, and (iii) metal wiring parts 35c that are each electrically in the form of a floating island.

Moreover, a metal wiring part 35c is provided at least between a metal wiring part 35a and a metal wiring part 35b.

For this reason, the present embodiment makes it possible to reliably prevent a short circuit between a metal wiring part 35a and a metal wiring part 35b, thus making it possible to suppress a reduction in yield due to such a short circuit.

Such provision of a metal wiring part 35c between a metal wiring part 35a and a metal wiring part 35b makes it possible to reduce a capacitance (cross capacitance) which is formed between electrodes 32 and 33 and which does not vary depending on whether or not an object to be detected is in contact.

This makes it possible to reduce the CR time constant, thus making it possible to further facilitate a position detecting operation by as a touch panel.

<Modifications>

The following describes modifications of individual constituent elements of the electro-optic device according to the present embodiment.

<Connection by the Metal Bridge 35>

The present embodiment has been described by taking, as an example, a case where as shown in FIGS. 20 and 22, a disconnecting line 39 is formed, in plan view, between (i) each of the electrodes 32, which are arranged along the Y-axis, and (ii) an electrode 33 adjacent thereto along the X-axis, the disconnecting line 39 extending along the pattern of these electrodes 32 and 33.

However, the disconnecting lines 39 need only electrically disconnect the electrodes 32 and the electrodes 33 from each other so that no electricity travels between the electrodes 32 and the electrodes 33.

Therefore, the disconnecting lines 39 do not necessarily need to be formed between the respective patterns of the electrodes 32 and the electrodes 33. The disconnecting lines 39 need only be formed, in plan view, between the contact holes 37 and the contact holes 38 provided respectively for the electrodes 32 and the electrodes 33.

The present embodiment has been described by taking, as an example, a case where the electrodes 32 and the electrodes 33 are both electrically connected to the metal bridge 35.

However, the present embodiment may be configured such that of the electrodes 32 and the electrodes 33, only one group of electrodes that are not connected to each other via the connecting wires 36 (the electrodes 33 in the example shown in FIG. 20) are electrically connected to a metal bridge 35 including a metal mesh.

In this case, with the insulating layer 34 provided between the metal bridge 35 and the other group of electrodes, the disconnecting lines 39 do not necessarily need to be provided between the electrodes 32 and the electrodes 33.

In a case, for example, of two disconnecting lines 39 provided between electrodes 32 adjacent to each other along the X-axis with an electrode 33 therebetween, it is possible to electrically disconnect such electrodes 32 from each other that are adjacent to each other along the X-axis with an electrode 33 therebetween and form a metal wiring part 35c that is electrically in the form of a floating island between columns of electrodes 32 adjacent to each other along the X-axis with an electrode 33 therebetween (i.e., between metal wiring parts 35a adjacent to each other).

In the above case, disconnecting lines 39 may simply be formed, in plan view, between contact holes 37 formed in respective electrodes 32 adjacent to each other along the X-axis with an electrode 33 therebetween.

Further, in this case, disconnecting lines 39 may simply be formed, in plan view, between contact holes 37 formed in respective electrodes 32 adjacent to each other along the X-axis with an electrode 33 therebetween.

[Embodiment 3]

Still another embodiment of the present invention is described below with reference to FIGS. 23 through 28. For convenience of explanation, constituent elements of the present embodiment that are identical in function to their respective corresponding constituent elements used in Embodiment 1 are each assigned an identical reference sign, and as such, are not described here.

Figure 23:
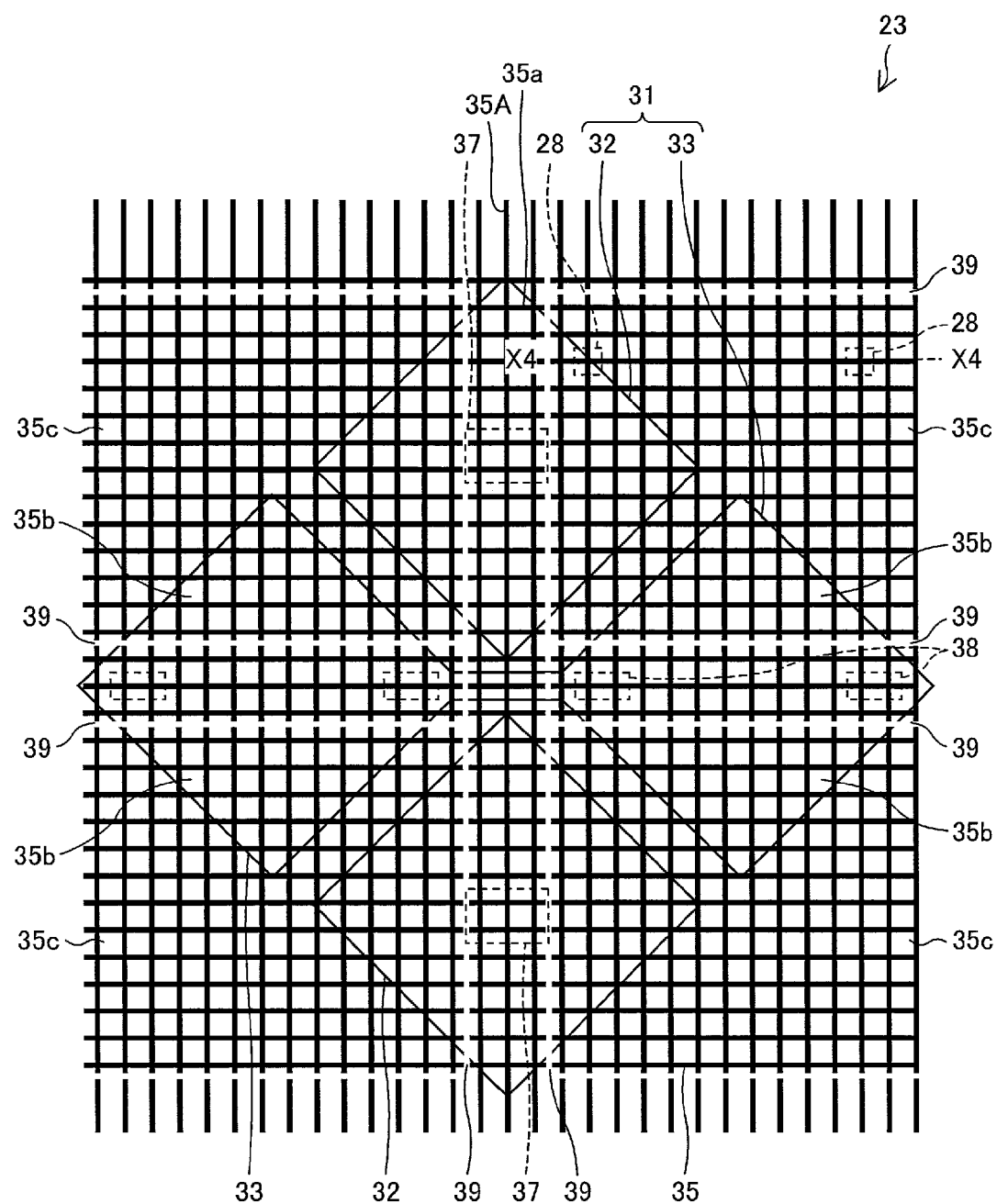
FIG. 23 is a plan view showing a configuration of a main part of a touch panel layer of a touch panel substrate according to Embodiment 3.
Figure 24:
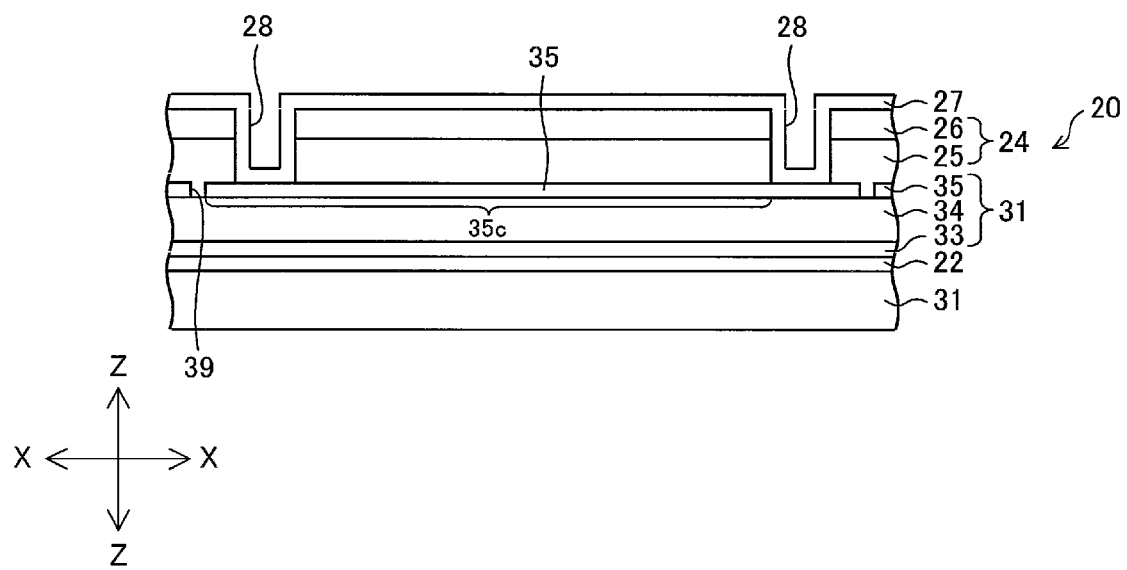
FIG. 24 is a diagram showing a cross-section of the touch panel substrate as taken along the line X4-X4 across the touch panel layer shown in FIG. 23.

FIG. 23 is a plan view showing a configuration of a main part of a touch panel layer 23 of a substrate 20 according to the present embodiment. FIG. 24 is a diagram showing a cross-section of the substrate 20 as taken along the line X4-X4 across the touch panel layer 23 shown in FIG. 23.

Figure 25:
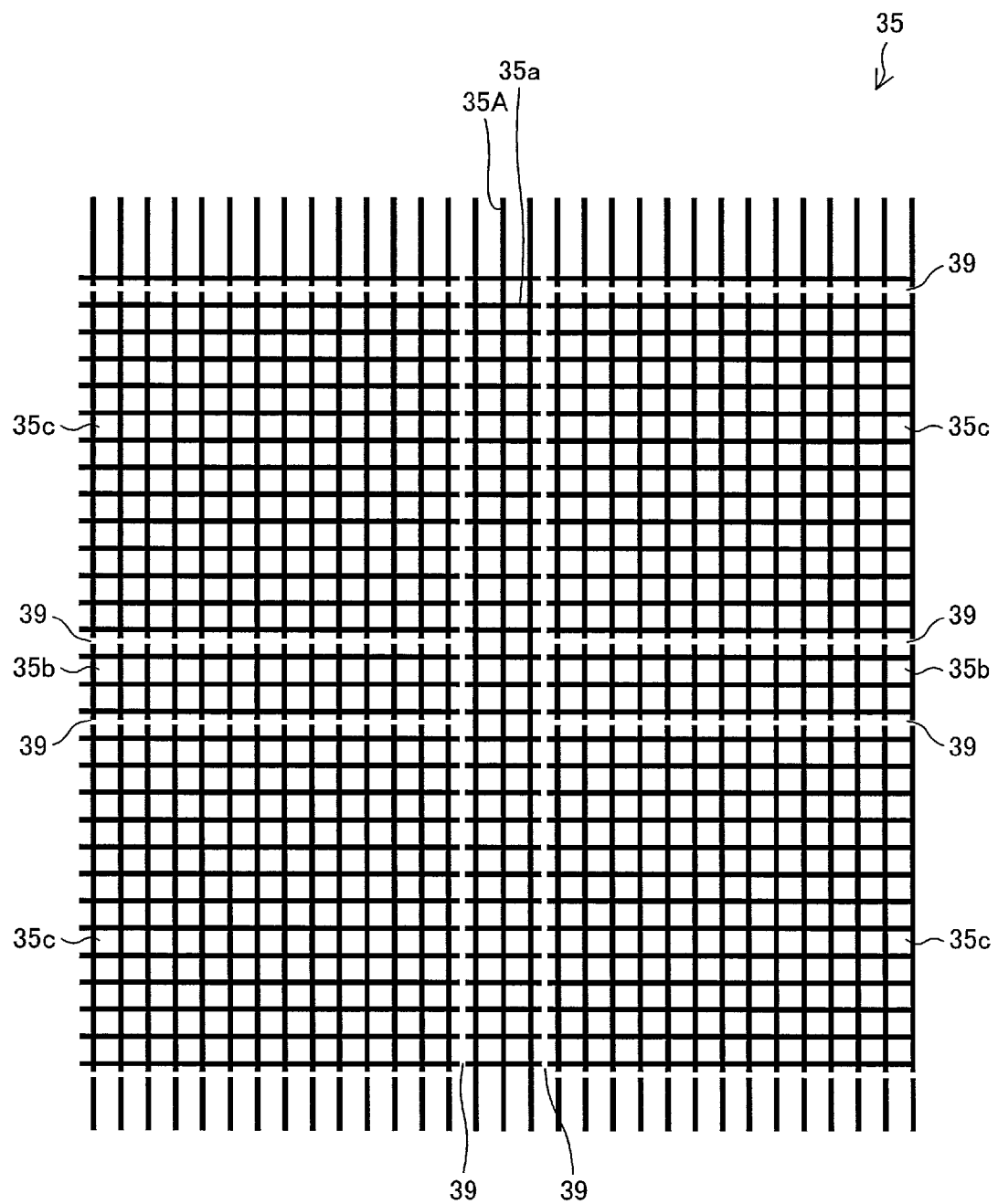
FIG. 25 is a plan view schematically showing a configuration of a metal bridge shown in FIG. 23.

Further, FIG. 25 is a plan view schematically showing a configuration of a metal bridge 35 shown in FIG. 23.

Embodiment 2 is configured such that by forming two disconnecting lines 39 across the metal bridge 35 between (i) each of the electrodes 32, which are arranged along the Y-axis, and (ii) an electrode 33 adjacent thereto along the X-axis, a metal wiring part 35c that is electrically in the form of a floating island is formed in the metal bridge 35 between a metal wiring part 35*a* and a metal wiring part 35*b*.

In contrast, the present embodiment, as shown in FIGS. 23 and 25, includes a disconnecting line 39 formed between a contact hole 37 provided for an electrode 32 and a contact hole 38 provided for an electrode 33, the disconnecting line 39 extending along the direction along which the electrodes 32 and 33 are arranged and intersecting the electrodes 32 and 33.

The example shown in FIGS. 23 and 25 includes disconnecting lines 39 formed so that contact holes 37 provided for respective electrodes 32 are interposed therebetween and the disconnecting lines 39 extend along the Y-axis, that is, along a central trunk line 35A that connects electrodes 32 to each other that are arranged along the Y-axis. The example further includes disconnecting lines 39 formed so that contact holes 38 provided for respective electrodes 33 are interposed therebetween and the disconnecting lines 39 extend along the X-axis.

With this configuration, the metal bridge 35 is provided with metal wiring parts 35*c* which are provided between the metal wiring parts 35*a* electrically connected to the respective electrodes 32 and the metal wiring parts 35*b* electrically connected to the respective electrodes 33 and which are electrically connected to neither of the electrodes 32 and 33.

The resin layer 24 (that is, the insulating layer 25 and the CF layer 26) provided on the metal wiring parts 35*c* of the metal bridge 35 has, as shown in FIGS. 23 and 24, contact holes 28 via which the metal wiring parts 35*c* of the metal bridge 35 and the counter electrode 27 are electrically connected to each other.

The resin layer 24 has at least one contact hole 28 (two in the example shown in FIG. 23) for each metal wiring part 35*c*.

Since those metal wiring parts 35*c* of the metal bridge which are electrically connected to neither of the electrodes 32 and 33 are thus electrically connected to the counter electrode 27, the present embodiment makes it possible to reduce the resistance of the counter electrode 27. This makes it possible to reduce the CR time constant. Further, mounting the substrate 20 in the liquid crystal panel 2 makes it possible to reduce the resistance of the counter electrode 27, thus making it possible to reduce the CR time constant and thereby increasing the SN ratio.

<Process for Fabricating a Substrate 20>

The following describes only with differences in process between the present embodiment and Embodiment 1.

In the present embodiment, disconnecting lines 39 are formed across the metal bridge 35 as shown in FIGS. 23 and 25 instead of disconnecting lines 39 being formed as shown in (d) of FIG. 19 for Embodiment 1.

Next, an insulating layer 25 and a CF layer 26 are formed on the metal bridge 35 as shown in (e) of FIG. 19, and then patterning is carried out with respect to these insulating layer 25 and CF layer 26 by, for example, photolithography with use of a photoresist (not illustrated). This causes opening to be formed in the insulating layer 25 and the CF layer 26 as shown in FIG. 24 to serve as contact holes 28.

Next, during a step corresponding to the step shown in (f) of FIG. 19, a transparent conductive film is formed inside the openings as well that are formed in the insulating layer 25 and the CF layer 26, whereby a counter electrode 27 and contact holes 28 are formed.

The other steps are identical to their respective corresponding steps described in Embodiment 1. The above process allows production of the substrate 20 according to the present embodiment and a liquid crystal panel 2 including the substrate 20.

<Modifications>

The following describes modifications of individual constituent elements of the electro-optic device according to the present embodiment.

Figure 26:
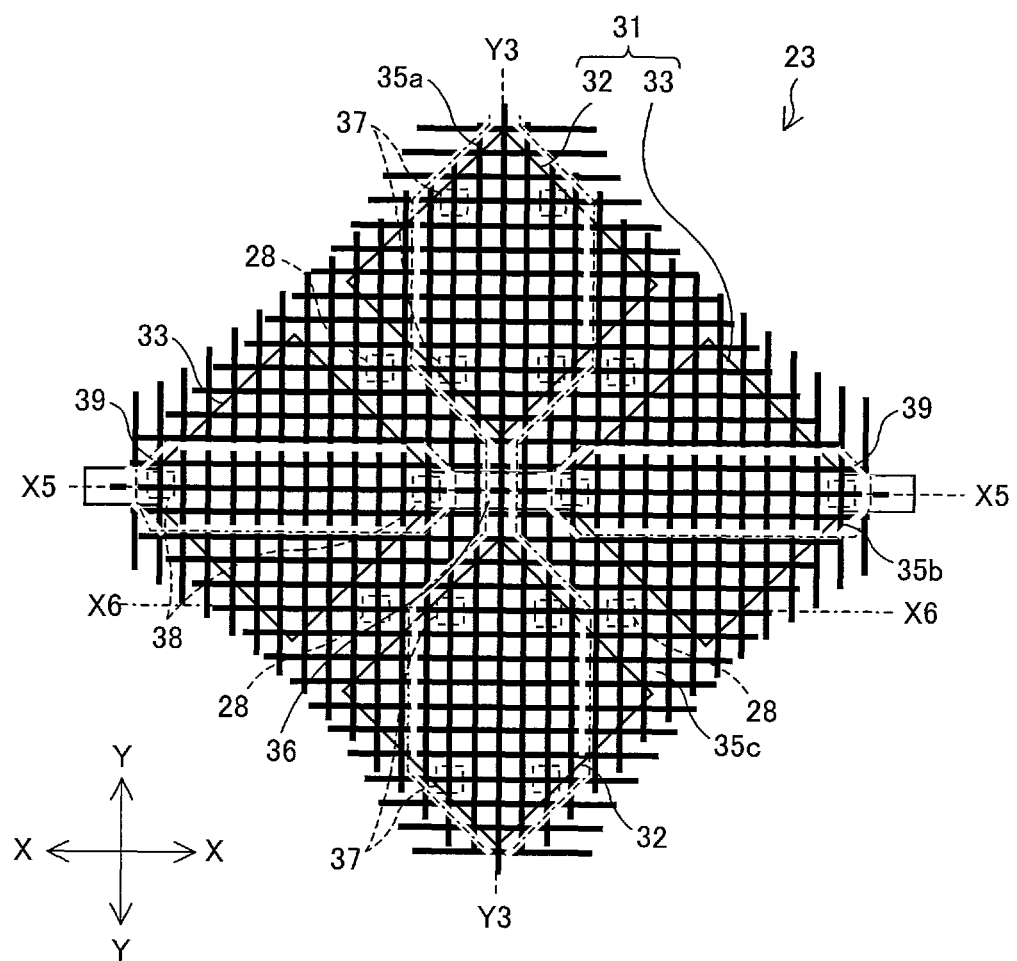
FIG. 26 is a plan view showing a configuration of a main part of a touch panel layer of another touch panel substrate according to Embodiment 3.
Figure 27:
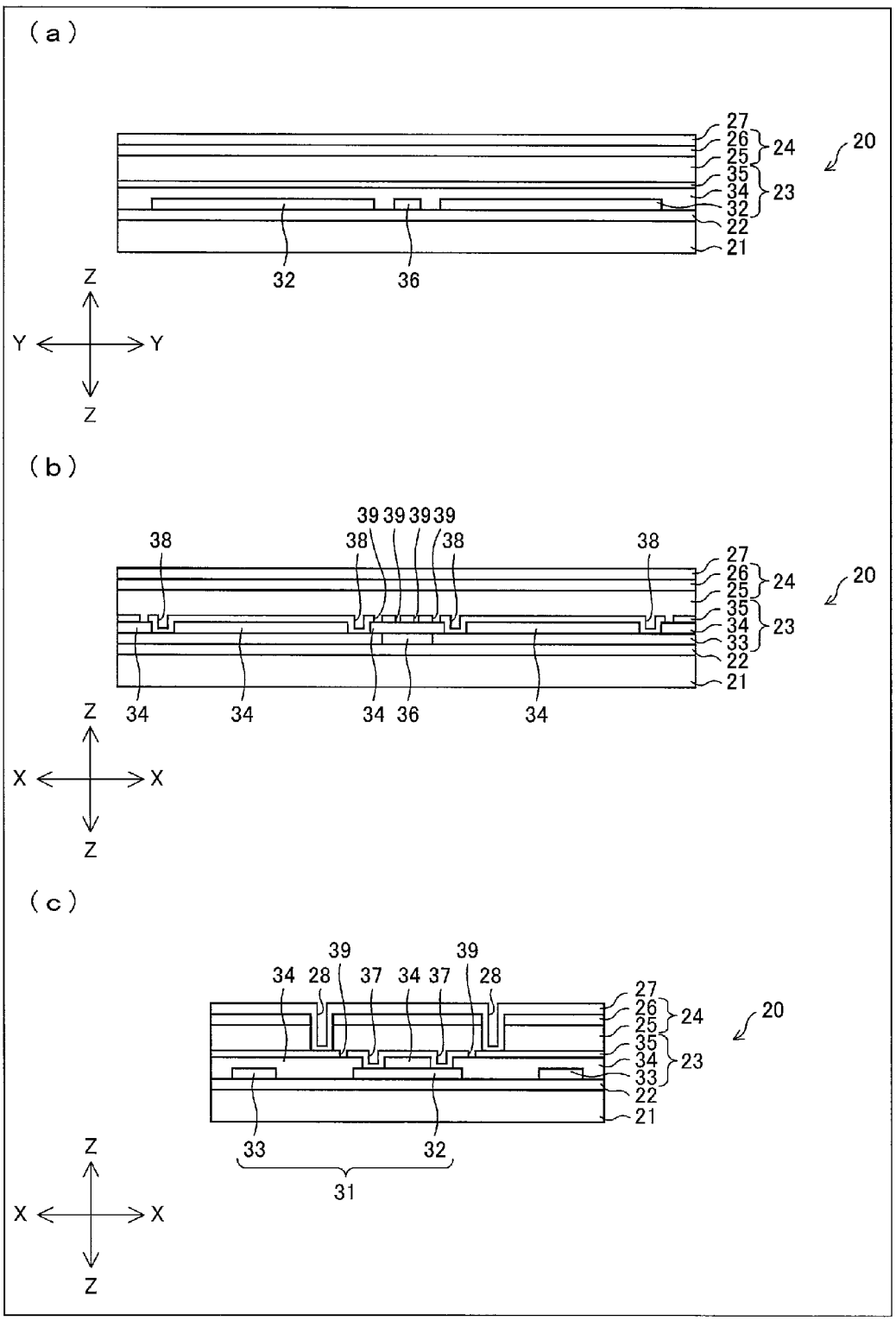
FIG. 27 is a set of diagrams (a) through (c), the diagram (a) showing a cross-section of the touch panel substrate as taken along the line Y3-Y3 across the touch panel layer shown in FIG. 26, the diagram (b) showing a cross-section of the touch panel substrate as taken along the line X5-X5 across the touch panel layer shown in FIG. 26, the diagram (c) showing a cross-section of the touch panel substrate as taken along the line X6-X6 across the touch panel layer shown in FIG. 26.

FIG. 26 is a plan view showing a configuration of a main part of a touch panel layer 23 of another substrate 20 according to the present embodiment. (a) of FIG. 27 is a diagram showing a cross-section of the substrate 20 as taken along the line Y3-Y3 across the touch panel layer 23 shown in FIG. 26. (b) of FIG. 27 is a diagram showing a cross-section of the substrate 20 as taken along the line X5-X5 across the touch panel layer 23 shown in FIG. 26. (c) of FIG. 27 is a diagram showing a cross-section of the substrate 20 as taken along the line X6-X6 across the touch panel layer 23 shown in FIG. 26.

Figure 28:
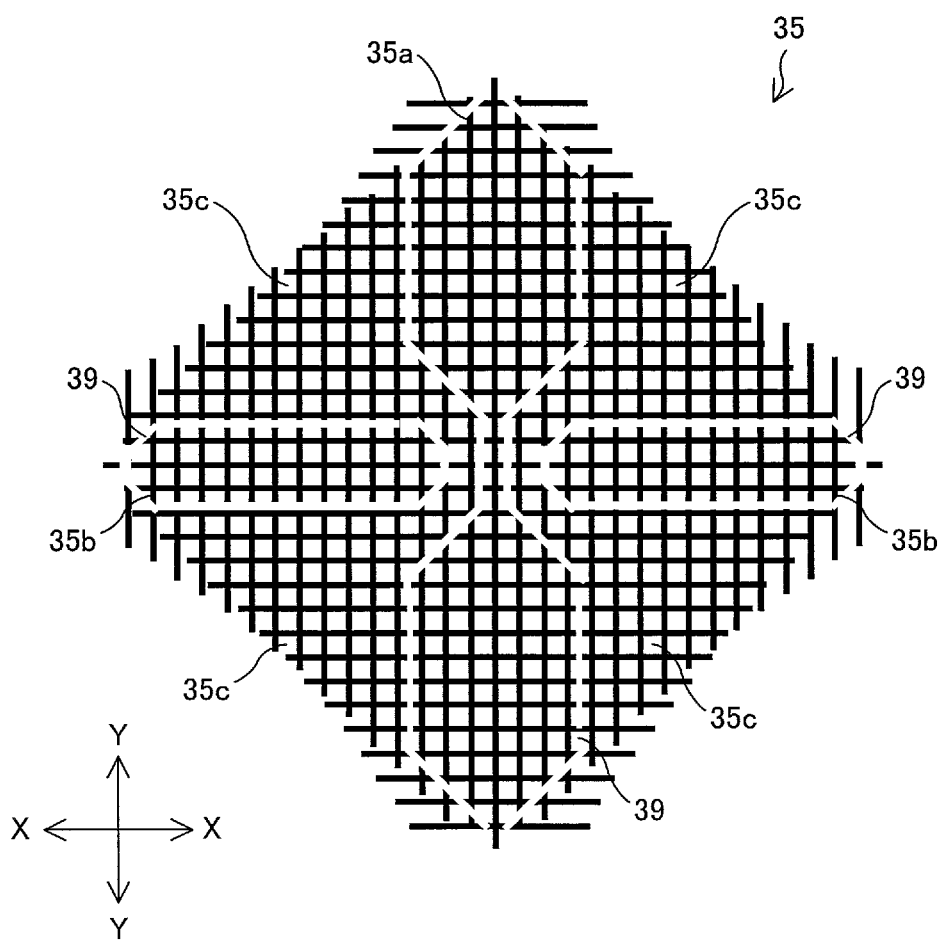
FIG. 28 is a plan view schematically showing a configuration of a metal bridge shown in FIG. 26.

FIG. 28 is a plan view schematically showing a configuration of a metal bridge 35 shown in FIG. 26.

The example shown in FIG. 23 includes a single contact hole 37 at the center of an electrode 32, the contact hole 37 having a size substantially equal to the width of a connecting wire 36. This example thus forms rectangular electrode wiring parts 35*a*, 35*b*, and 35*c* in the metal bridge 35 by forming disconnecting lines 39 extending (i) along the Y-axis so that contact holes 37 formed in respective electrodes 32 are interposed therebetween and (ii) through a region between contact holes 38 formed in respective electrodes adjacent to each other along the X-axis.

The example shown in FIG. 26, in contrast, includes two contact holes 37 along X-axis for each electrode 32 to form electrode wiring parts 35*a*, 35*b*, and 35*c* that are shaped as shown in FIG. 28.

The respective shapes and sizes of the electrode wiring parts 35*a*, 35*b*, and 35*c* may be selected as appropriate depending, as described above, on the respective sizes and numbers of the contact holes 37 and 38 formed respectively for the electrodes 32 and 33.

The present embodiment, as shown in FIGS. 23 through 28, includes disconnecting lines 39 formed to enclose, in plan view, connection parts at each of which electrodes 32 and 33 are connected to the metal bridge 35 via contact holes 37 and 38 (specifically, such connection parts correspond to (i) a region of each electrode 32 which region is between contact holes 37 and (ii) a region of each electrode 33 which region is between contact holes 38).

The present embodiment can thus secure a large area for the metal wiring parts 35*c* (that is, an area of the metal bridge 35 by which area it is connected to the counter electrode 27) in comparison to a case where a disconnecting line 39 is formed across the metal bridge 35 between (i) each of the electrodes 32, which are arranged along the Y-axis, and (ii) an electrode 33 adjacent thereto along the X-axis, the disconnecting line 39 extending along the pattern of the electrodes 32 and 33. The present embodiment can consequently reduce the resistance of the counter electrode 27.

Further, the present embodiment, which electrically disconnects the metal bridge 35 with use of the disconnecting lines 39, can form metal wiring parts insulated from the electrodes 32 and 33 without forming a separate metal layer. In other words, the present embodiment can form metal wiring parts insulated from the electrodes 32 and 33 without increasing the number of components or the thickness of the substrate 20.

[Embodiment 4]

Still another embodiment of the present invention is described below with reference to FIGS. 29 through 36. For convenience of explanation, constituent elements of the present embodiment that are identical in function to their respective corresponding constituent elements used in Embodiments 1 through 3 are each assigned an identical reference sign, and as such, are not described here.

The following takes contact holes 37 as an example for the present embodiment to describe a modification of contact holes 37 for connecting the sensor electrode 31 and the metal bridge 35 to each other.

<Number of Contact Holes>

Figure 29:
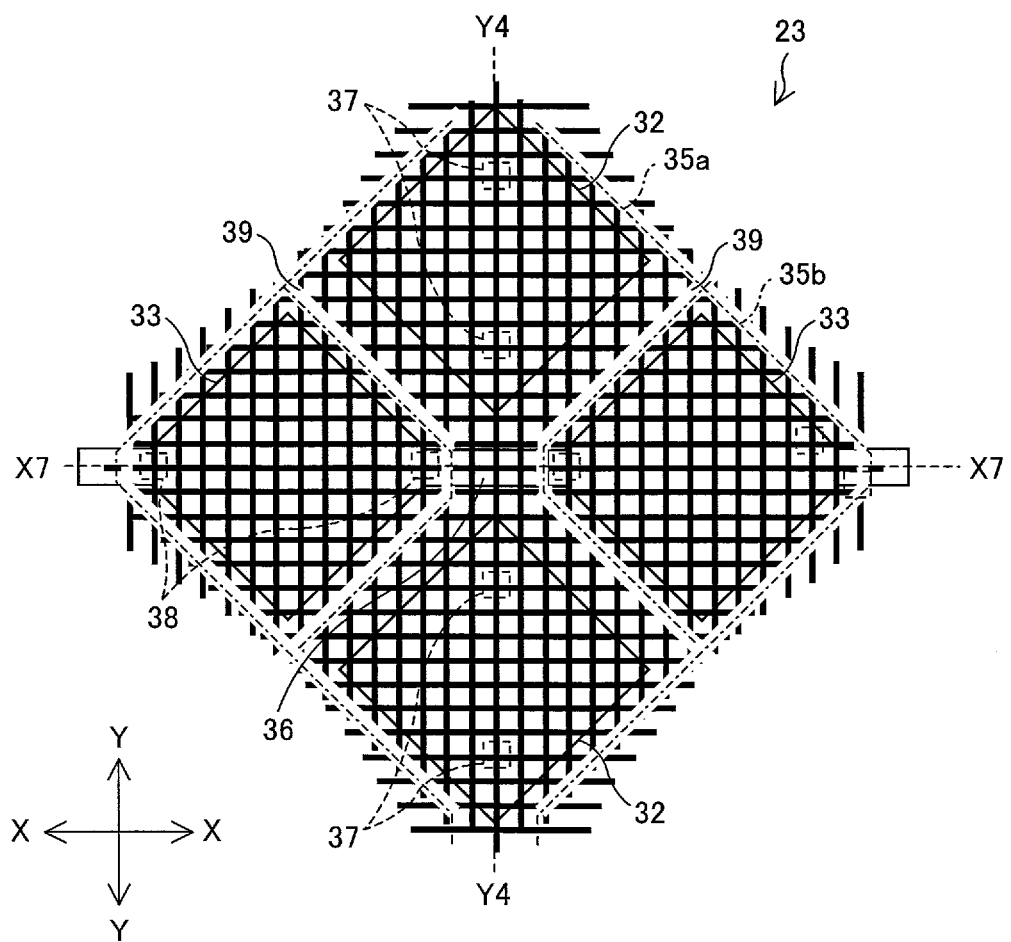
FIG. 29 is a plan view showing a configuration of a main part of a touch panel layer of a touch panel substrate according to Embodiment 4.
Figure 30:
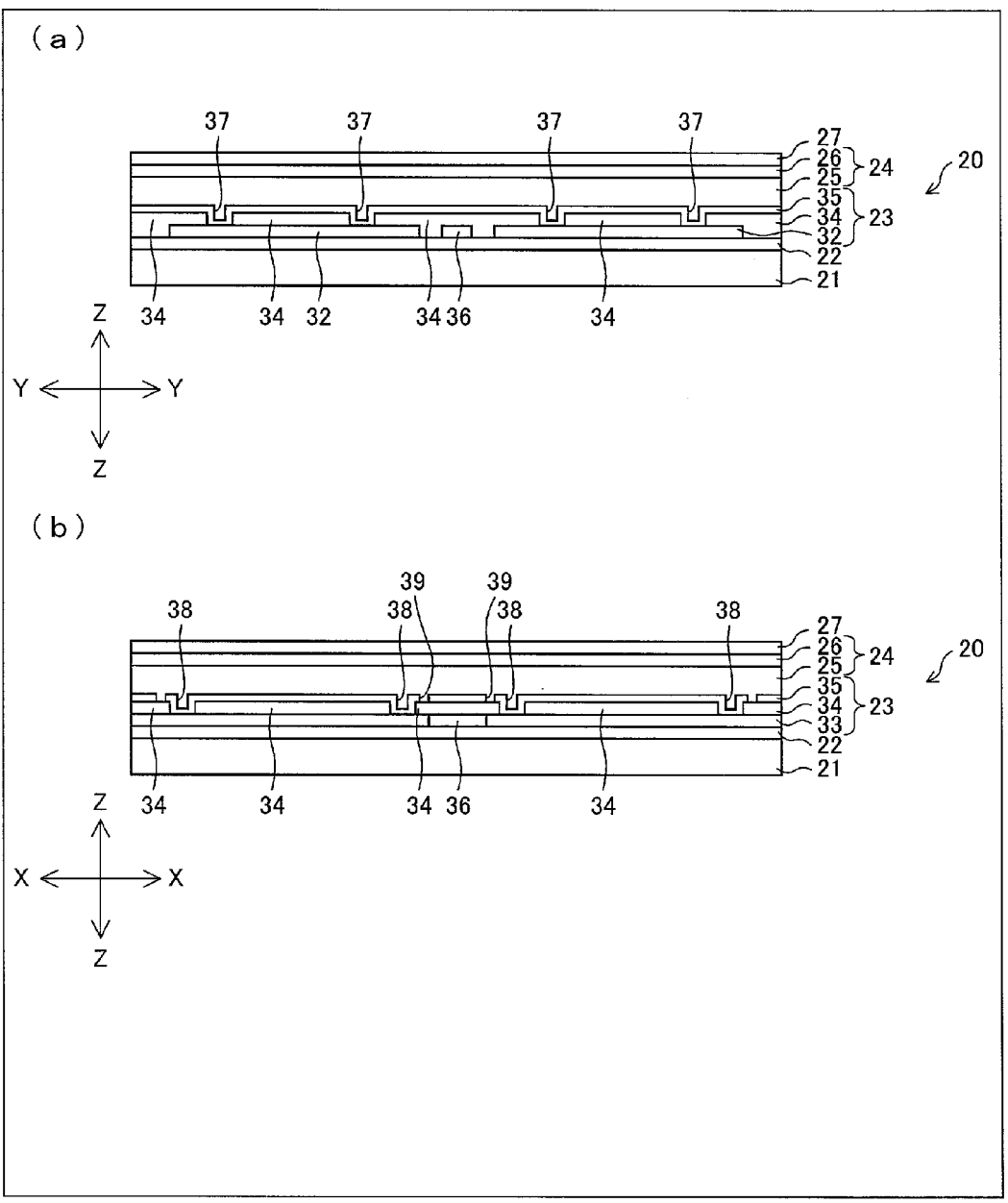
FIG. 30 is a set of diagrams (a) and (b), the diagram (a) showing a cross-section of the touch panel substrate as taken along the line Y4-Y4 across the touch panel layer shown in FIG. 29, the diagram (b) showing a cross-section of the touch panel substrate as taken along the line X7-X7 across the touch panel layer shown in FIG. 29.

FIG. 29 is a plan view showing a configuration of a main part of a touch panel layer 23 of a substrate 20 according to the present embodiment. (a) of FIG. 30 is a diagram showing a cross-section of the substrate 20 as taken along the line Y4-Y4 across the touch panel layer 23 shown in FIG. 29. (b) of FIG. 30 is a diagram showing a cross-section of the substrate 20 as taken along the line X7-X7 across the touch panel layer 23 shown in FIG. 29.

FIGS. 3 and 4 and FIGS. 20 and 23 for Embodiments 1 and 2 have been illustrated by taking, as example a case where the electrodes 32 each have a single contact hole 37, for example, at its center and are electrically connected to the metal bridge 35 via the contact holes 37.

There are, however, preferably a plurality of contact holes 37 for each electrode as shown, for example, in FIG. 29.

Electrodes 32 arranged along the Y-axis are bridge-connected to each other via the metal bridge 35. Thus, providing each electrode 32 with a plurality of contact holes 37 via which the electrode 32 is connected to the metal bridge 35 makes it possible to ensure an electric connection between the electrodes 32 even in a case where there has occurred a faulty connection such as a disconnection at a contact hole 37. This makes it possible to improve yields.

Further, not only those electrodes 32 connected to each other via the metal bridge 35, but also (i) each electrode 32 for use in the sensor electrode 31 is preferably provided with a plurality of contact holes 37 via which it is connected to the metal bridge 35 and (ii) each electrode 33 for use in the sensor electrode 31 is preferably provided with a plurality of contact holes 38 via which it is connected to the metal bridge 35.

This makes it possible to ensure the area of connection parts between the metal bridge 35 and the electrodes 32 and 33, and to reduce the respective resistances of the electrodes 32 and 33.

<Arrangement of Contact Holes for Use in Interelectrode Connection>

Figure 31:
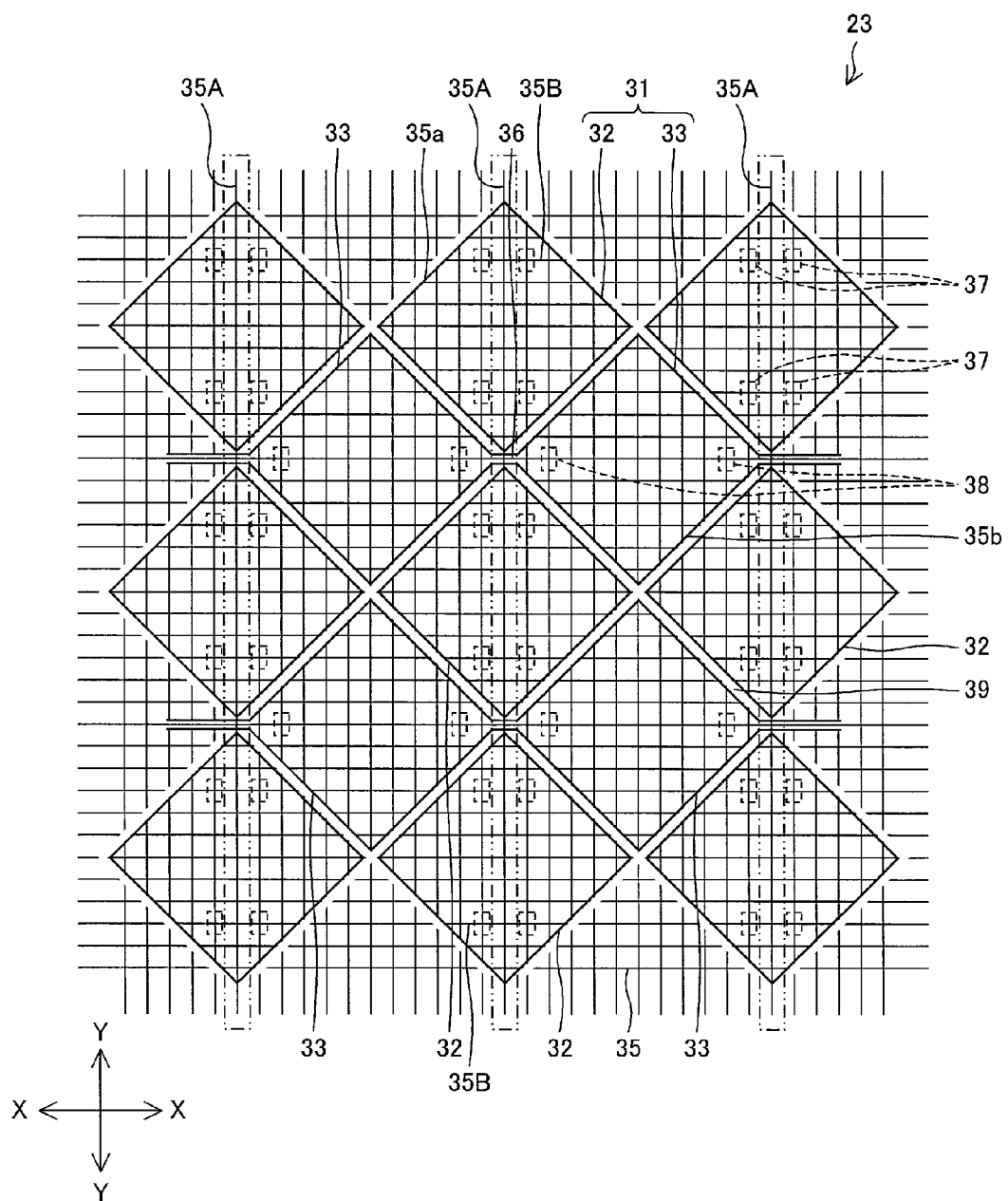
FIG. 31 is a plan view showing a configuration of a main part of a touch panel layer of another touch panel substrate according to Embodiment 4.

FIG. 31 is a plan view showing a configuration of a main part of a touch panel layer 23 of another substrate 20 according to the present embodiment. FIG. 31 is illustrated by taking, as an example, a case where a single disconnecting line 39 is provided across the metal bridge 35 between (i) each of the electrodes 32, which are arranged along the Y-axis, and (ii) an electrode 33 adjacent thereto along the X-axis.

Figure 32:
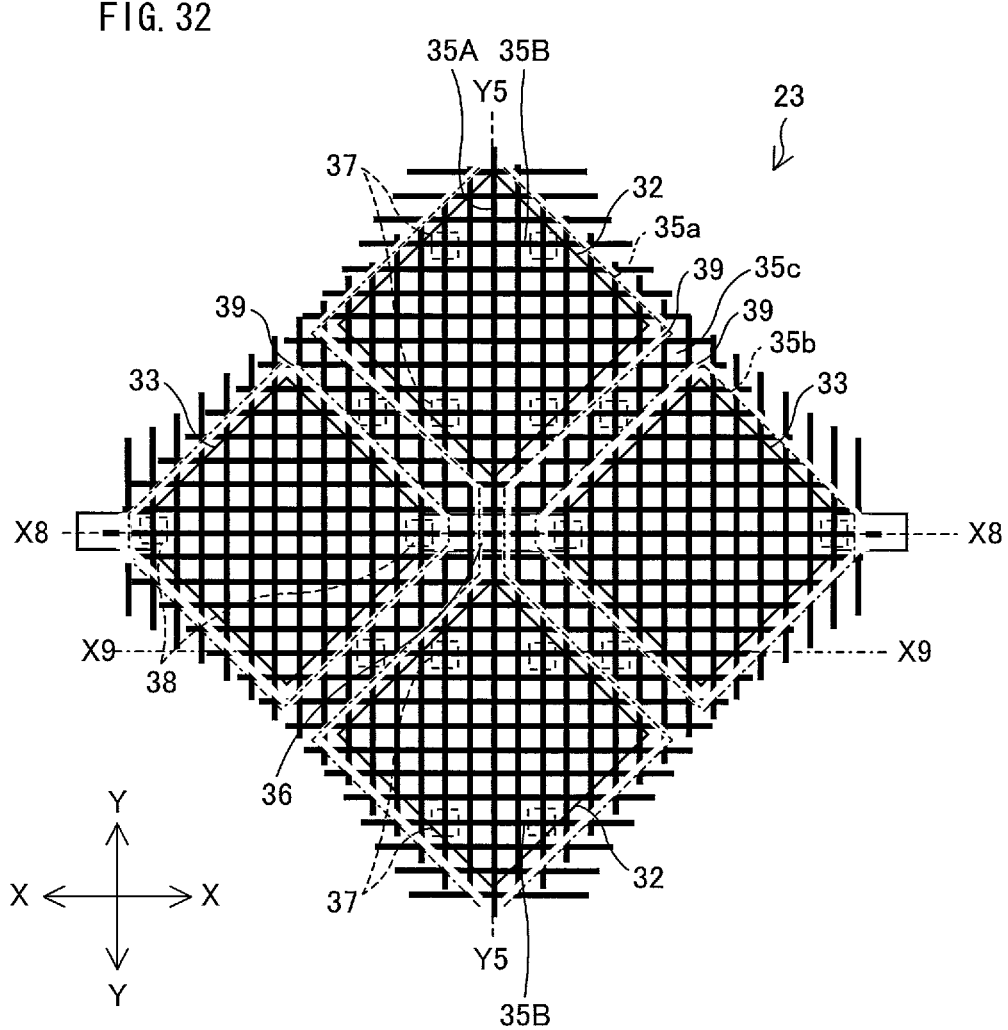
FIG. 32 is a plan view showing a configuration of a main part of a touch panel layer having two disconnecting lines provided between each of electrodes arranged along the Y-axis on a metal bridge and an electrode adjacent to that electrode along the X-axis.

Meanwhile, FIG. 32 is a plan view showing a configuration of a main part of a touch panel layer 23 having two disconnecting lines 39 provided between each of electrodes 32 are arranged along the Y-axis on the metal bridge 35 and an electrode 33 adjacent to that electrode 32 along the X-axis.

(a) of FIG. 33 is a diagram showing a cross-section of the substrate 20 as taken along the line Y5-Y5 across the touch panel layer 23 shown in FIG. 32. (b) of FIG. 33 is a diagram showing a cross-section of the substrate 20 as taken along the line X8-X8 across the touch panel layer 23 shown in FIG. 32. (c) of FIG. 33 is a diagram showing a cross-section of the substrate 20 as taken along the line X9-X9 across the touch panel layer 23 shown in FIG. 32.

FIGS. 3 and 4, FIGS. 20 and 23, and FIG. 29 have been illustrated by taking, as an example, a case where contact holes 37 are, regardless of the number thereof, provided in a central trunk line 35A of the metal bridge 35 (see FIGS. 31 and 32; the wires each marked by a chain double-dashed line in FIG. 31), the central trunk line 35A extending on a diagonal of each electrode 32 along the Y-axis.

The example shown in FIGS. 31 and 32 includes contact holes 37 formed, not in a central trunk line 35A of the metal bridge 35 for electrodes 32, but in branch line parts 35B intersecting the central trunk line 35A.

Forming contact holes 37 in not the central trunk lines 35A but the branch line parts 35B as described above makes it possible prevent a disconnection, and thus making it possible to improve yields.

FIGS. 31 and 32 are illustrated by taking, as an example, a case where (i) electrodes 32 arranged along the Y-axis are electrically connected to each other via a central trunk line 35A of the metal bridge 35 and (ii) wires of the metal bridge 35 which extend along the Y-axis and which are other than the central trunk lines 35A are disconnected between electrodes 32 arranged along the Y-axis.

However, the disconnecting lines 39 do not necessarily need to be formed between the respective patterns of the electrodes 32 and the electrodes 33. The disconnecting lines 39 need only be formed, in plan view, between the contact holes 37 and the contact holes 38 provided respectively for the electrodes 32 and the electrodes 33 as described in Embodiment 2. Therefore, electrodes 32 arranged along the Y-axis may be connected to each other via wires (trunk lines) which extend along the Y-axis and which are other than the central trunk lines 35A.

Thus, the contact holes 37 are not limitedly provided in the branch line parts 35B intersecting the central trunk lines 35A. The contact holes 37 are preferably formed in branch line parts intersecting trunk lines of the metal bridge 35 via which trunk lines connect electrodes (electrodes 32 in the present embodiment) connected to each other via the metal bridge 35. This makes it possible to prevent a disconnection, thus making it possible to improve yields.

<Arrangement of Contact Holes for Use in Connection Between Electrodes Connected to Each Other Via Connecting Wires>

Figure 34:
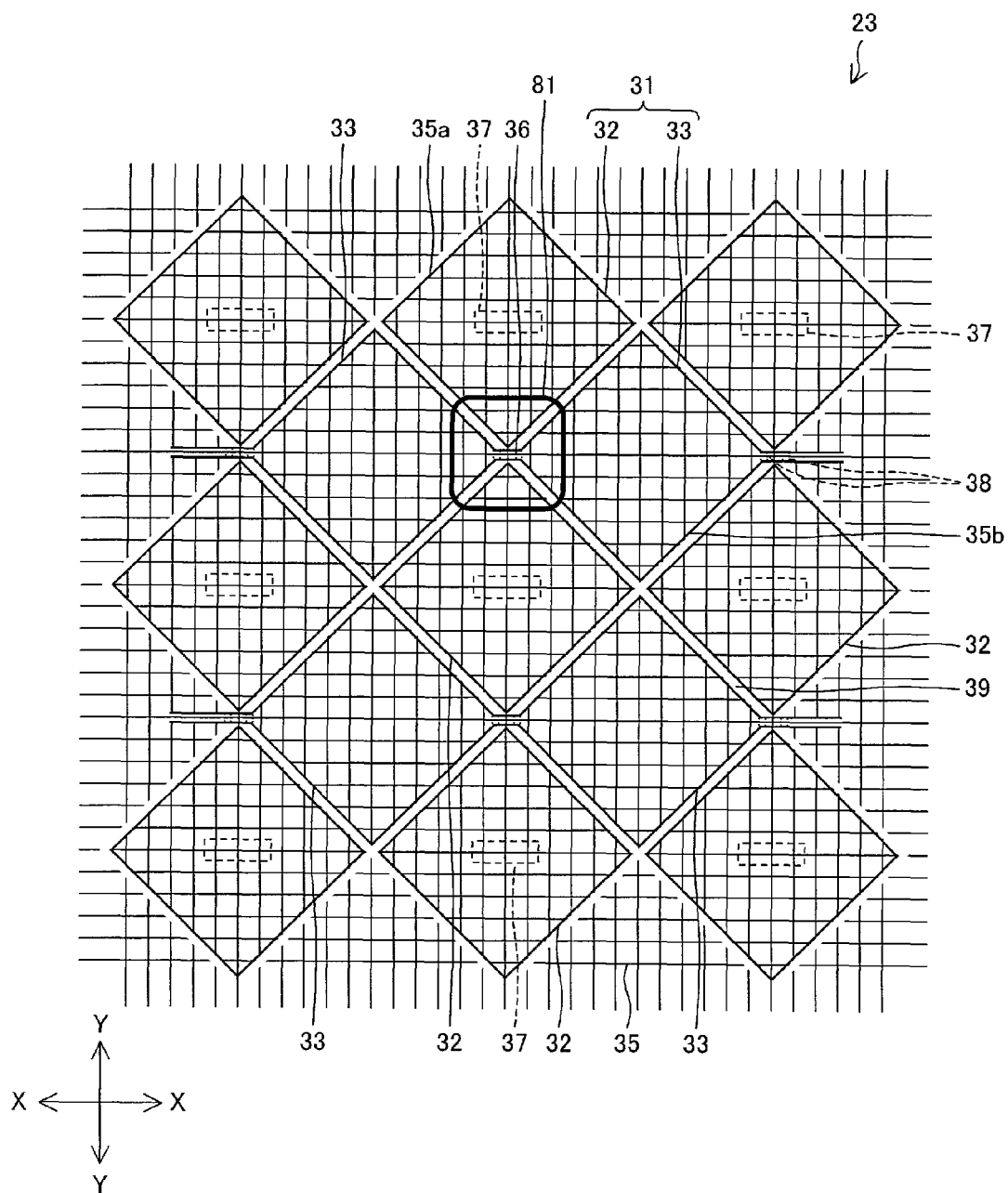
FIG. 34 is still another plan view showing a configuration of a main part of a touch panel layer of still another touch panel substrate according to Embodiment 4.
Figure 35:
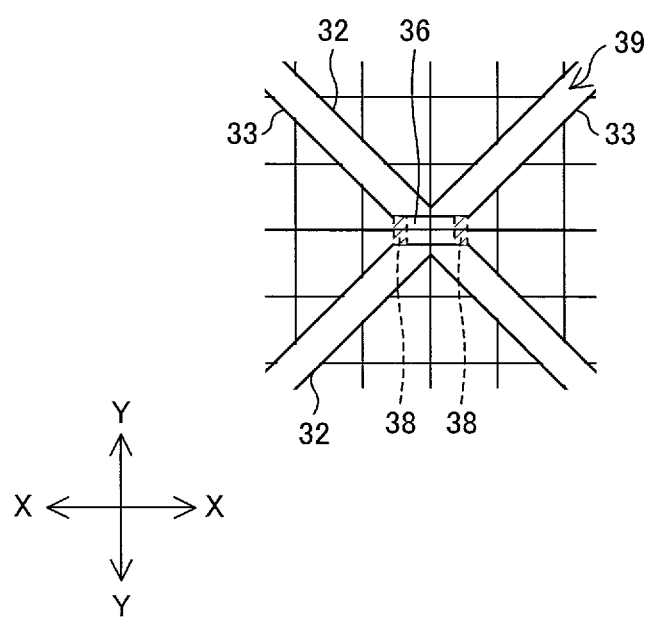
FIG. 35 is a plan view showing a configuration of a column of electrodes arranged along the Y-axis on the touch panel layer shown in FIG. 34, an intersection with the column of electrodes, and an area around the intersection.

FIG. 34 is a plan view showing a configuration of a main part of a touch panel layer 23 of still another substrate 20 according to the present embodiment. FIG. 35 is a plan view showing a configuration of (i) an intersection between a column of electrodes 32 and a row of electrodes 33 on the touch panel layer 23 shown in FIG. 34 and (ii) an area around the intersection. FIG. 35 is an enlarged view of a region 81 enclosed by a thick line in FIG. 34.

In FIGS. 34 and 35, either (i) the electrodes 32 arranged along a first direction or (ii) the electrodes 33 arranged along a second direction intersecting the first direction are not in an isolated pattern, but connected to each other via transparent connecting wires 36.

The following describes, as an example, a case where of the electrodes 32 and the electrodes 33, the electrodes 33 are connected to each other via transparent connecting wires 36.

In this case, each of the electrodes 33 connected to each other via the transparent connecting wires 36 is preferably provided with a contact hole 38 in the vicinity of an intersection between a column and row of electrodes (that is, at an edge of each of the electrodes 33 connected to each other via the transparent connecting wire 36) as shown in FIGS. 34 and 35.

In this case, a conductive area where electricity travels only through the transparent connecting wires 36 can be made smaller. This configuration makes it possible to reduce the resistance of each of the electrodes 33 connected to each other via the transparent connecting wires 36, thus making it possible to reduce the CR time constant.

<Shapes and Areas of Contact Holes>

Figure 36:
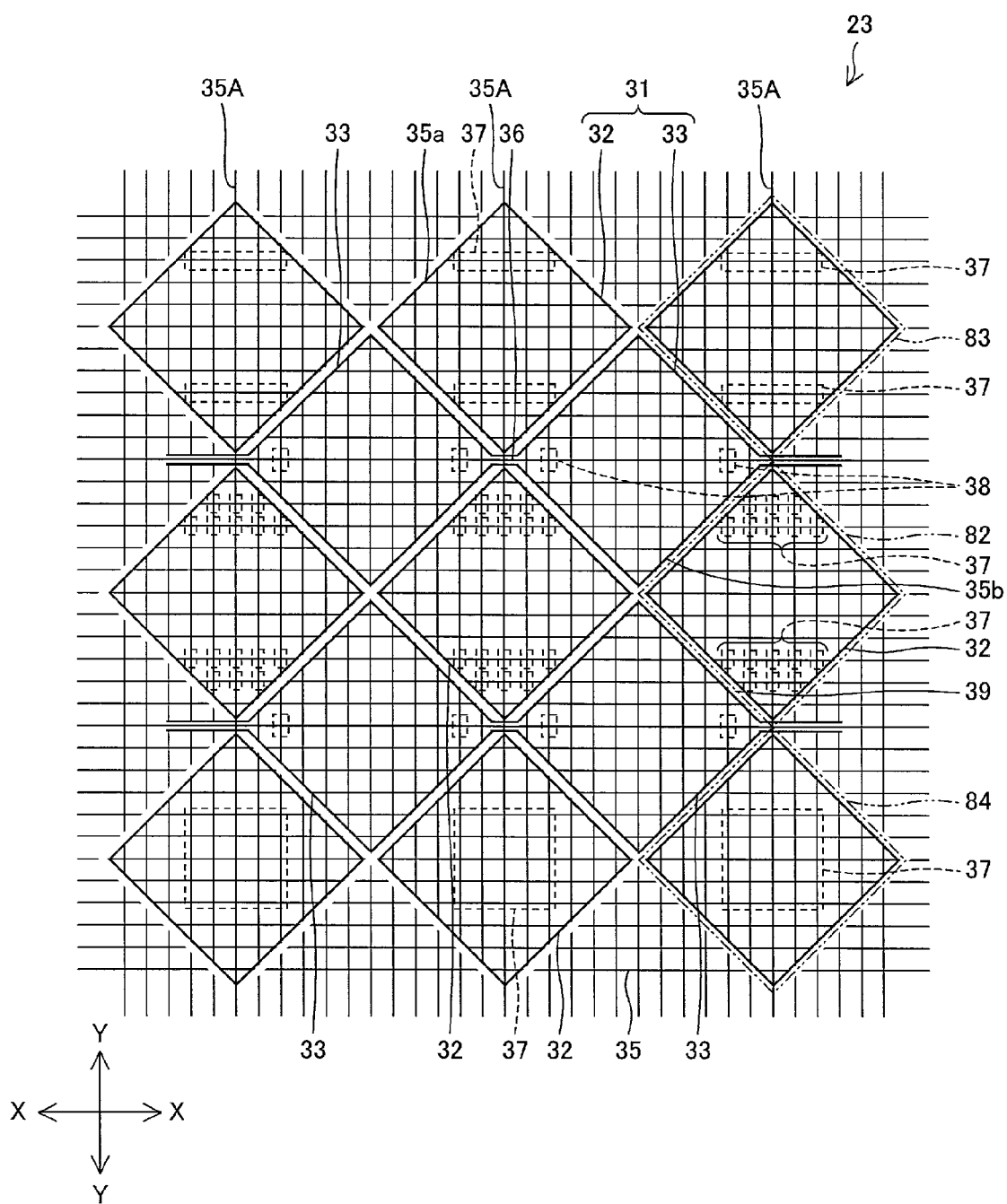
FIG. 36 is a plan view collectively showing modifications of contact holes in a touch panel layer of a touch panel substrate according to Embodiment 4.

FIG. 36 is a plan view collectively showing modifications of contact holes in the touch panel layer 23 of the substrate 20 according to the present embodiment. FIG. 36 illustrates contact holes 37 as examples.

It is preferable that the area over which a contact hole 37 is formed for a single electrode 32 be large enough to ensure the area of a connection part between the metal bridge 35 and the electrode 32.

FIG. 36 illustrates, in a region 82 enclosed by a chain double-dashed line, an example in which a plurality of contact holes 37 are provided around each corner of electrodes 32 along the Y-axis in correspondence with each wire intersection (grid portion) of a mesh metal constituting the metal bridge 35.

By thus increasing the number of contact holes 37, the area over which the contact holes 37 are formed can be sufficiently increased.

FIG. 36 illustrates, in a region 83 enclosed by a chain double-dashed line, an example in which an electrode 32 is provided with a horizontally long contact hole 37 which is long along the X-axis and which intersects the Y-axis, i.e. the direction of connection by the metal bridge 35.

FIG. 36 illustrates, in a region 84 enclosed by a chain double-dashed line, an example in which an electrode 32 is provided with a large contact hole 37 that covers a plurality of wire intersections (grid portions) of a mesh metal constituting the metal bridge 35.

The contact holes 37 in the regions 83 and 84 are horizontally long or large as described above, and are therefore so formed as to cover a plurality of wires extending next to the central trunk lines 35A of the metal bridge 35 (for example, in parallel to the central trunk lines 35A).

As described above, the metal bridge 35 is so formed as to overlap the light blocking layer 22 (BM), which covers the space between pixels.

The contact holes 37 in the regions 83 and 84 are therefore so formed as to cover a plurality of pixels.

The area over which the contact holes 37 are formed may be increased by thus increasing the size of contact holes 37 instead of increasing the number of contact holes 37.

[Embodiment 5]

Another embodiment of the present invention is described below with reference to FIG. 37. For convenience of explanation, constituent elements of the present embodiment that are identical in function to their respective corresponding constituent elements used in Embodiments 1 through 4 are each assigned an identical reference sign, and as such, are not described here.

Figure 37:
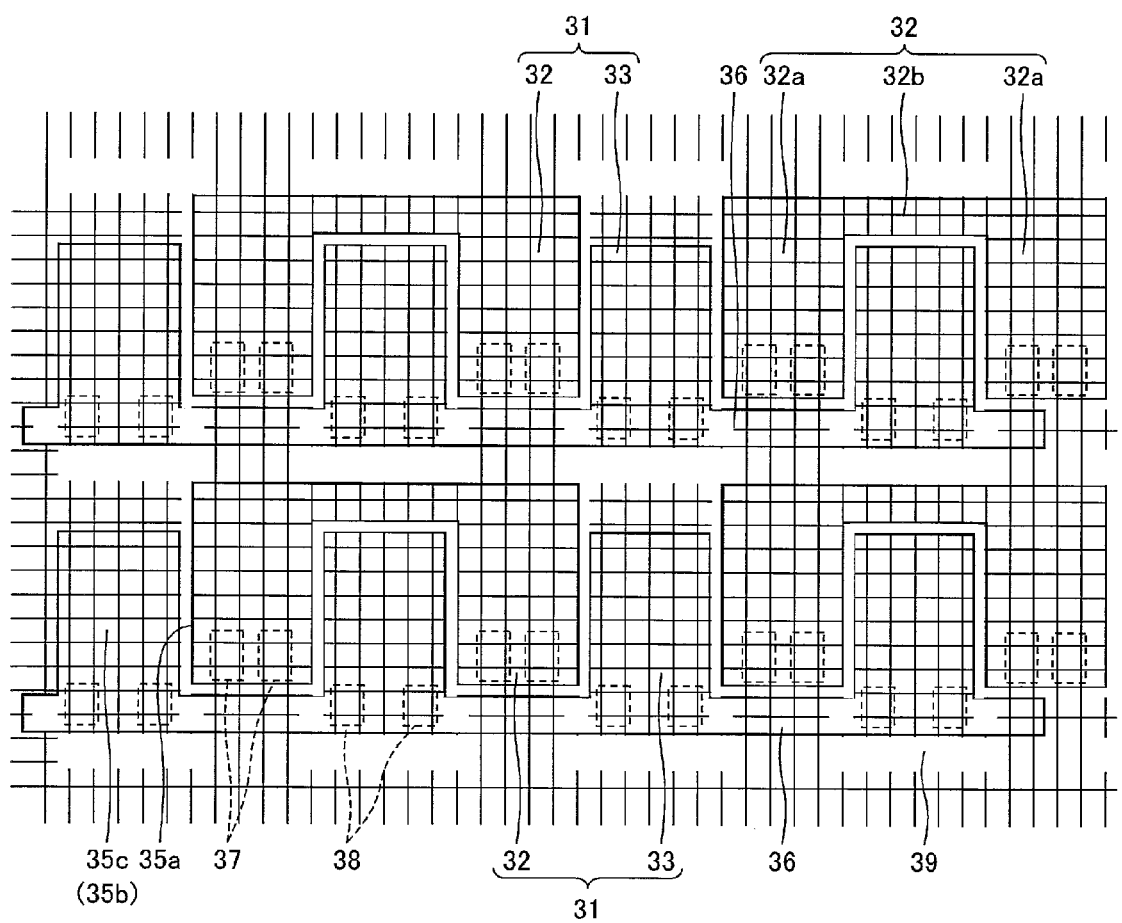
FIG. 37 is a plan view schematically showing a configuration of a main part of a touch panel layer of a touch panel substrate according to Embodiment 5.

FIG. 37 is a plan view showing a configuration of a main part of a touch panel layer 23 of a substrate 20 according to the present embodiment.

Embodiments 1 through 4 have each been described by taking, as an example, a case where the electrodes 32 and 33 are each (i) in a rectangular shape (for example, in a square shape) in plan view and (ii) so oriented as to have diagonals extending along the X-axis and the Y-axis.

The present embodiment is, in contrast, arranged as shown in FIG. 37 such that the electrodes 32 and 33 are each (i) in a rectangular pattern (an oblong shape in the example shown in FIG. 37) in plan view and (ii) so oriented as to have sides extending along the X-axis and the Y-axis.

The present embodiment, too, is configured such that electrodes 33 arranged along the X-axis are connected to each other via connecting wires 36 provided along the X-axis. In a case where the connecting wires 36 and the electrodes 33 are made of the same material, the electrodes 33 and the connecting wires 36 may be formed integrally on the same level.

In the example shown in FIG. 37, electrodes 33 arranged along the X-axis are connected to each other via connecting wires 36 at sides along the X-axis. Each row of electrodes 33 is thus formed in a comb shape.

On the other hand, electrodes 32 arranged along the Y-axis are each structured to include (i) two rectangular electrode parts 32a adjacent to each other along the X-axis and (ii) a connection part 32b provided along the X-axis via which the electrode parts 32a are connected to each other at sides along the X-axis.

As such, the electrodes 32 are so formed in a depressed shape as to engage with the comb-shaped pattern of the row of electrodes 33.

The electrodes 32 are each electrically connected, via contact holes 37 provided in its electrode parts 32a, to the metal bridge 35 constituted by a mesh metal.

The metal bridge 35 has a disconnection in the space between each of the electrodes 32 and an electrode 33 adjacent thereto, so that no electricity travels between the electrode 32 and the electrode 33.

As such, in the present embodiment, disconnecting lines 39 extending across the metal bridge 35 are so provided as to surround each electrode 33 in plan view.

This makes it possible to electrically connect the electrodes 32 and the metal bridge 35 to each other while preventing electricity from traveling between the electrodes 32 and the electrodes 33, thus making it possible to reduce the CR time constant.

Connecting only the electrodes 32 to the metal bridge 35 makes it possible to form, in each region surrounded by the disconnecting lines 39, a metal wiring part 35c that is electrically in the form of a floating island. The metal wiring part 35c in this case can be electrically connected to the counter electrode 27.

In contrast, forming, in the electrodes 33, contact holes 38 as indicated by chain double-dashed lines in FIG. 37 to connect the electrodes 33 and the metal bridge to each other makes it possible to form, in each region surrounded by the disconnecting lines 39, a metal wiring part 35b that is electrically connected to an electrode 33.

[Embodiment 6]

Another embodiment of the present invention is described below with reference to FIG. 38. For convenience of explanation, constituent elements of the present embodiment that are identical in function to their respective corresponding constituent elements used in Embodiments 1 through 5 are each assigned an identical reference sign, and as such, are not described here.

Figure 38:
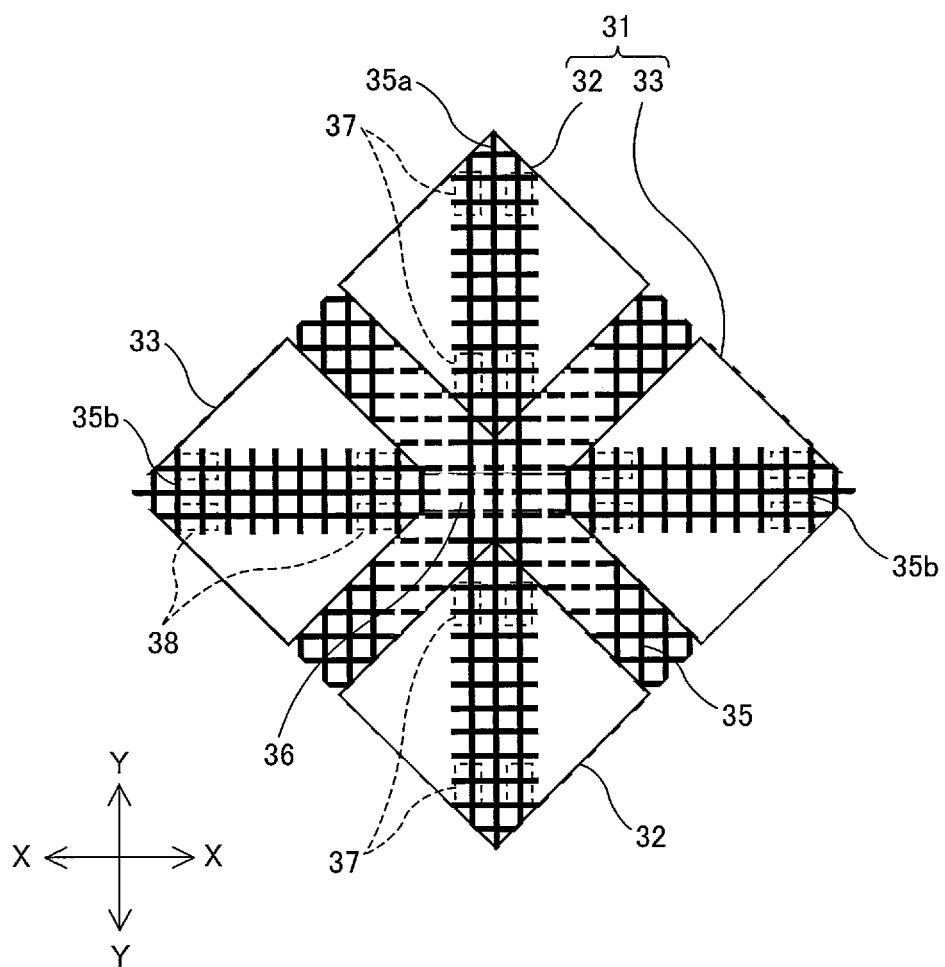
FIG. 38 is a plan view schematically showing a configuration of a main part of a touch panel layer of a touch panel substrate according to Embodiment 6.

FIG. 38 is a plan view showing a configuration of a main part of a touch panel layer 23 of a substrate 20 according to the present embodiment.

Embodiments 2, 3, and 5 have each been described by taking, as an example, a case where (i) the metal bridge 35 includes a metal mesh and (ii) disconnecting lines 39 are provided across the mesh metal so that a metal wiring part 35c that is electrically connected to neither of the electrodes 32 and 33 is formed in a region surrounded by the disconnecting lines 39.

The present embodiment is, in contrast, arranged as shown in FIG. 38 such that a portion of the metal bridge 35 is disconnected and removed which portion corresponds, in plan view, to a region other than connection parts at each of which electrodes 32 and 33 are connected to the metal bridge 35 via contact holes 37 and 38 (specifically, such connection parts correspond to (i) a region of each electrode 32 which region is between contact holes 37 and (ii) a region of each electrode 33 which region is between contact holes 38).

By thus eliminating a region of the metal bridge 35 which region is in the form of a floating island and which region is electrically connected to neither of the electrodes 32 and 33, the present embodiment makes it possible to reduce the parasitic capacitance between the counter electrode 27 and such a region of the metal bridge 35 which region is in the form of a floating island.

[Embodiment 7]

Another embodiment of the present invention is described below with reference to FIGS. 39 and 40. For convenience of explanation, constituent elements of the present embodiment that are identical in function to their respective corresponding constituent elements used in Embodiments 1 through 6 are each assigned an identical reference sign, and as such, are not described here.

Embodiments 1 through 6 have each been described by taking, as an example, a case where the metal bridge 35 used is a grid of metal wires (namely, a metal mesh).

The metal bridge 35 is, however, not necessarily in the form of a grid. That is, the metal bridge 35 need only bridge-connect at least either the electrodes 32 or the electrodes 33 to each other across a direction intersecting the direction along which the other electrodes are arranged.

Figure 39:
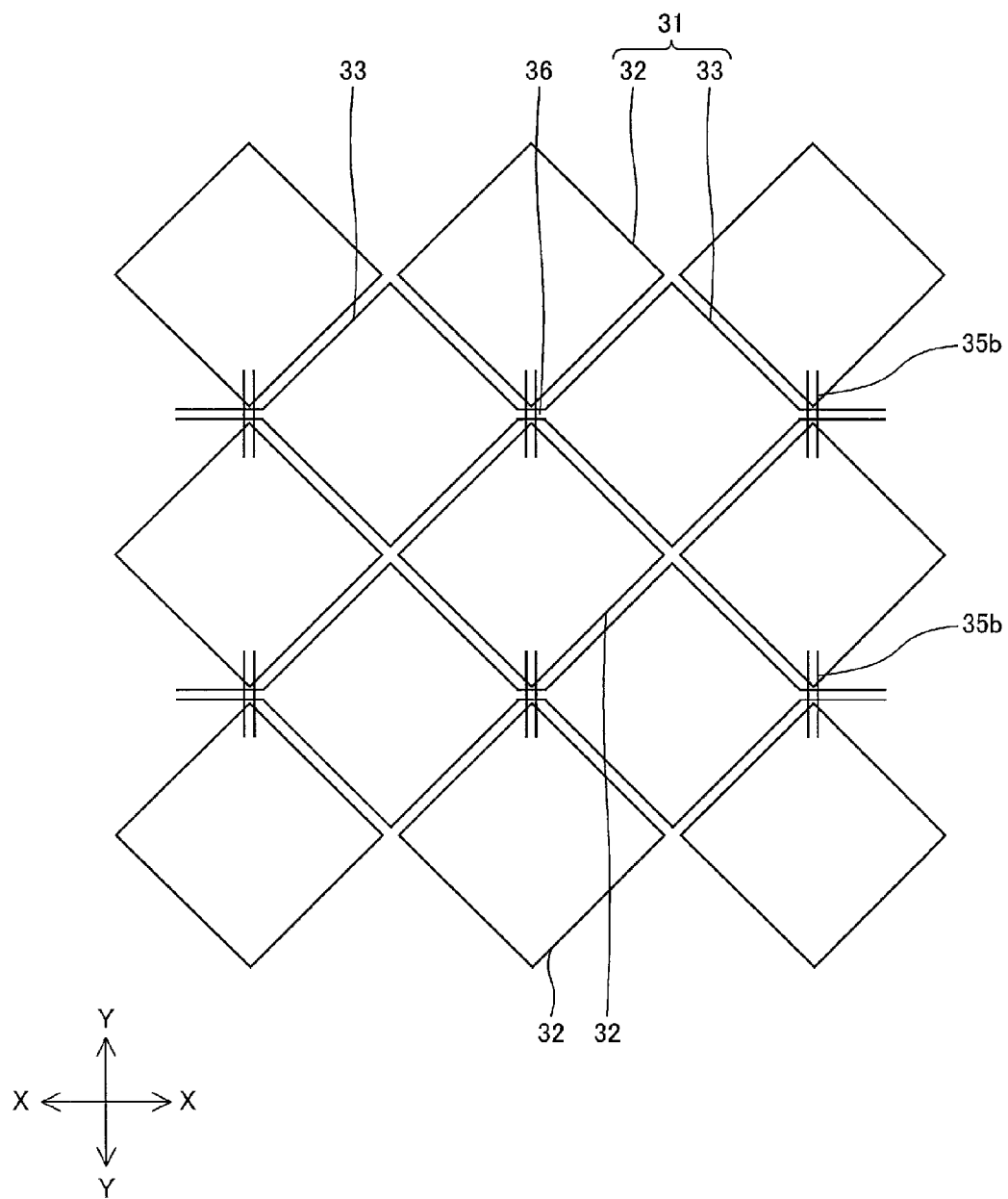
FIG. 39 is a plan view schematically showing a configuration of a main part of a touch panel layer of a touch panel substrate according to Embodiment 7.

FIGS. 39 and 40 are each a plan view showing a configuration of a main part of a touch panel layer 23 of a substrate 20 according to the present embodiment.

FIGS. 39 and 40 each illustrate an example in which (i) the metal bridge 35 includes linear wires (Y-wires in the present embodiment) and (ii) the metal bridge 35 is so provided across electrodes 32 arranged along the Y-axis as to bridge-connect those electrodes 32 to each other.

In this case, the insulating layer 34 is not necessarily provided to entirely cover the electrodes 32 and 33. That is, the insulating layer 34 needs only to be provided between (i) the metal bridge 35 and (ii) the electrodes 32 and 33 and the connecting wires 36 (that is, in a region in plan view in which region the metal bridge 35 is provided).

This allows the metal bridge 35 to bridge-connect the electrodes 32 to each other without electrically connecting to the electrodes 33.

<Modifications>

Embodiments 1 through 6 have each been described by taking, as an example, a case where in the plane in which the electrodes 32 and 33 are formed, (i) either the electrodes 32 or the electrodes 33 are in an isolated pattern and (ii) the other electrodes are connected to each other via the connecting wires 36.

It is, however, at least either the electrodes 32 or the electrodes 33 that need to be in such a pattern as to be isolated from each other along a direction intersecting the direction along which the other electrodes are arranged. Thus, it may be both the electrodes 32 and the electrodes 33 that are in an isolated pattern.

In a case where at least either the electrodes 32 or the electrodes 33 are in an isolated pattern in the plane in which the electrodes 32 and 33 are formed, a metal bridge can connect the electrodes 32 or electrodes 33 to each other so that the electrodes 32 and 33 are not in contact with each other and not electrically connected to each other.

That is, the present embodiment is only required to be configured such that at least either the electrodes 32 or the electrodes 33 are bridge-connected to each other via a metal bridge so provided across those electrodes along a direction intersecting the direction along which the other electrodes are arranged. This make it possible to connect the electrodes 32 or electrodes 33 to each other so that the electrodes 32 and 33 are not electrically connected to each other.

In a case where in the plane in which the electrodes 32 and 33 are formed, (i) at least either the electrodes 32 or the electrodes 33 are connected to each other via connecting wires, (ii) the other electrodes are in such a pattern as to be isolated from each other in a direction intersecting the direction along which the first group are arranged, and (iii) a metal bridge is formed at least along the direction along which the isolated pattern is provided, it is possible to connect the electrodes 32 or electrodes 33 to each other so that the electrodes 32 and 33 are not electrically connected to each other, and to simply and easily connect the electrodes 32 to each other or the electrodes 33 to each other.

[Embodiment 8]

Another embodiment of the present invention is described below with reference to (a) and (b) of FIG. 41 through FIG. 43. For convenience of explanation, constituent elements of the present embodiment that are identical in function to their respective corresponding constituent elements used in Embodiments 1 through 7 are each assigned an identical reference sign, and as such, are not described here.

Figure 41:
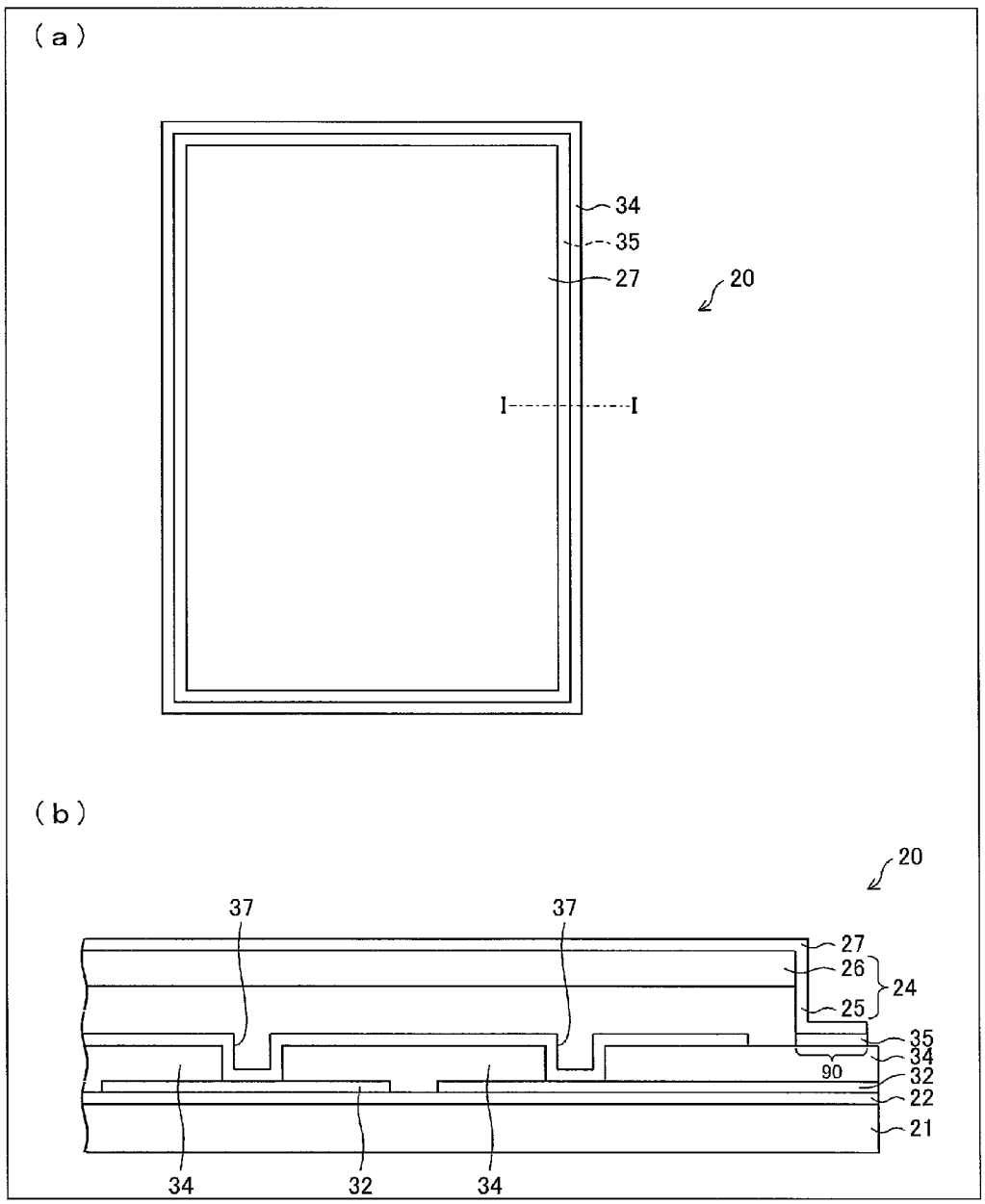
FIG. 41 is a set of diagrams (a) and (b), (a) being a plan view schematically showing a configuration of a touch panel substrate according to Embodiment 8, (b) being a cross-sectional view of the touch panel substrate taken along the line I-I shown in (a) of FIG. 41.

(a) of FIG. 41 is a plan view schematically showing a configuration of a substrate 20 according to the present embodiment. (b) of FIG. 41 is a cross-sectional view showing the substrate 20 as taken along the line I-I in (a) of FIG. 41.

Figure 42:
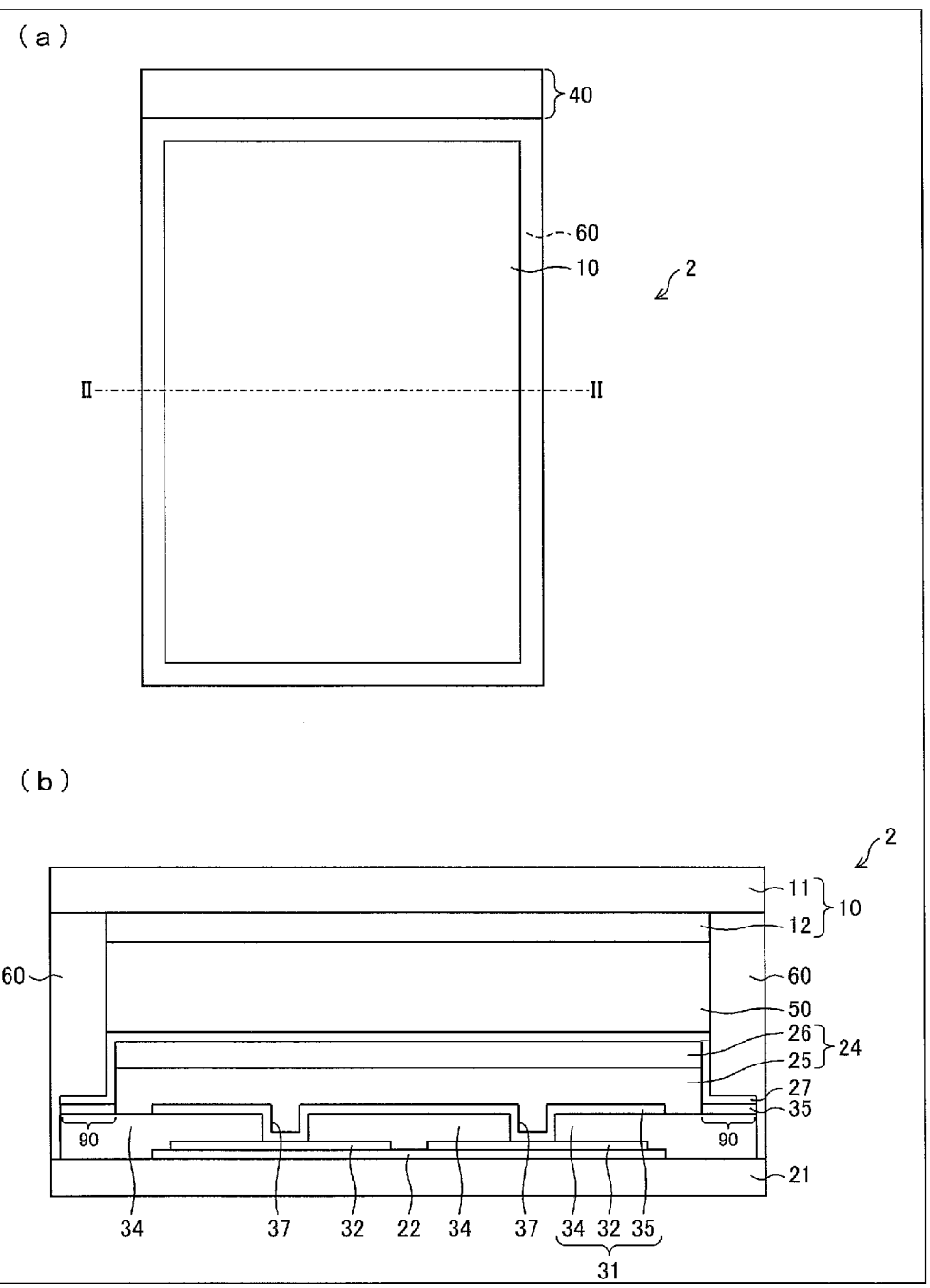
FIG. 42 is a set of diagrams (a) and (b), (a) being a plan view schematically showing a configuration of a liquid crystal panel according to Embodiment 8, (b) being a cross-sectional view of the liquid crystal panel taken along the line II-II shown in (a) of FIG. 42.

Further, (a) of FIG. 42 is a plan view schematically showing a configuration of a liquid crystal panel 2 according to the present embodiment. (b) of FIG. 42 is a cross-sectional view showing the liquid crystal panel 2 as taken along the line II-II in (a) of FIG. 42.

As shown in (b) of FIG. 41 and (b) of FIG. 42, the metal bridge 35 includes an outer peripheral part 90 (outer peripheral edge) that serves as a connection part (sealing part) to connect the substrate 20 and the substrate 10 to each other, the outer peripheral part 90 being electrically disconnected from the electrodes 32 and 33.

The present embodiment is configured such that the counter electrode 27 is electrically connected to the outer peripheral part 90 (shielded line) of the metal bridge 35. That is, as shown in (b) of FIG. 42, the counter electrode 27 is electrically connected to the shielded line of the metal bridge 35 at the sealing part at which the seal material 60 is provided. This makes it possible to reduce the resistance of the counter electrode 27 at the sealing part as well, thus making it possible to reduce the CR time constant.

Mounting the substrate 20 in the liquid crystal panel 2 as described above makes it possible to reduce the resistance of the counter electrode 27 as described above, thus making it possible to improve the display performance of the liquid crystal panel 2.

Connecting the counter electrode 27 and the shielded line to each other makes it possible prevent noise from, for example, wires for use in TFTs.

Further, as shown in (b) of FIG. 41 and (b) of FIG. 42, the present embodiment is configured such that the counter electrode 27 is formed (as a film) on the metal bridge 35 at the outer peripheral part of the substrate 20 so that the metal bridge 35 and the counter electrode 27 are electrically connected to each other.

The present embodiment can thus omit the production step of electrically connecting the metal bridge 35 and the counter electrode 27 to each other, that is, the step of forming contact holes 28 via which the metal wiring parts 35*c* of the metal bridge 35 and the counter electrode 27 are electrically connected to each other, the metal wiring parts 35*c* being electrically connected to neither of the electrodes 32 and 33. This makes it possible to simplify the process for producing the substrate 20 and reduce production costs.

The touch panel layer 23 has lead wires (not illustrated) that are connected to a wiring pattern (not illustrated) in an active-matrix layer 12 (TFT pixel section) of the substrate 10 via electrically conductive particles, such as gold beads, which are contained in the seal material 60.

<Modifications>

Figure 43:
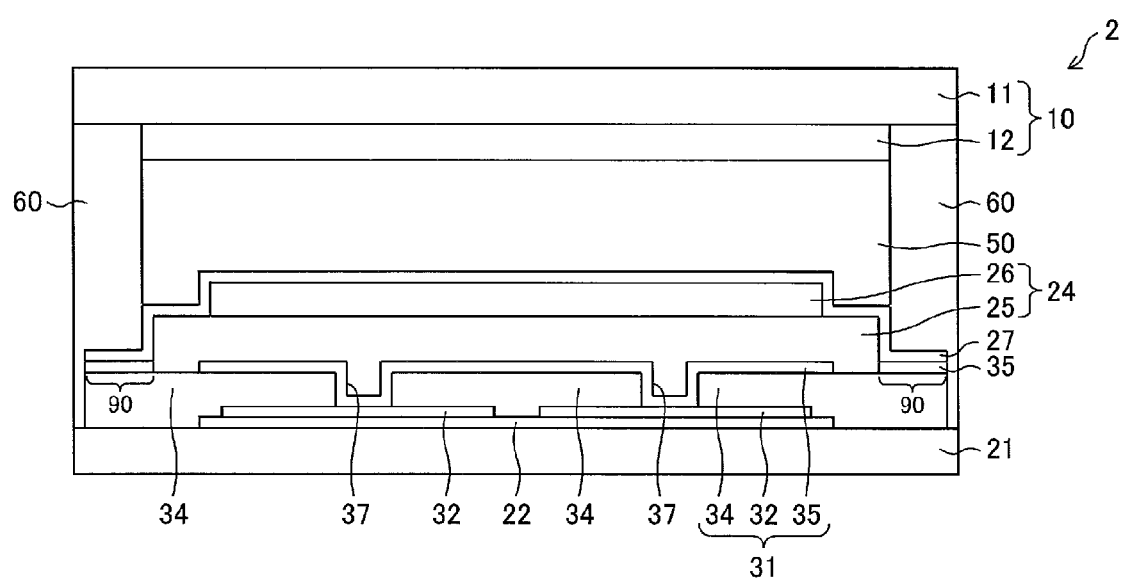
FIG. 43 is a cross-sectional view schematically showing another liquid crystal panel according to Embodiment 8.

FIG. 43 is a cross-sectional view schematically showing a liquid crystal panel 2 according to the present embodiment. FIG. 43 is a cross-sectional view showing the liquid crystal panel 2 as taken along the line II-II in (a) of FIG. 42.

FIG. 42 shows an example case where a CF layer 26 is so provided as to be adjacent, via the counter electrode 27, to the region in which the seal material 60 is provided.

FIG. 43 shows a case where the CF layer 26 is formed in a light blocking region provided by the light blocking layer 22. This allows the seal material 60 to block light around a boundary edge of the CF layer 26, thus making it possible to prevent light leakage at a peripheral edge of the CF layer 26.

[Embodiment 9]

Another embodiment of the present invention is described below with reference to FIGS. 44 and 45. For convenience of explanation, constituent elements of the present embodiment that are identical in function to their respective corresponding constituent elements used in Embodiments 1 through 8 are each assigned an identical reference sign, and as such, are not described here.

Figure 44:
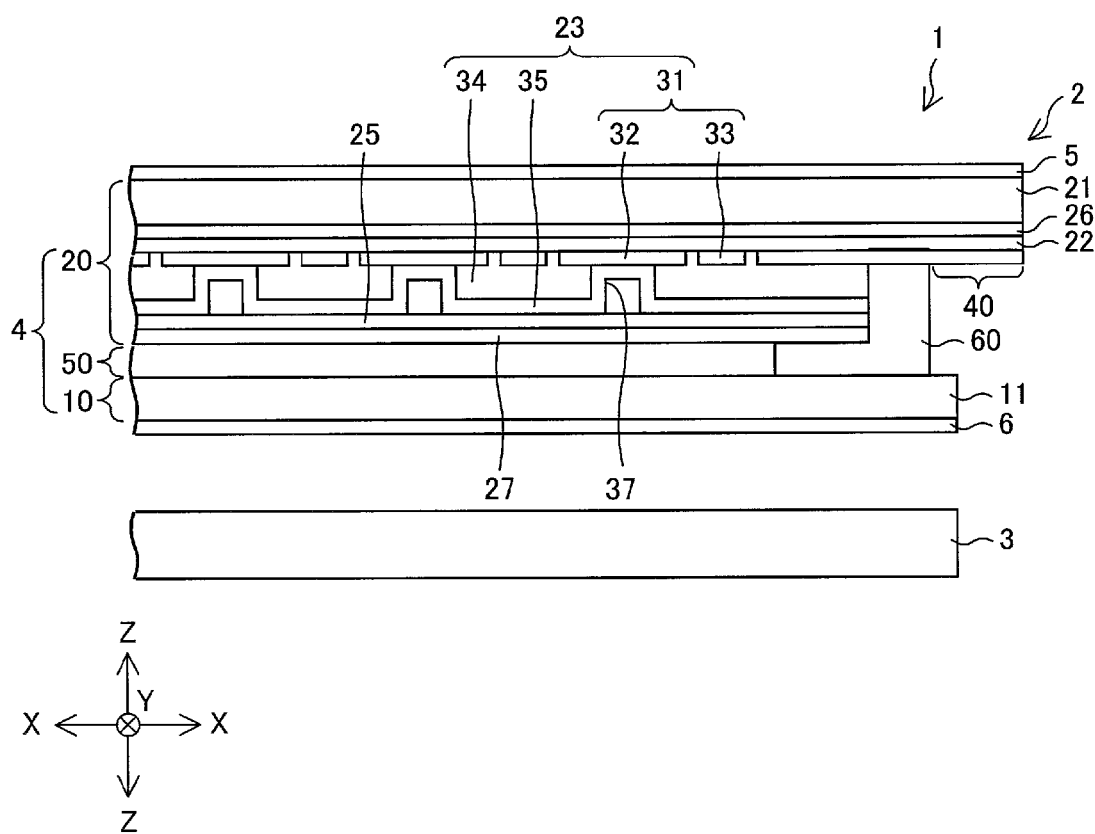
FIG. 44 is a cross-sectional view schematically showing a configuration of a main part of a liquid crystal display device according to Embodiment 9.

FIG. 44 is a cross-sectional view schematically showing a configuration of a main part of a liquid crystal display device according to the present embodiment. FIG. 45 is a cross-sectional view schematically showing a configuration of a main part of a substrate 20, with the constituent layers stacked in the order shown.

Figure 45:
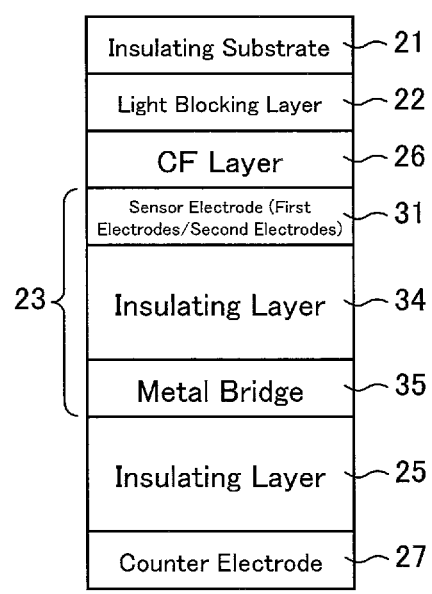
FIG. 45 is a cross-sectional view schematically showing a configuration of a main part of a touch panel substrate according to Embodiment 9, with the constituent layers stacked in the order shown.

As shown in FIGS. 44 and 45, the substrate 20 according to the present embodiment, includes an insulating substrate 21, a light blocking layer 22 (BM), a CF layer 26, a touch panel layer 23, an insulating layer 25, and a counter electrode 27, with these constituent elements stacked in the order named.

That is, the substrate 20 according to the present embodiment is identical in configuration to the substrate 20 according to any one of Embodiments 1 through 7, except that the CF layer 26 is provided.

The present embodiment facilitates alignment of the light blocking layer 22 and the CF layer 26 with each other when the light blocking layer 22 (BM) is provided to block light between different colors of the CF layer.

Further, the present embodiment can form electrode patterns for the sensor electrode 31, the counter electrode 27 and the like on a substrate that includes an insulating substrate 21 and that also includes a light blocking layer 22 and a CF layer 26 both provided in advance on the insulating substrate 21. This configuration can consequently divide the production process into (i) the preparation of the above substrates and (ii) the wiring for formation of electrode patterns and the like, and can thus reduce processing costs.

Providing a CF layer 26 between the metal bridge 35 and the counter electrode 27 as described in Embodiments 1 through 7 makes it possible, on the other hand, to distance the sensor electrode 31 and the counter electrode 27 as much as possible from each other. This makes it possible to reduce the parasitic capacitance between the sensor electrode 31 and the counter electrode 27.

[Embodiment 10]

Another embodiment of the present invention is described below with reference to (a) and (b) of FIG. 46 through FIG. 48. For convenience of explanation, constituent elements of the present embodiment that are identical in function to their respective corresponding constituent elements used in Embodiments 1 through 9 are each assigned an identical reference sign, and as such, are not described here.

(a) of FIG. 46 is a plan view showing a display driving terminal and a touch panel terminal of the liquid crystal panel 2. (b) of FIG. 46 is an enlarged view of a portion corresponding to the touch panel terminal (encircled region) shown in (a) of FIG. 46.

Figure 47:
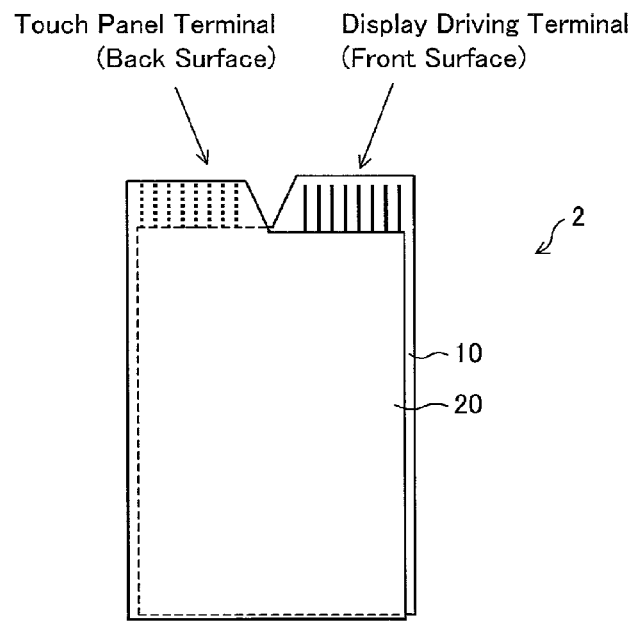
FIG. 47 is another plan view showing a display driving terminal and a touch panel terminal of a liquid crystal panel according to Embodiment 10.
Figure 48:
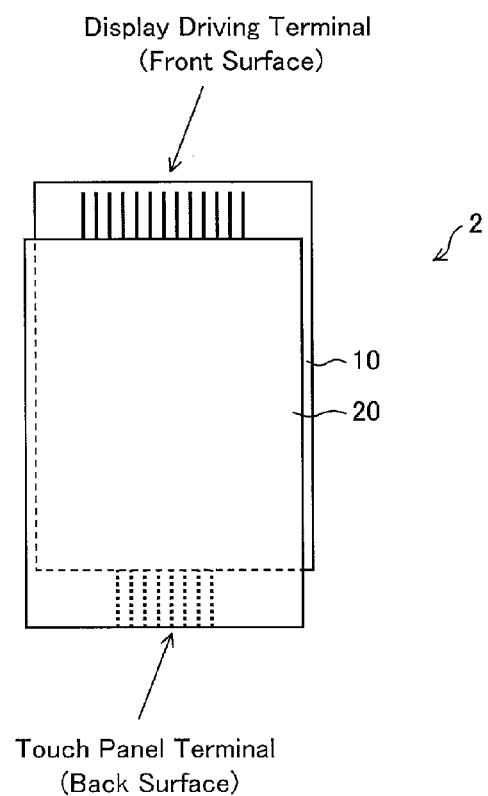
FIG. 48 is another plan view showing a display driving terminal and a touch panel terminal of a liquid crystal panel according to Embodiment 10.
Figure 49:
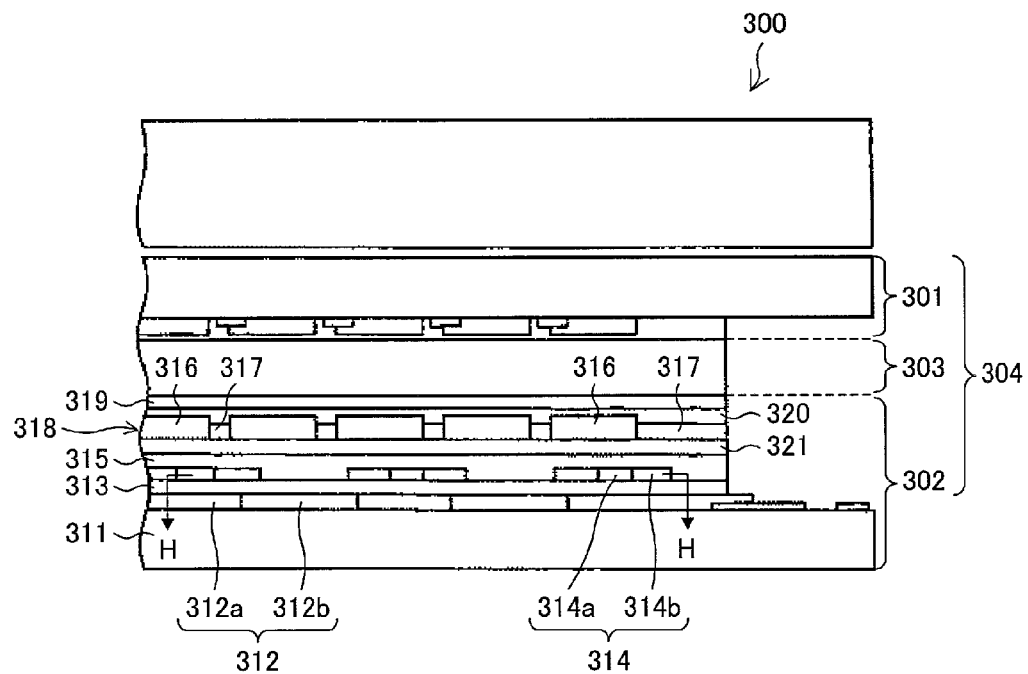
FIG. 49 is a cross-sectional view showing a configuration of a display device described in Patent Literature 2.
Figure 50:
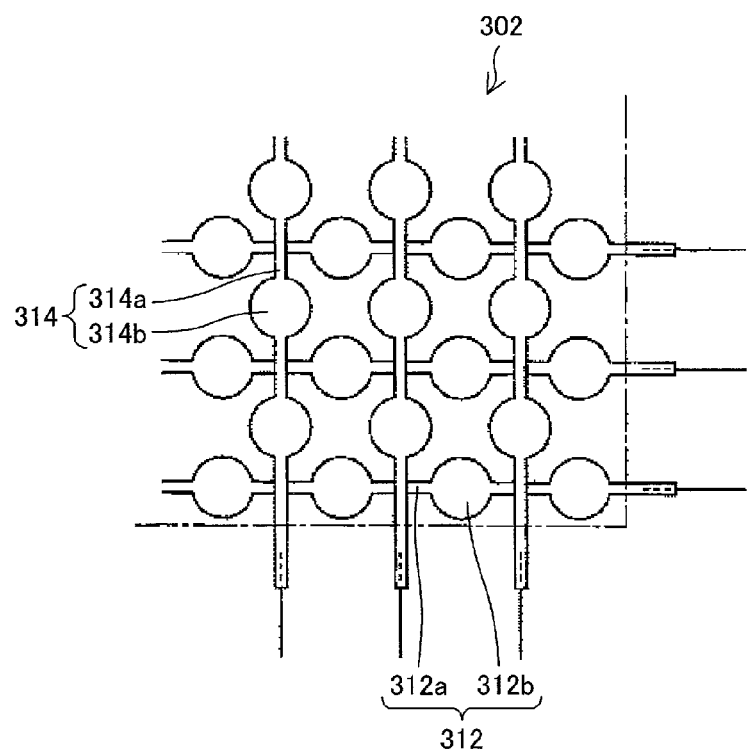
FIG. 50 is a plan view showing a configuration of a sensor electrode in a cross-section taken along the line H-H shown in FIG. 49.
Figure 51:
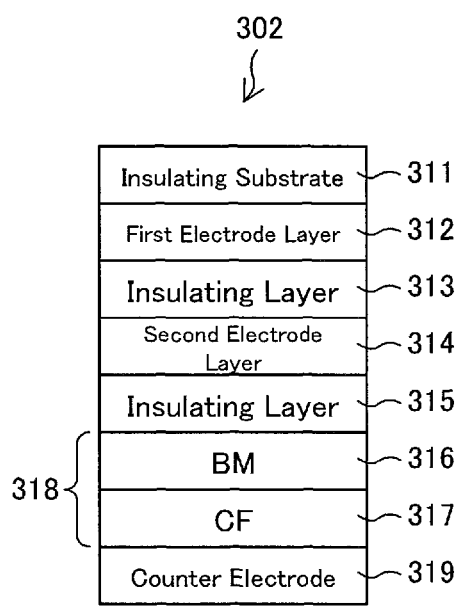
FIG. 51 is a cross-sectional view showing a configuration of a main part of a color filter substrate of a display device described in Patent Literatures 2 and 3, with the constituent layers stacked in the order shown.

Each of FIGS. 47 and 48 is another plan view showing a display driving terminal and a touch panel terminal of the liquid crystal panel 2.

As shown in (a) of FIG. 46, the liquid crystal panel 2 is arranged such that both a front surface of the display driving terminal and that of the touch panel terminal face in the same direction (vertically upward from the plane of paper of (a) of FIG. 46).

As shown in (b) of FIG. 46, the terminal provided on the front surface of the touch panel is connected, via contact parts, to a signal wire (touch panel wire) on a back surface. Specifically, the touch panel terminal and the signal wire on the back surface are electrically connected to each other at contact parts via electrically conductive particles, such as gold beads, which are provided inside the sealing part.

This makes it possible to form a display driving terminal and a touch panel terminal so that they face in the same direction, thus making it possible to connect the display driving terminal and the touch panel terminal to circuits on the side of one of the substrates 10 and 20, namely, on the side of the substrate 10.

The terminal areas in a frame region of the liquid crystal panel 2 are, however, not limited to the above configuration, and may be arranged as shown, for example, in FIG. 47 or 48.

The liquid crystal panel 2 shown in FIG. 47 is configured such that (i) the respective terminal areas of the substrates 10 and 20 are each partially cut off obliquely and placed so as not to overlap each other, so that the front surface of the touch panel terminal and that of the display driving terminal face each other.

The liquid crystal panel 2 shown in FIG. 48 is configured such that the substrates 10 and 20 are drawn in opposite directions to be placed so as not to entirely overlap each other, so that the substrates 10 and 20 has their respective terminal areas. The liquid crystal panel 2 shown in FIG. 48 is therefore configured such that the front surface of the touch panel terminal and that of the display driving terminal face each other and are symmetric with respect to the center of the liquid crystal panel 2.

The above configuration of the terminal areas is commonly applicable to the substrate 20 of any of the above-described embodiments.

<Modifications>

The embodiments described above have each been described by taking, as an example, a case where the touch panel layer 23 is provided on a counter substrate, in particular, a CF substrate. The present invention is, however, not limited to such a configuration. The touch panel layer 23 may alternatively be provided on an array substrate such as an active-matrix substrate.

Providing the touch panel layer 23 on a counter substrate allows signal lines (for example, gate lines and source lines) provided on an array substrate for image display to be separated from the touch panel layer 23. The above configuration can thus, in comparison to the case where the touch panel layer 23 is provided on an array substrate, further reduce the occurrence of noise and improve the sensitivity of the touch panel.

<Summary of Main Points>

As described above, a touch panel substrate that is used as one of a pair of substrates between which an electro-optic element is sandwiched and that is provided with a position detecting electrode which detects, according to a change in capacitance, a position on coordinates as indicated by an object to be detected, the touch panel substrate including: an insulating substrate; an electro-optic element driving electrode which applies an electric field to the electro-optic element; and the position detecting electrode provided between the insulating substrate and the electro-optic element driving electrode and being insulated from the electro-optic element driving electrode, the position detecting electrode including a plurality of first electrodes arranged along a first direction and a plurality of second electrodes arranged along a second direction perpendicular to the first direction and insulated from the first electrodes, the first electrodes and the second electrodes being formed in a same plane.

The foregoing configuration makes it possible to reduce the parasitic capacitance between the first and second electrodes and the electro-optic element driving electrode in comparison with a case where the first electrodes and the second electrodes are provided as separate layers. This makes it possible to provide a touch panel substrate which is used in an in-cell touch panel and which is high in position detection performance and capable of carrying out a stable position detecting operation.

Further, the foregoing configuration makes it possible to reduce the parasitic capacitance even in a case where the first and second electrodes are in a planar-shaped pattern, and as such, makes it possible to reduce the parasitic capacitance while ensuring the magnitude of the detection signal. Further, the present embodiment makes it possible to form the first and second electrodes of the same material at the same time by forming the first and second electrodes in the same plane, thus making it possible to reduce processing costs.

The touch panel substrate is preferably configured such that in the plane in which the first electrodes and the second electrodes are formed, at least either the first or second electrodes are in an isolated pattern in which the at least either first or second electrodes are isolated from each other along a direction intersecting a direction along which the other electrodes are arranged.

The foregoing configuration makes it possible to prevent the first electrodes and the second electrodes from contacting each other and, moreover, to make connections between the first electrodes and connections between the second electrodes so that no electricity travels between the first electrodes and the second electrodes.

The touch panel substrate is preferably configured to further include metal wires provided on a different level from the first electrodes and the second electrodes, wherein the metal wires make bridge connections between at least either the first or second electrodes in such a way as to bridge between the at least either first or second electrodes along the direction intersecting the direction along which the other electrodes are arranged.

By making bridge connections between at least either the first or second electrodes in such a way as to bridge between the at least either first or second electrodes along the direction intersecting the direction along which the other electrodes are arranged, the foregoing configuration makes it possible to make connections between the first electrodes and connections between the second electrodes so that no electricity travels between the first electrodes and the second electrodes.

Further, the foregoing configuration makes it possible to reduce the resistance of the position detecting electrode, thus making it possible to reduce the CR time constant.

It should be noted that the first and second electrodes be transparent electrodes.

Since the first and second electrodes are transparent electrodes and bridge connections are made between either the first or second electrodes via metal wires as mentioned above, the resistance of the position detecting electrode can be reduced while the optical transmittance and the area of the transparent region are ensured. Therefore, mounting the touch panel substrate in a display panel makes it possible to reduce the resistance of the position detecting electrode while ensuring the aperture ratio of the display panel.

Further, the touch panel substrate is preferably configured such that: in the plane in which the first electrodes and the second electrodes are formed, at least either the first or second electrodes are connected via connecting wires, and the other electrodes are in an isolated pattern in which the other electrodes are isolated from each other along a direction intersecting a direction along which the at least either first or second electrodes are arranged; and the metal wires are formed in such a way as to extend at least along a direction along which the other electrodes are arranged in the isolated pattern.

The foregoing configuration makes it possible to make connections between the first electrodes and connections between the second electrodes so that no electricity travels between the first electrodes and the second electrodes and, in the plane in which the first electrodes and the second electrodes are formed, make connections between either the first or second electrodes via connecting wires and make bridge connections between the other electrodes, thus making it possible to simply and easily make connections between the first electrodes and connections between the second electrodes.

It should be noted that the touch panel substrate is preferably configured such that the metal wires are sandwiched between the first and second electrodes and the electro-optic element driving electrode.

Providing the metal wires so that they are closer to the electro-optic element driving electrode than the first and second electrodes makes it possible to distance the first and second electrodes and the electro-optic element driving electrode as much as possible from each other, thus making it possible to reduce the parasitic capacitance between the first and second electrodes and the electro-optic element driving electrode.

Moreover, since the metal wires are in the shape of wires (i.e., in a linear-shaped pattern), the parasitic capacitance between the metal wires and the electro-optic element driving electrode is small.

Further, the touch panel substrate is preferably configured to further include an organic insulating layer sandwiched as an insulating layer at least either between the metal wires and the first and second electrodes or between the metal wires and the electro-optic element driving electrode.

An organic insulating film can made thicker and is lower in relative permittivity than an inorganic insulating film.

Therefore, because of the organic insulating layer (layer made of an organic insulating film) sandwiched either between the metal wires and the first and second electrodes or between the metal wires and the electro-optic element driving electrode, the parasitic capacitance between the position detecting electrode and the electro-optic element driving electrode can be reduced in terms of both an increase in film thickness and a reduction in relative permittivity.

Further, the touch panel substrate is preferably configured to further include a light blocking layer in a form of a grid on the insulating substrate, the light blocking layer covering the metal wires as seen in plan view.

The foregoing configuration makes it possible to block light from the region where the metal wires are formed, and to block light leaking laterally from the metal wires and light reflected by the metal wires.

Further, the touch panel substrate is preferably configured such that the metal wires are a grid of metal wires.

The foregoing configuration allows the resistance of the position detecting electrode to be reduced by the grid of metal wires. This makes it possible to reduce the CR time constant.

It should be noted that it is preferable that the light blocking layer has a shape corresponding to that of the metal wires.

Since the light blocking layer has a shape corresponding to that of the metal wires, the same mask pattern can be used both for the formation of the light blocking layer and the formation of the metal wires. This makes it possible to reduce the number of masks, thus making it possible to reduce processing costs.

Further, the touch panel substrate is preferably configured such that the metal wires make bridge connections between each separate one of the electrodes and another via at least one contact hole formed in an insulating layer sandwiched between the metal wires and electrodes connected via the metal wires.

The foregoing configuration allows bridge connections to be easily made by the grid of metal wires. Therefore, the process can be simplified, and the processing cost can be reduced.

Further, the touch panel substrate is preferably configured such that the contact holes are formed at branch line parts of the metal wires, the branch line parts intersecting trunk lines connecting electrodes connected via the metal wires.

Since the contact holes are formed at branch line parts, not the trunk lines, of the metal wires, the foregoing configuration makes it possible to prevent a disconnection and improve yields.

Further, it is preferable that a plurality of these contact holes be arranged for each electrode.

The foregoing configuration makes it possible to ensure the area of the connection parts between the metal wires and the electrodes and reduce the resistance of the position detecting electrode, thus making the CR time constant.

Further, it is preferable that the contact holes be so formed as to bridge a plurality of wires extending parallel to a trunk line of the metal wires, the trunk line connecting electrodes connected via the metal wires.

It is here preferable, for example, that the contact holes be so formed as to bridge a plurality of grid portions of the metal wires.

The foregoing configuration makes it possible to ensure the area of the connection parts between the metal wires and the electrodes and reduce the resistance of the position detecting electrode, thus making the CR time constant.

Further, the touch panel substrate is preferably configured such that: in the plane in which the first electrodes and the second electrodes are formed, either the first or second electrodes are connected via transparent connecting wires; the first electrodes and the second electrodes are each electrically connected to the metal wires via the contact holes; and the metal wires have disconnections between the contact holes provided for the first electrodes and contact holes provided for the second electrodes, so that no electricity travels between the first electrodes and the second electrodes.

For example, the metal wires have, between the contact holes provided for the first electrodes and the contact holes provided for the second electrodes, disconnecting lines that divide the metal wires into a plurality of metal wiring parts, the metal wires being divided by the disconnecting lines into those metal wiring parts connected to the first electrodes and those metal wiring parts connected to the second electrodes.

The foregoing configuration makes it possible for each of the first and second electrodes to be electrically connected to the metal wire, without causing electricity to travel between the first and second electrodes. This makes it possible to reduce the resistance of the position detecting electrode, thus making it possible to reduce the CR time constant.

Further, the touch panel substrate is preferably configured such that those of the first and second electrodes which are connected via transparent connecting wires are provided with the contact holes at electrode edge parts connected via the connecting wires.

The foregoing configuration makes it possible to reduce the area in which electricity travels through the transparent connecting wires alone. This makes it possible to reduce the resistance of the position detecting electrode, thus making it possible to reduce the CR time constant.

Further, the touch panel substrate is preferably configured such that: (1) the metal wires have at least one disconnecting line which divides the metal wires into a plurality of metal wiring parts, the at least one disconnecting line being between the contact holes provided for the first electrodes and contact holes provided for the second electrodes; and (2) the metal wires have metal wiring parts which are divided by the at least one disconnecting line between the contact holes provided for the first electrodes and the contact holes provided for the second electrodes and which are not electrically connected to the first electrodes or the second electrodes.

The formation, between the contact holes provided for the first electrodes and the contact holes provided for the second electrodes, of floating islands formed by metal wiring parts which are not electrically connected to the first electrodes or the second electrodes makes it possible to prevent a short circuit between those metal wiring parts connected to the first electrodes and those metal wiring parts connected to the second electrodes. This makes it possible to suppress a reduction in yield due to such a short circuit.

Further, the foregoing configuration makes it possible to cause cross capacitances (capacitances that do not vary depending on whether or not an object to be detected is in contact) that are formed between the first electrodes and the second electrodes to be reduced by the floating islands (metal wiring parts not connected to the first electrodes or the second electrodes). This makes it possible to reduce the CR time constant and makes it easy for the touch panel to carry out a position detecting operation.

Furthermore, the foregoing configuration makes it possible to form, without forming another metal layer, metal wiring parts insulated from the first and second electrodes. In other words, the foregoing configuration makes it possible to form, without increasing the number of components or the film thickness, metal wiring parts insulated from the first and second electrodes.

Further, the touch panel substrate is preferably configured such that those metal wiring parts which are not electrically connected to the first electrodes or the second electrodes are electrically connected to the electro-optic element driving electrode.

Since those metal wiring parts which are not electrically connected to the first electrodes or the second electrodes are electrically connected to the electro-optic element driving electrode, the foregoing configuration makes it possible to reduce the resistance of the electro-optic element driving electrode. This makes it possible to reduce the CR time constant. Further, mounting the touch panel substrate in a display panel makes it possible to reduce the resistance of the electro-optic element driving electrode, thus making it possible to improve the display performance of the display panel.

Further, the touch panel substrate is preferably configured such that the metal wires have outer peripheral parts which serve as connecting parts with the other one of the pair of substrates and which are electrically disconnected from the first electrodes and the second electrodes, and the electro-optic element driving electrode is electrically connected to the outer peripheral parts of the metal wires.

The foregoing configuration makes it possible to reduce the resistance of the electro-optic element driving electrode. This makes it possible to reduce the CR time constant. Further, mounting the touch panel substrate in a display panel makes it possible to reduce the resistance of the electro-optic element driving electrode, thus making it possible to improve the display performance of the display panel.

Further, the touch panel substrate is preferably configured such that a color filter having a plurality of colors is provided between the light blocking layer and the position detecting electrode so as to be adjacent to the light blocking layer.

The foregoing configuration facilitates alignment of the light blocking layer and the color filter with each other when the light blocking layer is provided to block light between the different colors of the color filter.

Further, the foregoing configuration can form electrode patterns for the position detecting electrode, the electro-optic element driving electrode, and the like on a substrate that includes an insulating substrate and that also includes a light blocking layer and a color filter both provided in advance on the insulating substrate. This configuration can consequently divide the production process into (i) the preparation of the above substrates and (ii) the wiring for formation of electrode patterns and the like, and can thus reduce processing costs.

Further, the touch panel substrate is preferable configured such that: the metal wires are provided between the first and second electrodes and the electro-optic element driving electrode; and a color filter having a plurality of colors is provided between the metal wires and the electro-optic element driving electrode.

In the foregoing configuration, where a color filter is provided, the formation of the color filter between the metal wires and the electro-optic element driving electrode makes it possible to distance the first and second electrodes and the electro-optic element driving electrode as much as possible from each other. This makes it possible to reduce the parasitic capacitance between the first and second electrodes and the electro-optic element driving electrode.

Further, as described above, an electro-optic device in an aspect of the present invention includes: an electro-optic element; and a pair of substrates between which the electro-optic element is sandwiched, one of the pair of substrates being a touch panel substrate as described above.

By using the touch panel substrate as one of the pair of substrates, the foregoing configuration can provide a touch-panel-integrated electro-optic device which includes an in-cell touch panel and which is high in position detection performance and capable of carrying out a stable position detecting operation.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a touch panel substrate that is used in an in-cell touch panel and an electro-optic device including such a touch panel substrate. Examples of the electro-optic device include display panels such as liquid crystal panels, organic EL display panels, and electrophoretic display panels, display devices in which such display panels are used, and viewing-angle control panels.

REFERENCE SIGNS LIST

1 Liquid crystal display device (electro-optic device)
2 Liquid crystal panel (electro-optic device)
3 Backlight
4 Liquid crystal cell
5 Polarization plate
6 Polarization plate
10 Substrate
11 Insulating substrate
12 Active-matrix layer
20 Substrate (touch panel substrate)
21 Insulating substrate
22 Light blocking layer
23 Touch panel layer
24 Resin layer
25 Insulating layer
26 CF layer (color filter)
27 Counter electrode
28 Contact hole
30 Liquid crystal layer (electro-optic element)
31 Sensor electrode (position detecting electrode)
32 Electrode (position detecting electrode)
32a Electrode part
32b Connection part
33 Electrode (position detecting electrode)
34 Insulating layer
34a Opening
35 Metal bridge
35A Central trunk line
35B Branch line part
35a Electrode wiring part
35b Metal wiring part
35c Metal wiring part
36 Connecting wire
37 Contact hole
38 Contact hole
39 Disconnecting line
40 Terminal area
50 Liquid crystal layer
60 Seal material
70 Fingertip
71 Capacitor
90 Outer peripheral part
100 Position detecting circuit
101 Drive-line driving circuit
102 Sense-line driving circuit
103 Touch panel controller
104 Timing controller
111 Sampling circuit 112 Storage capacitor
113 Output amplifier
114 Reset switch
115 Measuring means

The invention claimed is:
1. An electro-optic device, comprising:
an electro-optic element; and
a pair of substrates between which the electro-optic element is provided, one of the pair of substrates being a touch panel substrate that is provided with a position detecting electrode which detects, according to a change in capacitance, a position on coordinates as indicated by an object to be detected, the touch panel substrate including:
an insulating substrate;
an electro-optic element driving electrode which applies an electric field to the electro-optic element; and
metal wires; wherein
the position detecting electrode is provided between the insulating substrate and the electro-optic element driving electrode and being insulated from the electro-optic element driving electrode,
the position detecting electrode includes a plurality of first electrodes arranged along a first direction and a plurality of second electrodes arranged along a second direction perpendicular to the first direction and insulated from the first electrodes,
the metal wires are provided on a different level from the first electrodes and the second electrodes,
the metal wires make bridge connections between the first electrodes so as to bridge between the second electrodes along the first direction,
the metal wires include first metal wires electrically connected with the first electrodes via first contact holes defined in an insulating layer provided between the first metal wires and the first electrodes, second metal wires electrically connected with the second electrodes via second contact holes defined in the insulating layer provided between the second metal wires and the second electrodes, and metal wiring portions which are not electrically connected to the first electrodes and the second electrodes,
the first metal wires define bridge connections between each separate one of the first electrodes and other ones of the first electrodes via at least one of the first contact holes,
the first electrodes and the second electrodes are provided in a same plane,
in the lane in which the first electrodes and the second electrodes are provided the second electrodes are connected via transparent connection wires,
the first metal wires and second metal wires have disconnections between the first contact holes and the second contact holes, so that no electricity travels between the first electrodes and the second electrodes,
the metal wiring portions are located between the first contact holes and the second contact holes and located between the first metal wires and the second metal wires, and
the electro-optic element driving electrode and the position detecting electrode are located between the air of substrates.
2. The electro-optic device as set forth in claim 1, wherein in the plane in which the first electrodes and the second electrodes are formed, at least either the first or second electrodes are in an isolated pattern in which the at least either first or second electrodes are isolated from each other along a direction intersecting a direction along which the other electrodes are arranged.
3. The electro-optic device as set forth in claim 1, wherein:
in the plane in which the first electrodes and the second electrodes are provided, at least either the first or second electrodes are connected via connecting wires, and the other electrodes are in an isolated pattern in which the other electrodes are isolated from each other along a direction intersecting a direction along which the at least either first or second electrodes are arranged; and
the metal wires extend at least along a direction along which the other electrodes are provided in the isolated pattern.
4. The electro-optic device as set forth in claim 1, wherein the metal wires are sandwiched between the first and second electrodes and the electro-optic element driving electrode.
5. The electro-optic device as set forth in claim 1, further comprising an organic insulating layer sandwiched as an insulating layer at least either between the metal wires and the first and second electrodes or between the metal wires and the electro-optic element driving electrode.
6. The electro-optic device as set forth in claim 5, wherein the metal wires have outer peripheral portions which serve as connecting portions with the other one of the pair of substrates and which are electrically disconnected from the first electrodes and the second electrodes, and the electro-optic element driving electrode is electrically connected to the outer peripheral portions of the metal wires.
7. The electro-optic device as set forth in claim 1, further comprising a light blocking layer in a grid on the insulating substrate, the light blocking layer covering the metal wires as seen in plan view.
8. The electro-optic device as set forth in claim 7, wherein the metal wires are a grid of metal wires.
9. The electro-optic device as set forth in claim 7, wherein the metal wires have outer peripheral portions which serve as connecting portions with the other one of the pair of substrates and which are electrically disconnected from the first electrodes and the second electrodes, and the electro-optic element driving electrode is electrically connected to the outer peripheral portions of the metal wires.
10. The electro-optic device as set forth in claim 1, wherein the contact holes are provided at branch line portions of the metal wires, the branch line portions intersecting trunk lines connecting electrodes connected via the metal wires.
11. The electro-optic device as set forth in claim 1, wherein the second electrodes which are connected via transparent connecting wires are provided with the second contact holes at electrode edge portions connected via the connecting wires.
12. The electro-optic device as set forth in claim 1, wherein:
the metal wires include at least one disconnecting line which divides the metal wires into a plurality of metal wiring portions, the at least one disconnecting line being between the first contact holes and the second contact holes.
13. The electro-optic device as set forth in claim 1, wherein the metal wiring portion which is not electrically connected to the first electrodes and the second electrodes are electrically connected to the electro-optic element driving electrode.
14. The electro-optic device as set forth in claim 1, wherein the plurality of metal wiring portions are provided between one of the first metal wires and one of the second metal wires which is adjacent to the one of the first metal wires.

15. The electro-optic device as set forth in claim 1, wherein the metal wires are made of light reflecting metal.

* * * * *